United States Patent
Kimura et al.

(10) Patent No.: US 11,824,203 B2
(45) Date of Patent: Nov. 21, 2023

(54) NON-AQUEOUS LITHIUM-TYPE ELECTRICITY STORAGE ELEMENT

(71) Applicant: Asahi Kasei Kabushiki Kaisha, Tokyo (JP)

(72) Inventors: Yuima Kimura, Tokyo (JP); Kazuteru Umetsu, Tokyo (JP); Yuichiro Hirakawa, Tokyo (JP); Hitoshi Morita, Tokyo (JP); Nobuhiro Okada, Tokyo (JP)

(73) Assignee: Asahi Kasei Kabushiki Kaisha, Tokyo (JP)

( * ) Notice: Subject to any disclaimer, the term of this patent is extended or adjusted under 35 U.S.C. 154(b) by 588 days.

(21) Appl. No.: 16/646,213

(22) PCT Filed: Nov. 13, 2018

(86) PCT No.: PCT/JP2018/042006
§ 371 (c)(1),
(2) Date: Mar. 11, 2020

(87) PCT Pub. No.: WO2019/098200
PCT Pub. Date: May 23, 2019

(65) Prior Publication Data
US 2020/0274169 A1  Aug. 27, 2020

(30) Foreign Application Priority Data
Nov. 14, 2017 (JP) .................. 2017-219268

(51) Int. Cl.
| | |
|---|---|
| *H01M 4/66* | (2006.01) |
| *H01M 4/131* | (2010.01) |
| *H01M 4/36* | (2006.01) |
| *H01M 4/505* | (2010.01) |
| *H01M 4/525* | (2010.01) |
| *H01M 10/0525* | (2010.01) |
| *H01M 10/0567* | (2010.01) |
| *H01M 50/46* | (2021.01) |
| *H01M 4/02* | (2006.01) |

(52) U.S. Cl.
CPC .......... *H01M 4/663* (2013.01); *H01M 4/131* (2013.01); *H01M 4/366* (2013.01); *H01M 4/505* (2013.01); *H01M 4/525* (2013.01); *H01M 4/661* (2013.01); *H01M 10/0525* (2013.01); *H01M 10/0567* (2013.01); *H01M 50/46* (2021.01); *H01M 2004/021* (2013.01); *H01M 2004/027* (2013.01); *H01M 2004/028* (2013.01); *H01M 2220/20* (2013.01)

(58) Field of Classification Search
CPC ...... H01M 4/131; H01M 4/366; H01M 4/505; H01M 4/525; H01M 4/661; H01M 4/663; H01M 10/0525; H01M 10/0567
See application file for complete search history.

(56) References Cited

U.S. PATENT DOCUMENTS

| | | | | |
|---|---|---|---|---|
| 5,427,875 A | * | 6/1995 | Yamamoto .......... | H01M 10/052 429/57 |
| 2003/0139009 A1 | | 7/2003 | Fujino et al. | |
| 2005/0130006 A1 | | 6/2005 | Hoshi et al. | |
| 2012/0276455 A1 | * | 11/2012 | Nishimura ............ | H01M 4/621 429/232 |
| 2013/0330607 A1 | * | 12/2013 | Mizuno ............. | H01M 10/0525 429/188 |
| 2014/0065479 A1 | | 3/2014 | Yamada et al. | |
| 2014/0212759 A1 | * | 7/2014 | Blangero ............... | C01D 15/02 427/126.3 |
| 2016/0006033 A1 | * | 1/2016 | Sheem ................ | H01M 10/052 429/231 |
| 2016/0300667 A1 | * | 10/2016 | Okada .................... | H01G 11/24 |
| 2016/0336592 A1 | | 11/2016 | Hirose et al. | |
| 2017/0133676 A1 | * | 5/2017 | Kodato ................ | H01M 4/366 |
| 2017/0179535 A1 | * | 6/2017 | Murashi .............. | H01M 50/429 |
| 2018/0013138 A1 | * | 1/2018 | Chen ................... | H01M 4/1397 |
| 2018/0269486 A1 | | 9/2018 | Umetsu et al. | |
| 2019/0020034 A1 | | 1/2019 | Umetsu et al. | |
| 2019/0027320 A1 | | 1/2019 | Kimura et al. | |
| 2019/0027321 A1 | | 1/2019 | Kusuzaka et al. | |
| 2019/0035560 A1 | | 1/2019 | Umetsu et al. | |

FOREIGN PATENT DOCUMENTS

| | | |
|---|---|---|
| CN | 1853302 A | 10/2006 |
| CN | 103518279 A | 1/2014 |
| CN | 105981202 A | 9/2016 |
| EP | 0700105 A2 | 3/1996 |

(Continued)

OTHER PUBLICATIONS

JP-2008269978-A English machine translation (Year: 2022).*
Supplementary European Search Report issued in related European Patent Application No. 18879358.2 dated Jan. 15, 2021.
International Preliminary Report on Patentability and Written Opinion issued in corresponding International Patent Application No. PCT/JP2018/042006 dated May 19, 2020.
Barrett et al., "The Determination of Pore Volume and Area Distributions in Porous Substances: Computations from Nitrogen Isotherms," Journal of The American Chemical Society, 73: 373-380 (1951).

(Continued)

*Primary Examiner* — Ula C Ruddock
*Assistant Examiner* — Armindo Carvalho, Jr.
(74) *Attorney, Agent, or Firm* — Morgan, Lewis & Bockius LLP

(57) ABSTRACT

Provided is a non-aqueous lithium-type electricity storage element which includes a positive electrode current collector having a positive electrode active material layer disposed thereon, wherein, in a solid-state $^7$Li-NMR spectrum of the positive electrode active material layer, a signal area ratio a/b, which is the ratio of a signal area ratio of component A having a signal at least at −2 to 2.5 ppm to a signal area of component B having a signal at −6 to −2.5 ppm is 1.5 to 20.0.

20 Claims, No Drawings

(56) References Cited

FOREIGN PATENT DOCUMENTS

| | | | |
|---|---|---|---|
| JP | 2003-045758 A | 2/2003 | |
| JP | 2003-059781 A | 2/2003 | |
| JP | 2008269978 A | * 11/2008 | .......... H01M 10/052 |
| JP | 2013-161835 A | 8/2013 | |
| JP | 2013-201170 A | 10/2013 | |
| KR | 10-2014-0009526 A | 1/2014 | |
| TW | 201737533 A | 10/2017 | |
| WO | 2015/076261 A1 | 5/2015 | |
| WO | 2017/126682 A1 | 7/2017 | |
| WO | 2017/126691 A1 | 7/2017 | |
| WO | 2017/126693 A1 | 7/2017 | |
| WO | 2017/126698 A1 | 7/2017 | |

OTHER PUBLICATIONS

Lippens et al., "Studies on Pore Systems in Catalysts: The t Method," Journal of Catalysis, 4: 319-323 (1965).
Mikhail et al., "Investigations of a Complete Pore Structure Analysis," Journal of Colloid and Interface Science, 26, 45-53 (1968).
International Search Report issued in corresponding International Patent Application No. PCT/JP2018/042006 dated Jan. 29, 2019.
"Electrode material analysis technology for lithium-ion secondary batteries," Koreana Patent Firm (Oct. 31, 2010).

* cited by examiner

NON-AQUEOUS LITHIUM-TYPE ELECTRICITY STORAGE ELEMENT

FIELD

The present invention relates to a non-aqueous lithium-type electricity storage element.

BACKGROUND

In recent years, with an aim toward effective utilization of energy for greater environmental conservation and reduced usage of resources, a great deal of attention is being directed to power smoothing systems for wind power generation or overnight charging electric power storage systems, household dispersive electricity storage systems based on solar power generation technology, and electricity storage systems for electric vehicles, etc.

The number one requirement for batteries used in such electricity storage systems is high energy density. The development of lithium ion batteries is advancing at a rapid pace, as an effective strategy for batteries with high energy density that can meet this requirement.

The second requirement is a high output characteristic. A high power discharge characteristic is required for an electricity storage system during acceleration in, for example, a combination of a high efficiency engine and an electricity storage system (such as in a hybrid electric vehicle), or a combination of a fuel cell and an electricity storage system (such as in a fuel cell electric vehicle).

Electrical double layer capacitors and nickel metal hydride batteries, etc., are currently under development as high output electricity storage devices.

Electrical double layer capacitors that employ activated carbon in the electrodes have output characteristics of about 0.5 to 1 kW/L. Such electrical double layer capacitors have high durability (cycle characteristics and elevated temperature storage characteristics) and have been considered optimal devices in fields where the high output mentioned above is required. However, their energy densities are no greater than about 1 to 5 Wh/L. A need therefore exists for even higher energy density.

On the other hand, nickel metal hydride batteries employed in existing hybrid electric vehicles exhibit high output equivalent to electrical double layer capacitors, and have energy densities of about 160 Wh/L. Still, research is being actively pursued toward further increasing their energy density and output and increasing their durability (particularly stability at elevated temperatures).

Research is also advancing toward increased outputs for lithium ion batteries as well. For example, lithium ion batteries are being developed that yield high output exceeding 3 kW/L at 50% depth of discharge (a value representing the state of the percentage of discharge of the service capacity of an electricity storage element). However, the energy density is 100 Wh/L or lower, and the design is such that the high energy density, which is the major feature of a lithium ion battery, is intentionally reduced. Moreover, the durability (especially cycle characteristic and elevated temperature storage characteristic) is inferior to that of an electrical double layer capacitor. In order to provide practical durability, therefore, these are used with a depth of discharge in a narrower range than 0 to 100%. Because the usable capacity is even lower, research is actively being pursued toward further increasing the durability of lithium ion batteries.

There is a strong demand for implementation of electricity storage elements exhibiting high energy density, high output characteristics and durability, as mentioned above. Nevertheless, the existing electricity storage elements mentioned above have their advantages and disadvantages. New electricity storage elements are therefore desired that can meet these technical requirements. Promising candidates are electricity storage elements known as lithium ion capacitors, which are being actively developed in recent years.

The energy of a capacitor is represented as $1/2 \cdot C \cdot V^2$ (where C is electrostatic capacitance and V is voltage).

A lithium ion capacitor is a type of electricity storage element by using a non-aqueous electrolytic solution comprising a lithium salt (or, "non-aqueous lithium electricity storage element"), wherein charge-discharge is accomplished by: non-Faraday reaction by adsorption/desorption of anions similar to an electrical double layer capacitor at about 3 V or higher, at the positive electrode; and Faraday reaction by intercalation/release of lithium ions similar to a lithium ion battery, at the negative electrode.

To summarize these electrode materials and their characteristics described above: when charge-discharge is carried out by using a material such as activated carbon as an electrode and by adsorption and desorption of ions on the activated carbon surface (non-Faraday reaction), it is possible to obtain high output and high durability, but with lower energy density (for example, 1x). When charge/discharge is carried out by Faraday reaction by using oxide or a carbon material as the electrode, the energy density is higher (for example, 10 times that of non-Faraday reaction by using activated carbon), but then durability and output characteristic become issues.

Electrical double layer capacitors that combine these electrode materials employ activated carbon as the positive electrode and negative electrode (energy density: 1x), and carry out charge/discharge by non-Faraday reaction at both the positive and negative electrodes, and are characterized by having high output and high durability, but also low energy density (positive electrode: 1x×negative electrode: 1x=1).

Lithium ion secondary batteries use lithium transition metal oxide for the positive electrode (energy density: 10x) and a carbon material (energy density: 10x) for the negative electrode, carrying out charge/discharge by Faraday reaction at both the positive and negative electrodes, and have high energy density (positive electrode: 10x×negative electrode: 10x=100), but have issues in terms of output characteristic and durability. Further, the depth of discharge must be restricted in order to satisfy the high durability required for hybrid electric vehicles, and with lithium ion secondary batteries only 10 to 50% of the energy can be utilized.

A lithium ion capacitor is a new type of asymmetric capacitor that employs activated carbon (energy density: 1x) for the positive electrode and a carbon material (energy density: 10x) for the negative electrode, and it is characterized by carrying out charge/discharge by non-Faraday reaction at the positive electrode and Faraday reaction at the negative electrode, and thus having the characteristics of both an electrical double layer capacitor and a lithium ion secondary battery. A lithium ion capacitor exhibits high output and high durability, while also having high energy density (positive electrode: 1x×negative electrode: 10x=10) and requiring no restrictions on depth of discharge as with a lithium ion secondary battery.

Applications of the lithium ion capacitor include, for example, electricity storages for railways, construction machines, and vehicles. In these applications, lithium ion capacitors are used in a wide range of temperature environments from −30° C. to 60° C., mainly for energy regeneration or motor assist. Particularly in a lowered temperature environment, the internal resistance of the battery increases, and lithium dendrites precipitate at a negative electrode interface due to charge/discharge with a large current, which may bring about performance reduction and internal short-circuit that has become a big problem in terms of safety and reliability of the electricity storage element. Therefore, an electricity storage element having low resistance and high output in a wide temperature environment has been required.

Moreover, since a space for mounting the electricity storage element is limited for these applications, an electricity storage element having a higher energy density and a miniature size has been required. However, there is an issue of a decrease in an output of the electricity storage element since an internal resistance thereof generally becomes higher as an energy density is intentionally enhanced.

PTL 1 discloses an electricity storage element excellent in a high capacity and cycle characteristics as a technique for solving such issues, wherein a porous carbon material, on the surface of which a conductive polymer having a nitrogen atom is bonded, having a fine pore volume of fine pores with a predetermined diameter at a specific ratio, is used as an electrode material for the electricity storage element.

PTL 2 proposes a technique for improving an energy density, wherein carbon subjected to elevated temperature treatment in a high magnetic field is used for an electricity storage element to increase a fine pore area effective for increasing an electrostatic capacitance and to decrease large grooves that increase a volume.

PTL 3 discloses an electricity storage element excellent in durability against a high output and high voltage charge, wherein percolated macropores are formed in activated carbon, and a pore size distribution, specific surface area, microvolume, and micropore width, are optimized.

PTL 4 discloses a non-aqueous lithium-type electricity storage element excellent in a high energy density, high input/output characteristics and durability for high-load charge/discharge cycle, wherein the positive electrode comprises a lithium compound other than a positive electrode active material, and a fine pore diameter and fine pore distribution of a positive electrode active material layer is optimized by a decomposition reaction of the lithium compound.

Incidentally, in the present description, a mesopore volume is calculated by a BJH method and a micropore volume is calculated by a MP method, respectively. The BJH method is advocated in NPL 1, and the MP method refers to a method of calculating a micropore volume, micropore area, and distribution of micropores by utilizing a "t-plot method" (NPL 2), which is described in NPL 3.

CITATION LIST

Patent Literature

[PTL 1] Japanese Unexamined Patent Publication No. 2013-161835
[PTL 2] Japanese Unexamined Patent Publication No. 2003-59781
[PTL 3] Japanese Unexamined Patent Publication No. 2013-201170
[PTL 4] WO2017/126698

Non Patent Literature

[NPL 1] E. P. Barrett, L. G. Joyner and P. Halenda, J. Am. Chem. Soc., 1951, 73, p 373
[NPL 2] B. C. Lippens, J. H. de Boer, J. Catalysis, 1965, p 4319
[NPL 3] R. S. Mikhail, S. Brunauer, E. E. Bodor, J. Colloid Interface Sci., 1968, 26, p 45

SUMMARY

Technical Problem

However, none of the patent literatures refer to an increased output in a lowered temperature environment. When an energy density is increased by surface modification or fine pore control of a positive electrode active material layer, diffusion of lithium ions on a fine pore surface and inside fine pores of the positive electrode active material layer is prevented, which may significantly reduce characteristics of the electricity storage element in a lowered temperature environment, however, none of these literatures take this point into consideration.

Therefore, the problem to be solved by the invention is to provide a non-aqueous lithium-type electricity storage element that can achieve both high energy density and high output and maintain their characteristics under a wide temperature environment.

Solution to Problem

The inventors have found that the aforementioned problem can be solved by containing activated carbon in a positive electrode active material and forming active sites that interact reversibly with Li ions in a positive electrode active material layer, which improves a capacity per unit weight of the positive electrode active material without impairing diffusivity of Li ions inside the positive electrode active material layer and at an interface with an electrolytic solution. The present invention has been completed based on the aforementioned knowledge.

Namely, the present invention is as follows.

[1]

A non-aqueous lithium-type electricity storage element comprising a positive electrode, a negative electrode, a separator and a non-aqueous electrolytic solution containing lithium ions, wherein the negative electrode has a negative electrode current collector, and a negative electrode active material layer containing a negative electrode active material, disposed on one or both sides of the negative electrode current collector, the negative electrode active material contains a carbon material capable of intercalating and releasing lithium ions, the positive electrode has a positive electrode current collector, and a positive electrode active material layer containing a positive electrode active material, disposed on one or both sides of the positive electrode current collector, the positive electrode active material contains an activated carbon, and the positive electrode active material layer contains a component A having a signal in a range of −2 to 2.5 ppm and a component B having a signal in a range of −6 to −2.5 ppm in a solid-state $^7$Li-NMR spectrum of the positive electrode active material layer, and has a signal area ratio a/b of 1.5 to 20.0 when a signal area of the component A is a and a signal area of the component B is b.

[2]

The non-aqueous lithium-type electricity storage element according to [1], wherein the positive electrode active material further contains a transition metal oxide capable of intercalating and releasing lithium ions.

[3]

The non-aqueous lithium-type electricity storage element according to [2], wherein the transition metal oxide contains at least one lithium transition metal oxide selected from the group consisting of the following formulae:

$Li_{x1}CoO_2$ wherein, in the formula, x1 satisfies $0 \leq x1 \leq 2$, $Li_{x1}NiO_2$ wherein, in the formula, x1 satisfies $0 \leq x1 \leq 2$, $Li_{x1}Ni_yM^1_{(1-y)}O_2$ wherein, in the formula, $M^1$ is at least one element selected from the group consisting of Co, Mn, Al, Fe, Mg and Ti, x1 satisfies $0 \leq x1 \leq 2$, and y satisfies $0.2 < y < 0.97$, $Li_{x1}Ni_{1/3}Co_{1/3}Mn_{1/3}O_2$ wherein, in the formula, x1 satisfies $0 \leq x1 \leq 2$, $Li_{x1}MnO_2$ wherein, in the formula, x1 satisfies $0 \leq x1 \leq 2$, $\alpha\text{-}Li_{x1}FeO_2$ wherein, in the formula, x1 satisfies $0 \leq x1 \leq 2$, $Li_{x1}VO_2$ wherein, in the formula, x1 satisfies $0 \leq x1 \leq 2$, $Li_{x1}CrO_2$ wherein, in the formula, x1 satisfies $0 \leq x1 \leq 2$, $Li_{x1}Mn_2O_4$ wherein, in the formula, x1 satisfies $0 \leq x1 \leq 2$, $Li_{x1}M^2_yMn_{(2-y)}O_4$ wherein, in the formula, $M^2$ is at least one element selected from the group consisting of Co, Ni, Al, Fe, Mg and Ti, x1 satisfies $0 \leq x1 \leq 2$, and y satisfies $0.2 < y < 0.97$, $Li_{x1}Ni_aCo_bAl_{(1-a-b)}O_2$ wherein, in the formula, x1 satisfies $0 \leq x1 \leq 2$, a satisfies $0.2 < a < 0.97$ and b satisfies $0.2 < b < 0.97$, $Li_{x1}Ni_cCo_dMn_{(1-c-d)}O_2$ wherein, in the formula, x1 satisfies $0 \leq x1 \leq 2$, c satisfies $0.2 < c < 0.97$, and d satisfies $0.2 < d < 0.97$, $Li_{x1}M^3PO_4$ wherein, in the formula, $M^3$ is at least one element selected from the group consisting of Co, Ni, Fe, Mn and Cu, and x1 satisfies $0 \leq x1 \leq 2$, and $Li_zV_2(PO_4)_3$ wherein, in the formula, z satisfies $0 \leq z \leq 3$.

[4]

The non-aqueous lithium-type electricity storage element according to [2] or [3], wherein the activated carbon has a mean particle diameter of 2 μm or greater and 20 μm or less, and the transition metal oxide has a mean particle diameter of 0.1 μm or greater and 20 μm or less.

[5]

The non-aqueous lithium-type electricity storage element according to any one of [2] to [4], wherein the positive electrode contains a carbon material containing the activated carbon and the lithium transition metal oxide, and when a weight proportion of the carbon material in the positive electrode active material layer is $A_1$, and a weight proportion of the lithium transition metal oxide is $A_2$, $A_2/A_1$ is 0.1 or greater and 2.5 or less.

[6]

The non-aqueous lithium-type electricity storage element according to any one of [1] to [5], wherein the positive electrode contains one or more selected from the group consisting of lithium carbonate, sodium carbonate, potassium carbonate, rubidium carbonate, and cesium carbonate in an amount of 1% by weight or greater and 50% by weight or less relative to a total amount of the positive electrode active material.

[7]

The non-aqueous lithium-type electricity storage element according to any one of [1] to [6], wherein the positive electrode current collector and the negative electrode current collector are nonporous metal foils.

[8]

The non-aqueous lithium-type electricity storage element according to any one of [1] to [7], wherein the negative electrode contains at least two types of the negative electrode active materials.

[9]

The non-aqueous lithium-type electricity storage element according to [8], wherein at least one of the negative electrode active material has a mean particle diameter of 1 μm or greater and 15 μm or less.

[10]

The non-aqueous lithium-type electricity storage element according to any one of [1] to [9], wherein when a basis weight of the positive electrode active material layer of the positive electrode is $C_1$ (g/m$^2$) and a basis weight of the negative electrode active material layer of the negative electrode is $C_2$ (g/m$^2$), $C_1/C_2$ is 0.35 or greater and 5.80 or less.

[11]

The non-aqueous lithium-type electricity storage element according to any one of [1] to [10], wherein when a thickness of the positive electrode active material layer of the positive electrode is $D_1$ (μm) and a thickness of the negative electrode active material layer of the negative electrode is $D_2$ (μm), $D_1/D_2$ is 0.30 or greater and 5.00 or less.

[12]

The non-aqueous lithium-type electricity storage element according to any one of [1] to [11], wherein an element concentration of sulfur (S) on the surface of the negative electrode active material layer detected by X-ray photoelectron spectroscopy (XPS), is 0.5 atomic % or greater, and a peak having 162 eV to 166 eV is present in a S2p spectrum of the surface of the positive electrode active material layer, obtained by X-ray photoelectron spectroscopy (XPS).

[13]

The non-aqueous lithium-type electricity storage element according to any one of [1] to [12], wherein the non-aqueous electrolytic solution contains as additives:

one or more sulfur-containing compounds (X) selected from the group consisting of a thiophene compound represented by formula (1):

[Chemical formula 1]

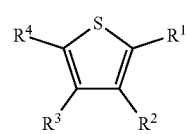

(1)

wherein, in formula (1), $R^1$, $R^2$, $R^3$, and $R^4$ each independently represent a hydrogen atom, a halogen atom, a formyl group, an acetyl group, a nitrile group, an acetyl group, an alkyl group having 1 to 6 carbon atoms, an alkoxy group having 1 to 6 carbon atoms or an alkyl ester having 1 to 6 carbon atoms, and one or more sulfur-containing compounds (Y) selected from the group consisting of a cyclic sulfate compound represented by formula (2-1):

[Chemical formula 2]

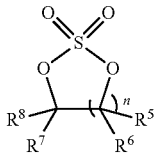

(2-1)

wherein, in formula (2-1), $R^5$, $R^6$, $R^7$, and $R^8$ each represent at least one selected from the group consisting of a hydrogen atom, a halogen atom, an alkyl group having 1 to 12 carbon atoms, and a halogenated alkyl group having 1 to 12 carbon atoms, may be the same or different from each other; and n is an integer from 0 to 3; a sultone compound represented by formula (2-2):

[Chemical formula 3]

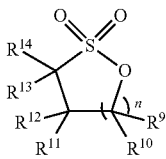

(2-2)

wherein, in formula (2-2), $R^9$, $R^{10}$, $R^{11}$, $R^{12}$, $R^{13}$, and $R^{14}$ each represent at least one selected from the group consisting of a hydrogen atom, a halogen atom, an alkyl group having 1 to 12 carbon atoms, and a halogenated alkyl group having 1 to 12 carbon atoms, may be the same or different from each other; and n is an integer from 0 to 3; a sultone compound represented by formula (2-3):

[Chemical formula 4]

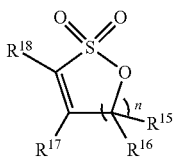

(2-3)

wherein, in formula (2-3), $R^{15}$, $R^{16}$, $R^{17}$, and $R^{18}$ each represent at least one selected from the group consisting of a hydrogen atom, a halogen atom, an alkyl group having 1 to 12 carbon atoms, and a halogenated alkyl group having 1 to 12 carbon atoms, may be the same or different from each other, and n is an integer from 0 to 3; a compound represented by formula (2-4):

[Chemical formula 5]

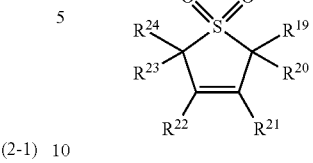

(2-4)

wherein, in formula (2-4), $R^{19}$, $R^{20}$, $R^{21}$, $R^{22}$, $R^{23}$, and $R^{24}$ each represent at least one selected from the group consisting of a hydrogen atom, a halogen atom, an alkyl group having 1 to 12 carbon atoms, and a halogenated alkyl group having 1 to 12 carbon atoms and may be the same or different from each other; and a cyclic sulfite compound represented by formula (2-5):

[Chemical formula 6]

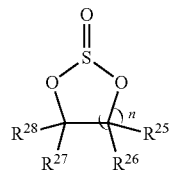

(2-5)

wherein, in formula (2-5), $R^{25}$, $R^{26}$, $R^{27}$, and $R^{28}$ each represent at least one selected from the group consisting of a hydrogen atom, a halogen atom, an alkyl group having 1 to 12 carbon atoms, and a halogenated alkyl group having 1 to 12 carbon atoms, may be the same or different from each other, and n is an integer from 0 to 3.

[14]

The non-aqueous lithium-type electricity storage element according to any one of [2] to [13], wherein the nonaqueous electrolytic solution has an element concentration of at least one element selected from the group consisting of Ni, Mn, Fe, Co, and Al of 10 ppm or grater and 1000 ppm or less.

[15]

The non-aqueous lithium-type electricity storage element according to any one of [1] to [14], wherein the following (a), (b), and (c) are simultaneously satisfied for the non-aqueous lithium-type electricity storage element:

(a) a product of Ra and F, Ra·F, is 0.5 or greater and 3.5 or less, (b) E/V is 20 or greater and 80 or less, and (c) Rc/Ra is 30 or less, where Ra (Ω) is an initial internal resistance at a cell voltage of 4.2 V, F (F) is an electrostatic capacitance, E (Wh) is an electrical energy, V (L) is a volume of a casing housing the nonaqueous electrolytic solution and an electrode stacked body in which the positive electrode and the negative electrode have been stacked via the separator or an electrode wound body in which the positive electrode and the negative electrode have been wound via the separator, and Rc is an internal resistance at an environmental temperature of −30° C.

[16]

The non-aqueous lithium-type electricity storage element according to [15], wherein the following (d) and (e) are simultaneously satisfied for the non-aqueous lithium-type electricity storage element:

(d) Rb/Ra is 0.3 or greater and 3.0 or less, and (e) a gas volume generated when a cell has been stored for 2 months at a cell voltage of 4 V and an environmental temperature of 60° C., is 30×10$^{-3}$ cc/F or less at 25° C., where Ra (Ω) is an initial internal resistance at a cell voltage of 4.2 V and Rb (Ω) is an internal resistance at 25° C. after a cell has been stored for 2 months at a cell voltage of 4.2 V and an environmental temperature of 60° C.

[17]

An electric vehicle, a plug-in hybrid vehicle, a hybrid vehicle, or an electric motorcycle comprising the non-aqueous lithium-type electricity storage element according to any one of [1] to [16].

[18]

A hybrid construction machine comprising the non-aqueous lithium-type electricity storage element according to any one of [1] to [16].

[19]

A backup power supply system comprising the non-aqueous lithium-type electricity storage element according to any one of [1] to [16].

Advantageous of Effects of Invention

By forming active sites that interact reversibly with Li ions in the positive electrode active material layer, a capacity per unit weight of a positive electrode active material can be improved without impairing ion diffusivity of Li ions inside a positive electrode active material layer and at an interface with an electrolytic solution, which thereby enables to achieve both a high energy density and high output of a non-aqueous lithium-type electricity storage element and maintain characteristics thereof even in a wide temperature environment.

DESCRIPTION OF EMBODIMENTS

Details of the embodiment of the present invention (hereunder referred to as "the present embodiment") will be explained below and it is to be understood, however, that the invention is not limited to the embodiments below. In the present description, the upper limits and lower limits of the range of various numerals can be arbitrarily combined with each other to constitute arbitrary numerical ranges.

The non-aqueous lithium-type electricity storage elements consists of, in general, a positive electrode, a negative electrode, a separator, an electrolytic solution, and a casing as main constituents. An organic solvent dissolving a lithium salt (hereinafter referred to as "non-aqueous electrolytic solution") is used as an electrolytic solution.

[Positive Electrode]

The positive electrode has a positive electrode current collector, and a positive electrode active material layer on one or both sides of the positive electrode current collector.

Moreover, the positive electrode preferably contains a lithium compound as the positive electrode precursor, prior to assembly of the electricity storage element. As described below, in an assembly step of the electricity storage element according to the present embodiment, the negative electrode is preferably pre-doped with a lithium ion. The pre-doping method is preferably application of a voltage between the positive electrode precursor and negative electrode, after the electricity storage element has been assembled by using the positive electrode precursor containing a lithium compound, the negative electrode, the separator, the casing, and the non-aqueous electrolytic solution. The lithium compound is preferably contained in the positive electrode active material layer formed on the positive electrode current collector of the positive electrode precursor.

The lithium compound may be contained in any form in the positive electrode precursor, and it may exist between the positive electrode current collector and the positive electrode active material layer or exist on a surface of the positive electrode active material layer.

Throughout the present description, "positive electrode precursor" is defined as the state of the positive electrode before the lithium doping step, and "positive electrode" is defined as the state of the positive electrode after the lithium doping step.

Throughout the present description, "nonporous positive electrode current collector" refers to a positive electrode current collector that, at least in the region coated with the positive electrode active material layer, lacks pores that would allow lithium ions to pass through the positive electrode current collector and result in uniformity of lithium ions on the front and back sides of the positive electrode. Therefore, it does not exclude positive electrode current collectors having very small or microlevel pores, or positive electrode current collectors having pores in regions uncoated with the positive electrode active material layer, within a range in which the effect of the invention is exhibited.

Moreover, in the present embodiment, the region of the positive electrode active current collector, the surface of which is at least coated with the positive electrode active material layer is nonporous, and the remaining portions of the positive electrode current collector, the surfaces of which are not coated with the positive electrode active material may either have or lack pores.

[Positive Electrode Active Material Layer]

The positive electrode active material layer in the positive electrode according to the present embodiment comprises a positive electrode active material containing a carbon material. The positive electrode active material layer preferably contains optional components such as transition metal oxide, a conductive filler, binder, dispersion stabilizer, etc., as necessary, in addition to the positive electrode active material and more preferably contains transition metal oxide capable of intercalating and releasing lithium ions.

Moreover, the positive electrode active material layer of the positive electrode precursor preferably comprises a lithium compound other than the positive electrode active material.

[Positive Electrode Active Material]

The positive electrode active material according to the present embodiment contains a carbon material. Activated carbon alone may be used as the positive electrode active material or transition metal oxide is preferably mixed in addition to the activated carbon.

Moreover, other carbon materials to be described below may be combined with the activated carbon for use. Carbon nanotubes, conductive polymers or porous carbon materials are preferably used for this carbon material.

When activated carbon is used as the positive electrode active material, there are no particular restrictions on a type of activated carbon or a starting material thereof. However, preferably the fine pores of the activated carbon are optimally controlled to obtain both high input/output characteristics and high energy density. Specifically, when $V_1$ (cc/g) is the mesopore volume due to pores with a diameter of 20 Å or larger and 500 Å or smaller as calculated by the BJH method, and $V_2$ (cc/g) is the micropore volume due to pores with diameters of smaller than 20 Å as calculated by the MP method, then: (1) in order to obtain high input/output characteristics, activated carbon satisfying $0.3 < V_1 \leq 0.8$ and $0.5 \leq V_2 \leq 1.0$ and exhibiting a specific surface area of 1,500 m²/g or grater and 3,000 m²/g or less as measured by the BET method (hereunder also referred to as "activated carbon 1") is preferred, and (2) in order to obtain high energy density, activated carbon satisfying $0.8 < V_1 \leq 2.5$ and $0.8 < V_2 \leq 3.0$ and exhibiting a specific surface area of 2,300 m²/g or grater and 4,200 m²/g or less as measured by the BET method (hereunder also referred to as "activated carbon 2"), is preferred.

The (1) activated carbon 1 and (2) activated carbon 2 will each be explained in order.

[Activated Carbon 1]

The mesopore volume $V_1$ of activated carbon 1 is preferably a value larger than 0.3 cc/g, from the viewpoint of greater input/output characteristics when incorporated into an electricity storage element. On the other hand, the mesopore volume $V_1$ of activated carbon 1 is also preferably no greater than 0.8 cc/g from the viewpoint of minimizing reduction in the bulk density of the positive electrode. $V_1$ is more preferably 0.35 cc/g or greater and 0.7 cc/g or less and even more preferably 0.4 cc/g or greater and 0.6 cc/g or less.

The micropore volume $V_2$ of activated carbon 1 is preferably 0.5 cc/g or greater in order to increase the specific surface area of the activated carbon and to increase a capacity. From the viewpoint of reducing the bulk of the activated carbon, increasing the density as an electrode and increasing the capacity per unit volume, on the other hand, the micropore volume $V_2$ of the activated carbon 1 is preferably no greater than 1.0 cc/g. $V_2$ is more preferably 0.6 cc/g or greater and 1.0 cc/g or less and even more preferably 0.8 cc/g or greater and 1.0 cc/g or less. Incidentally, the lower limits and the upper limits of the micropore volume $V_2$ of activated carbon 1 can be combined as desired.

The ratio of the mesopore volume $V_1$ to the micropore volume $V_2$ of the activated carbon 1 ($V_1/V_2$) is preferably in the range of $0.3 \leq V_1/V_2 \leq 0.9$. Namely, $V_1/V_2$ is preferably 0.3 or greater from the viewpoint of increasing the ratio of the mesopore volume to the micropore volume to a degree allowing reduction in the output characteristics to be minimized while maintaining high capacity. On the other hand, from the viewpoint of increasing the proportion of the micropore volume with respect to the mesopore volume, to an extent allowing reduction in capacity to be minimized while maintaining high output characteristics, $V_1/V_2$ is preferably no greater than 0.9, and the range of $V_1/V_2$ is more preferably $0.4 \leq V_1/V_2 \leq 0.7$ and even more preferably $0.55 \leq V_1/V_2 \leq 0.7$. Incidentally, combination of the lower limits and the upper limits of the ratio is arbitrary.

From the viewpoint of maximizing the output of the obtained electricity storage element, the mean fine pore diameter of activated carbon 1 is preferably 17 Å or greater, more preferably 18 Å or greater and even more preferably 20 Å or greater. From the viewpoint of maximizing the capacity, the mean fine pore diameter of activated carbon 1 is preferably no greater than 25 Å.

The BET specific surface area of activated carbon 1 is preferably 1,500 m²/g or greater and 3,000 m²/g or lower, and more preferably 1,500 m²/g or greater and 2,500 m²/g or lower. When the BET specific surface area is 1,500 m²/g or greater, satisfactory energy density is facilitated to be obtained, and when the BET specific surface area is 3,000 m²/g or lower there will be no need to add large amounts of a binder to maintain the strength of the electrode, and therefore the performance per volume of the electrode will be higher. The upper limit and lower limit ranges for the BET specific surface area may be combined as desired.

The activated carbon 1 having such features can be obtained, for example, by using the starting material and treatment method described below.

In the present embodiment, the carbon source to be used as the starting material for activated carbon 1 is not particularly restricted. For example, plant-based starting materials such as wood, wood dust, coconut shell, by-products of pulp production, bagasse and molasses, etc.; fossil-based starting materials such as peat, lignite, brown coal, bituminous coal, anthracite, petroleum distillation residue components, petroleum pitch, coke, coal tar, etc.; various synthetic resins such as phenol resin, vinyl chloride resin, vinyl acetate resin, melamine resin, urea resin, resorcinol resin, celluloid, epoxy resin, polyurethane resin, polyester resin, polyamide resin, etc.; synthetic rubbers such as polybutylene, polybutadiene, polychloroprene, etc.; other synthetic wood or synthetic pulp materials, etc., and carbides thereof, are included. From the viewpoint of suitability for mass-production and of cost, the starting materials preferred among these are plant-based starting materials such as coconut shell and wood dust, etc., and carbides thereof, with coconut shell carbides being particularly preferred.

The system used for carbonization and activation to obtain the activated carbon 1 from these starting materials may be publicly known systems such as, a fixed bed system, moving bed system, fluidized bed system, slurry system or rotary kiln system, etc.

The carbonization method for these starting materials is a method in which inert gases such as nitrogen, carbon dioxide, helium, argon, xenon, neon, carbon monoxide, exhaust gas, etc., or a mixed gas composed mainly of such inert gases with other gases, are used for calcinating at about 400 to 700° C. (preferably 450 to 600° C.), over a period of about 30 minutes to 10 hours.

The activation method for a carbide obtained by the carbonization method described above is preferably a gas activation method in which activating gases such as water vapor, carbon dioxide, oxygen, etc., are used for calcination. A method using water vapor or carbon dioxide as the activating gas is preferred among these.

In this activation method, while the activating gas is supplied at a rate of preferably 0.5 to 3.0 kg/h (preferably 0.7 to 2.0 kg/h), the temperature of the above carbide is raised to 800 to 1,000° C. for 3 to 12 hours (preferably 5 to 11 hours and even more preferably 6 to 10 hours), for activation.

Further, the carbide may be subjected to a primary activation before activation treatment of the carbide as explained above. In the primary activation, a method of calcinating the carbon material at a temperature of below 900° C. by using an activating gas such as water vapor, carbon dioxide or oxygen for gas activation, is usually preferred.

By appropriate combinations of the calcination temperature and calcination time for the carbonization method, and of the activating gas supply rate, temperature-elevating rate and maximum activation temperature in the activation method, it is possible to produce activated carbon 1 having the features described above.

The mean particle diameter of the activated carbon 1 is preferably 2 to 20 μm.

When the above mean particle diameter is 2 μm or greater, the capacity per electrode volume will tend to be higher due to the higher density of the active material layer. A small mean particle diameter may lead to the disadvantage of low durability, but a mean particle diameter of at least 2 μm will help avoid this disadvantage. A mean particle diameter of no larger than 20 μm, on the other hand, will tend to be more suitable for rapid charge/discharge. The mean particle diameter is more preferably 2 to 15 μm and even more preferably 3 to 10 μm. The upper limit and lower limit ranges for the mean particle diameter may be combined as desired.

[Activated Carbon 2]

The mesopore volume $V_1$ of activated carbon 2 is preferably a value greater than 0.8 cc/g, from the viewpoint of a greater output characteristic when incorporated into an electricity storage element, but $V_1$ is also preferably no greater than 2.5 cc/g from the viewpoint of minimizing reduction in the capacity of the electricity storage element. $V_1$ is more preferably 1.00 cc/g or greater and 2.0 cc/g or less and even more preferably 1.2 cc/g or greater and 1.8 cc/g or less.

The micropore volume $V_2$ of activated carbon 2 is preferably greater than 0.8 cc/g for a larger specific surface area of the activated carbon and an increase in the capacity, but $V_2$ is also preferably no greater than 3.0 cc/g to increase the density as an activated carbon electrode, and to increase the capacity per unit volume. $V_2$ is more preferably greater than 1.0 cc/g and no greater than 2.5 cc/g, and even more preferably 1.5 cc/g or greater and 2.5 cc/g or less.

Activated carbon 2 having the mesopore volume and micropore volume described above has a higher BET specific surface area than activated carbon used in conventional electrical double layer capacitors or lithium ion capacitors. The specific value of the BET specific surface area of the activated carbon 2 is preferably 2,300 m²/g or greater and 4,200 m²/g or lower. The lower limit of the BET specific surface area is more preferably 3,000 m²/g or greater and still more preferably 3,200 m²/g or greater. On the other hand, the upper limit of the BET specific surface area is 3,800 m²/g or lower. When the BET specific surface area is 2,300 m²/g or greater, a satisfactory energy density is facilitated to be obtained, and when the BET specific surface area is 4,200 m²/g or lower there will be no need to add an enormous amount of a binder to maintain the strength of the electrode, and therefore the performance per volume of the electrode will be higher.

Incidentally, the upper limit and lower limit ranges each that are explained above for the V1 and V2 of activated carbon 2 and the BET specific surface area, may be combined as desired.

Activated carbon 2 having such features can be obtained, for example, by using the starting material and treatment method described below.

The carbon source used as the starting material for activated carbon 2 is not particularly restricted provided that it is a carbon source commonly used as a starting material for activated carbon, and the carbon source includes plant-based starting materials such as wood, wood dust, coconut shell, etc.; fossil-based starting materials such as petroleum pitch, coke, etc.; and various synthetic resins such as phenol resins, furan resins, vinyl chloride resins, vinyl acetate resins, melamine resins, urea resins, resorcinol resins, etc. Of these starting materials, phenol resins and furan resins are especially preferred, which are suitable for fabrication of activated carbon with a high specific surface area.

The system used for carbonization of these starting materials, or the heating method during activation treatment, may be publicly known systems such as, for example, a fixed bed system, moving bed system, fluidized bed system, slurry system, rotary kiln system, etc. The atmosphere during heating is an inert gas such as nitrogen, carbon dioxide, helium, argon, or a mixed gas composed mainly of such inert gases in admixture with other gases. A carbonization temperature is preferably about 400 to 700° C. (the lower limit is preferably 450° C. or higher and more preferably 500° C. or higher. The upper limit is preferably 650° C. or lower.) and calcination time is about 0.5 to 10 hours.

The activation method for the carbide after the above calcination treatment may be a gas activation method in which calcination is accomplished by using activating gases such as water vapor, carbon dioxide, oxygen, etc., or an alkali metal activation method in which heat treatment is carried out after mixture with an alkali metal compound, but an alkali metal activation method is preferred for fabrication of activated carbon with a high specific surface area.

In this activation method, after a carbide and an alkali metal compound such as KOH, NaOH, etc., are mixed so that the weight ratio is 1≤1 (the amount of the alkali metal compound is equal to or greater than the amount of the carbide), heat treatment is carried out in a range of 600 to 900° C. (preferably 650° C. to 850° C.) for 0.5 to 5 hours under an inert gas atmosphere, and then the alkali metal compound is cleaned and removed with an acid or water followed by drying.

As described above, the weight ratio of the carbide and alkali metal compound (=carbide:alkali metal compound) is preferably 1≤1, but since the mesopore volume increases as the amount of alkali metal compound increases and the pore volume tends to increase drastically near a weight ratio of 1:3.5, the weight ratio of the carbide and alkali metal compound is preferably 1<3 or more (the alkali metal increases in an amount of greater than 3) and 1≤5.5 or less.

Although the pore volume increases as the alkali metal compound increases, the weight ratio is preferably in the above range, considering the efficiency of subsequent treatment procedures such as washing, etc.

Incidentally, in order to increase the micropore volume and not increase the mesopore volume, the amount of carbide may be increased during activation, and mixed with KOH. In order to increase both the micropore volume and mesopore volume, a large amount of KOH may be used. Moreover, in order to increase mainly the mesopore volume, steam-activation is preferably carried out after alkaline activation treatment.

The mean particle diameter of the activated carbon 2 is preferably 2 μm or larger and 20 μam or smaller and more preferably 3 μm or larger and 10 μm or smaller.

[Use of Activated Carbon]

The activated carbons 1 and 2 may each be a single type of activated carbon, or a mixture of two or more different types of activated carbon, such that the mixture as a whole exhibit the characteristic values described above.

Either of activated carbon 1 or 2 may be selected for use, or both may be used in admixture.

The positive electrode active material may include materials other than activated carbons 1 and 2 (for example, activated carbon without the specified $V_1$ and/or $V_2$ values, or materials other than activated carbon (such as conductive polymers, etc.), etc.). In the exemplary aspect, when the content of the activated carbon 1 in the positive electrode active material layer, or the content of the activated carbon 2, or the total content of the activated carbons 1 and 2, namely the weight proportion of the carbon material in the positive electrode active material layer refers to $A_1$, $A_1$ is preferably 15% by weight or greater and 65% by weight or less and more preferably 20% by weight or greater and 50% by weight or less.

[Transition Metal Oxide]

The transition metal oxide preferably enables to intercalate and release lithium ions from the viewpoint of achieving both a high energy density and high output, and maintaining their properties within a wide temperature range, and it is more preferably lithium transition metal oxide having an olivine structure or a spinel structure.

The transition metal oxide used as the positive electrode active material is not particularly restricted. The transition metal oxide include, for example, oxides containing at least one element selected from the group consisting of cobalt (Co), nickel (Ni), manganese (Mn), iron (Fe), vanadium (V), and chromium (Cr). In the present description, the term "transition metal oxide" also includes a transition metal phosphate.

The transition metal oxide includes, specifically, at least one lithium transition metal oxide selected from the group consisting of the formulae:

$Li_{x1}CoO_2$ wherein, in the formula, x1 satisfies $0 \leq x1 \leq 2$, $Li_{x1}NiO_2$ wherein, in the formula, x1 satisfies $0 \leq x1 \leq 2$, $Li_{x1}Ni_yM^1_{(1-y)}O_2$ wherein, in the formula, $M^1$ is at least one element selected from the group consisting of Co, Mn, Al, Fe, Mg and Ti, x1 satisfies $0 \leq x1 \leq 2$, and y satisfies $0.2 < y < 0.97$, $Li_{x1}Ni_{1/3}Co_{1/3}Mn_{1/3}O_2$ wherein, in the formula, x1 satisfies $0 \leq x1 \leq 2$, $Li_{x1}MnO_2$ wherein, in the formula, x1 satisfies $0 \leq x1 \leq 2$, $\alpha$-$Li_{x1}FeO_2$ wherein, in the formula, x1 satisfies $0 \leq x1 \leq 2$, $Li_{x1}VO_2$ wherein, in the formula, x1 satisfies $0 \leq x1 \leq 2$, $Li_{x1}CrO_2$ wherein, in the formula, x1 satisfies $0 \leq x1 \leq 2$, $Li_{x1}Mn_2O_4$ wherein, in the formula, x1 satisfies $0 \leq x1 \leq 2$, $Li_{x1}M^2_yMn_{(2-y)}O_4$ wherein, in the formula, $M^2$ is at least one element selected from the group consisting of Co, Ni, Al, Fe, Mg and Ti, x1 satisfies $0 \leq x1 \leq 2$, and y satisfies $0.2 < y < 0.97$, $Li_{x1}Ni_aCo_bAl_{(1-a-b)}O_2$ wherein, in the formula, x1 satisfies $0 \leq x1 \leq 2$, a satisfies $0.2 < a < 0.97$ and b satisfies $0.2 < b < 0.97$, $Li_{x1}Ni_cCo_dMn_{(1-c-d)}O_2$ wherein, in the formula, x1 satisfies $0 \leq x1 \leq 2$, c satisfies $0.2 < c < 0.97$, and d satisfies $0.2 < d < 0.97$, $Li_{x1}M^3PO_4$ wherein, in the formula, $M^3$ is at least one element selected from the group consisting of Co, Ni, Fe, Mn and Cu, and x1 satisfies $0 \leq x1 \leq 2$, and $Li_zV_2(PO_4)_3$ wherein, in the formula, z satisfies $0 \leq z \leq 3$.

In the present embodiment, if an alkali metal compound other than the positive electrode active material is contained in the positive electrode precursor, the alkali metal compound becomes a dopant source of the alkali metal during pre-doping to enable to pre-dope to the negative electrode, and even if lithium ions are not preliminarily contained (i.e., even if x1=0 in the above formulae) in the transition metal compound, electrochemical charge and discharge can be carried out as a non-aqueous lithium-type electricity storage element.

Among the lithium transition metal oxides described above, from the viewpoint of achieving both a high energy density and high output and maintaining characteristics thereof within a wide temperature range, at least one selected from the group consisting of the following formulae:

$Li_{x2}FePO_4$ wherein, in the formula, x2 satisfies $0.8 \leq x2 \leq 1.2$, $Li_{x2}CoPO_4$ wherein, in the formula, x2 satisfies $0.8 \leq x2 \leq 1.2$, and $Li_{x2}MnPO_4$ wherein in the formula, x2 satisfies $0.8 \leq x2 \leq 1.2$ is preferred.

The mean particle diameter of the lithium transition metal oxide is preferably 0.1 to 20 μm. When the mane particle diameter is 0.1 μm or more, the capacity per electrode volume tends to be increased due to the high density of the active material layer. A smaller mean particle diameter may also lead to the disadvantage of low durability, but a mean particle diameter of 0.1 μm or larger will help avoid such disadvantage. On the other hand, the mean particle diameter of 20 μm or less tends to facilitate adaption for rapid charge/discharge. The mean particle diameter is more preferably 0.5 to 15 μm, even more preferably 1 to 10 μm. Further, when the mean particle diameter of the lithium transition metal oxide is smaller than the mean particle diameter of the carbon material, the lithium transition metal oxide can be arranged in a void formed by the carbon material having a large mean particle diameter, which enables to lower the resistance of the electricity storage element and is preferred.

[Use of Lithium Transition Metal Oxide]

The lithium transition metal oxide may be a single type or a mixture of two or more types of materials, such that the mixture as a whole exhibit the characteristic values described above.

The positive electrode active material may include a material other than the aforementioned lithium transition metal oxide (for example, a conductive polymer, etc.). In the exemplified aspect, when the content ratio of the lithium transition metal oxide is $G_1$, based on the total weight of the positive electrode active material layer, $G_1$ is 1.0% by weight or greater and 50.0% by weight or less, preferably 10% by weight or less and 45.0% by weight or less, and more preferably 15.0% by weight or greater and 40.0% by weight or less. When the content ratio of the transition metal oxide is 1.0% by weight or more, the energy density of the electricity storage element can be further increased and the content ratio of 50.0% by weight or less enables to increase an output of the electricity storage element.

[Use of Positive Electrode Active Material]

When the weight proportion of the carbon material occupied in the positive electrode active material layer is $A_1$, and the weight proportion of the lithium transition metal oxide is $A_2$, $A_2/A_1$ is preferably 0.1 or greater and 2.5 or less, more preferably 0.2 or greater and 2.0 or less, still more preferably 0.3 or greater and 1.2 or less. When $A_2/A_1$ is 0.1 or greater, the bulk density of the positive electrode active material layer is increased and the increased capacity can be obtained. When $A_2/A_1$ is 2.5 or less, the resistance can be reduced due to the high electron conduction between activated carbons, and decomposition of the alkali metal compound can be promoted due to increase in the contact area between the activated carbon and the alkali metal compound.

The content proportion of the positive electrode active material in the positive electrode active material layer is preferably 35% by weight or greater and 95% by weight or less based on the total weight of the positive electrode active material layer of the positive electrode precursor. The upper limit of the content proportion of the positive electrode active material is more preferably 45% by weight or greater and still more preferably 55% by weight or greater. On the other hand, the lower limit of the content proportion of the positive electrode active material is more preferably 90% by weight or less and still more preferably 80% by weight or less. When the content proportion is in this range, favorable charge/discharge characteristics are produced.

[Lithium Compound]

The positive electrode active material layer of the positive electrode precursor of the present embodiment preferably contains a lithium compound other than the positive electrode active material. In the present description, the term "lithium compound" is different from the lithium salt as the electrolyte and the lithium transition metal oxide described above.

(Lithium Compound)

One or more selected from among lithium carbonate, sodium carbonate, potassium carbonate, rubidium carbonate, cesium carbonate, lithium oxide, lithium hydroxide, lithium fluoride, lithium chloride, lithium bromide, lithium iodide, lithium nitride, lithium oxalate and lithium acetate, may be preferably used as lithium compounds according to the present embodiment. Preferred among them are lithium carbonate, sodium carbonate, potassium carbonate, rubidium carbonate, and cesium carbonate, with lithium carbonate being more preferred from the viewpoint of the handleability in air and low hygroscopicity. Such lithium compounds can decompose upon application of a voltage, to function as a dopant source for lithium that is doped to the negative electrode, while also forming pores in the positive electrode active material layer, having excellent electrolytic solution retentivity, and forming a positive electrode with excellent ionic conductivity. When an electrolytic solution in which a lithium salt such as $LiPF_6$, etc., is dissolved in advance described below, is used as the non-aqueous electrolytic solution, such lithium metal carbonate may be used alone. The lithium compound in the positive electrode precursor may be of a single type, or two or more different lithium compounds may be included, or a lithium compound may be used in admixture with another alkali metal carbonate.

Moreover, the positive electrode precursor of the present embodiment may contain at least one lithium compound, and it may also contain, in addition to a lithium compound, one or more from among the following formulas:

oxides such as $M_2O$, etc.,
hydroxides such as MOH, etc.,
halides such as MF or MCl, etc.,
oxalates such as $M_2(CO_2)_2$, etc., and
carboxylates such as RCOOM, wherein in the formula, R is H, an alkyl group or an aryl group, etc., where M is one or more selected from among Na, K, Rb and Cs.

Moreover, the positive electrode precursor may also contain one or more alkaline earth metal carbonates selected from among $BeCO_3$, $MgCO_3$, $CaCO_3$, $SrCO_3$ or $BaCO_3$ and alkaline earth metal oxides, alkaline earth metal hydroxides, alkaline earth metal halides, alkaline earth metal oxalates and alkaline earth metal carboxylates.

The positive electrode precursor is preferably prepared so as to contain the lithium compound contained in the positive electrode precursor at a weight ratio of 10% by weight or greater and 50% by weight or less. When the weight ratio of the lithium compound is 10% by weight or greater, a sufficient amount of lithium ions can be pre-doped to the negative electrode, and the capacity of the non-aqueous lithium-type electricity storage element increases. When the weight ratio of the lithium compound is 50% by weight or less, electron conduction in the positive electrode precursor can be improved, and therefore the lithium compound can be efficiently decomposed.

When the positive electrode precursor contains the above two or more types of alkali metal compounds or an alkaline earth metal compound in addition to the lithium metal compound, the positive electrode precursor is preferably prepared such that the alkali metal compound and the alkaline earth metal compound as total are contained in the positive electrode active material layer at a proportion of 1% by weight or greater and 50% by weight or less per one side of the positive electrode precursor.

[Lithium Compound in Positive Electrode Precursor]

The lithium compound is preferably in particulate form. The mean particle diameter of the lithium compound in the positive electrode precursor is 0.1 µm or larger and 100 µm or smaller. The upper limit for the mean particle diameter of the lithium compound in the positive electrode precursor is more preferably no larger than 50 µm, even more preferably no larger than 20 µm and most preferably no larger than 10 µm. The lower limit for the mean particle diameter of the lithium compound in the positive electrode precursor is, on the other hand, more preferably 0.3 µm or larger and even more preferably 0.5 µm or larger. When the mean particle diameter of the lithium compound is 0.1 µm or larger, the pores remaining after oxidation reaction of the lithium compound at the positive electrode will have sufficient volume to hold the electrolyte solution, and the high-load charge/discharge characteristic will therefore be increased. When the mean particle diameter of the lithium compound is no larger than 100 µm, the surface area of the lithium compound will not be excessively reduced, which thus allows the speed of the oxidation reaction of the lithium compound to be ensured. The upper limit and lower limit ranges for the mean particle diameter of the lithium compound may be combined as desired.

Various methods may be used for pulverization of the lithium compound and any wet and/or dry pulverizer such as a ball mill, a bead mill, a ring mill, a jet mill, a rod mill, and a high-pressure homogenizer, etc., can be used. In wet pulverization in which a lithium compound is dispersed in a dispersion medium and pulverized by using the dispersion, the lithium compound can be formed into powder by volatilizing the dispersion medium with a heating mixer, etc., as necessary after pulverization. Moreover, for the nucleus growth of the lithium compound, a CVD method; a PVD method by using thermal plasma, laser ablation, etc.; a liquid phase process such as precipitation, coprecipitation, deposition, crystallization, etc., can be used. Further, a plurality of the above methods may be combined as needed.

[Lithium Compound in Positive Electrode]

In the present embodiment, when the mean particle diameter of the lithium compound other than the positive electrode active material, which is contained in the positive electrode denotes $X_1$, the expression $0.1\ \mu m \leq X_1 \leq 10.0\ \mu m$ is preferably satisfied. The more preferred range for the mean particle diameter of the lithium compound is $0.5\ \mu m \leq X_1 \leq 5.0\ \mu m$. When $X_1$ is 0.1 µm or greater, the high-load charge/discharge cycle characteristic will be increased by adsorption of fluorine ions produced by high-load charge/discharge cycle. When $X_1$ is no greater than 10.0 µm, the reaction area with the fluorine ions generated by the high-load charge/discharge cycle will be increased, which thus allows the fluorine ions to be adsorbed more efficiently.

The lithium compound other than the positive electrode active material, contained in the positive electrode is preferably 1% by weight or greater and 50% by weight or less and more preferably 2.5% by weight or greater and 25% by weight or less, based on the total weight of the positive electrode active material layer in the positive electrode. When the amount of the lithium compound is 1% by weight or greater, the decomposition reaction of the solvent in the electrolytic solution on the positive electrode under an elevated temperature environment is inhibited by lithium carbonate, thereby to improve the elevated temperature durability. The effect becomes remarkable when the amount of the lithium compound is 2.5% by weight or greater. Further, when the amount of the lithium compound is 50% by weight or less, since the electron conductivity between the positive electrode active materials that is inhibited by the lithium compound, is relatively small, high input/output characteristics are produced, and the amount of 35% by weight or less is particularly preferred from the viewpoint of input/output characteristics. Incidentally, the combination of the lower limits and the upper limits is optional.

[Method of Identifying Lithium Compound in Electrode]

The method of identifying the lithium compound in the positive electrode is not particularly restricted, and it may be identified by the following methods. For identification of the lithium compound, it is preferred to carry out the identification by combining the different analysis methods described below.

For measurement by SEM-EDX, Raman or XPS described below, it is preferable that the non-aqueous lithium-type electricity storage element is disassembled in an argon box, the positive electrode is removed, and the measurement is carried out after washing the electrolyte adhering to the positive electrode surface. Since the solvent used for washing of the positive electrode only needs to wash off the electrolyte adhering to the positive electrode surface, carbonate solvents such as dimethyl carbonate, ethyl methyl carbonate, diethyl carbonate, etc., may be suitably used. The washing method may be, for example, immersion of the positive electrode for 10 minutes or longer in a diethyl carbonate solvent at a 50- to 100-fold amount with respect to the weight of the positive electrode, and subsequent reimmersion of the positive electrode after exchange of the solvent. The positive electrode is then removed from the diethyl carbonate and vacuum-dried, and then subjected to SEM-EDX, Raman and XPS analysis. The vacuum drying conditions may be conditions such that the diethyl carbonate residue in the positive electrode is no greater than 1% by weight in the ranges of a temperature of 0 to 200° C., a pressure of 0 to 20 kPa and a time of 1 to 40 hours. The diethyl carbonate residue can be quantified by GC/MS measurement of water after distilled water washing and liquid volume adjustment described below, based on a calibration curve that was preliminarily drawn.

In ion chromatography described below, the water after washing of the positive electrode with distilled water is analyzed to allow identification of the anion.

When the lithium compound cannot be identified by this analysis method, solid-state $^7$Li-NMR, XRD (X-ray diffraction), TOF-SIMS (Time-Of-Flight Secondary Ion Mass Spectrometry), AES (Auger Electron Spectroscopy), TPD/MS (Temperature Programmed Desorption/Mass Spectrometry), DSC (Differential Scanning Calorimetry), etc., may be used as an alternative analysis method to identify the lithium compound.

[Scanning Electron Microscope-Energy Dispersive X-Ray Analysis (SEM-EDX)]

The lithium compound and positive electrode active material can be discriminated by oxygen mapping with an SEM-EDX image of the positive electrode surface measured at an observational magnification of 1000-4000×. The SEM-EDX image can be measured, for example, with an acceleration voltage of 10 kV, an emission current of 1 μA and a measuring pixel count of 256×256 pixels, and a number of scans of 50. In order to prevent electrification of the sample, the sample may be surface treated with gold, platinum, osmium, etc., by a method such as vacuum vapor deposition or sputtering, etc. For the SEM-EDX image measuring conditions, preferably the luminance and contrast are adjusted so that the brightness has no pixel reaching the maximum luminance, and the mean value of the brightness is a luminance in the range of 40% to 60%. In the obtained oxygen mapping, particles containing bright sections, binarized based on the mean value of brightness, for at least 50% of the area were considered to be lithium compounds.

[Microscopic Raman Spectroscopy]

The lithium carbonate and the positive electrode active material can be discriminated by Raman imaging of the carbonate ion on the positive electrode surface measured at an observational magnification of 1000-4000×. The measuring conditions may be, for example, an excitation light of 532 nm, an excitation light intensity of 1%, 50× long working of objective lens, a diffraction grating of 1800 gr/mm, point scanning as the mapping system (slit: 65 mm, binning: 5 pix), a 1 mm step, an exposure time per point of 3 seconds, a number of scans of 1, and with a noise filter. For the measured Raman spectrum, a straight baseline is set in the range of 1071 to 1104 cm$^{-1}$, a value positive from the baseline is considered a carbonate ion peak, the area is calculated and the frequency is estimated, but the frequency of the noise component is subtracted from the carbonate ion frequency distribution of the carbonate ion peak that is approximated by a Gaussian function.

[X-Ray Photoelectron Spectroscopy (XPS)]

The electronic state of lithium can be analyzed by XPS to discriminate the bonded state of the lithium. The measuring conditions may be, for example, monochromatized AlKα as the X-ray source, an X-ray beam diameter of 100 μmφ (25 W, 15 kV), narrow scan for path energy (58.70 eV), with charge neutralization, narrow scan for sweeping: 10 times (carbon, oxygen), 20 times (fluorine), 30 times (phosphorus), 40 times (lithium), and 50 times (silicon), narrow scan for energy step: 0.25 eV. The surface of the positive electrode is preferably cleaned by sputtering before XPS measurement. As the sputtering conditions, cleaning of the positive electrode surface may be carried out, for example, with an acceleration voltage of 1.0 kV, and 1 minute in a range of 2 mm×2 mm (1.25 nm/min as $SiO_2$).

In the obtained XPS spectrum, the following assignments may be made:

For Li1s bond energy, peaks of 50 to 54 eV as $LiO_2$ or Li—C bond, and peaks of 55 to 60 eV as LiF, $Li_2CO_3$, and $Li_xPO_yF_z$, wherein in the formula, x, y and z are integers of 1 to 6;

for C1s bond energy, a peak of 285 eV as C—C bond, a peak of 286 eV as C—O bond, a peak of 288 eV as COO, and peaks of 290 to 292 eV as $CO_3^{2-}$ and C—F bond;

for O1s bond energy, a peak of 527 to 530 eV as $O^{2-}$ ($Li_2O$), peaks of 531 to 532 eV as CO, $CO_3$, OH, $PO_x$, wherein in the formula, x is an integer of 1 to 4, and $SiO_x$, wherein in the formula, x is an integer of 1 to 4, and peaks of 533 eV as C—O, and $SiO_x$, wherein in the formula, x is an integer of 1 to 4, for F1s bond energy, a peak of 685 eV as LiF, and peaks of 687 eV as C—F bond, $Li_xPO_yF_z$, wherein in the formula, x, y and z are integers of 1 to 6, and $PF_6^-$, for P2p bond energy, peaks of 133 eV as $PO_x$, wherein in the formula, x is an integer of 1 to 4, and peaks of 134 to 136 eV as $PF_x$, wherein in the formula, x is an integer of 1 to 6, and for Si2p bond energy, peaks of 99 eV as Si and silicide, and peaks of 101 to 107 eV as $Si_xO_y$, wherein in the formula, x and y are any integers.

When peaks overlap in the obtained spectrum, the spectrum is preferably assigned upon separating the peaks with the assumption of a Gaussian function or Lorentz function.

The lithium compound that is present can be identified based on the obtained results of measuring the electronic state, and the existing element ratio.

[Ion Chromatography]

A carbonate ion eluted in water can be identified by washing the positive electrode precursor with distilled water and analyzing the water washing fluid by ion chromatography. The columns used may be an ion-exchange type, ion exclusion type and reversed-phase ion pair type. The detector used may be an electric conductance detector, ultraviolet-visible absorption intensity detector, electrochemical detector, etc., and a suppressor system with a suppressor installed before the detector, or a non-suppressor system without installation of a suppressor by using a solution with low electric conductance as the eluent, may be used. Moreover, the measurement can also be carried out by combining a mass spectrometer or a charged particle detector with a detector.

The sample holding time is the same for each ion species component if the conditions such as the column, eluent, etc., used are fixed, while the size of the peak response differs for each ion species but is proportional to the concentration. By premeasuring a standard solution of known concentration with ensured traceability, it is possible to qualitatively and quantitatively analyze the ion species components.

When the lithium compound cannot be identified by the methods described above, solid-state $^7$Li NMR, XRD (X-ray diffraction), TOF-SIMS (Time-Of-Flight Secondary Ion Mass Spectrometry), AES (Auger Electron Spectroscopy), TPD/MS (Temperature Programmed Desorption/Mass Spectrometry), DSC (Differential Scanning Calorimetry), etc., may be used as an alternative analysis method to identify the lithium compound.

[Method of Quantifying Lithium Compound]

A method of quantifying the lithium compound in the positive electrode will now be described.

The positive electrode may be washed with an organic solvent and subsequently washed with distilled water, and the lithium compound can be quantified from the change in positive electrode weight before and after the washing with distilled water. The area of the positive electrode to be measured is not particularly restricted, but from the viewpoint of reducing measurement variation it is preferably 5 cm² or greater and 200 cm² or smaller and more preferably 25 cm² or greater and 150 cm² or smaller. Measurement reproducibility can be ensured if the area is at least 5 cm². The handleability of the sample will be excellent if the area is no greater than 200 cm². Washing with an organic solvent is sufficient if it can remove decomposition products of the non-aqueous electrolytic solution, that have accumulated on the positive electrode surface, and therefore while the organic solvent is not particularly restricted, elution of the lithium compound can be inhibited by using an organic solvent with a solubility of no greater than 2% for the lithium compound, which is therefore preferred. For example, polar solvents such as methanol, acetone, etc., may be suitably used.

The method of washing the positive electrode is thorough immersion of the positive electrode for 3 days or longer in a methanol solution at a 50- to 100-fold amount with respect to the weight of the positive electrode. During the procedure, certain measures are preferred such as capping the vessel so that the methanol does not volatilize off. The positive electrode is then removed from the methanol and subjected to vacuum drying (under conditions such that the methanol residue in the positive electrode is no greater than 1% by weight under the conditions of a temperature of 100 to 200° C., a pressure of 0 to 10 kPa and a time of 5 to 20 hours. The methanol residue can be quantified by GC/MS measurement of water after distilled water washing with distilled water, based on the calibration curve preliminarily prepared, as described below), and the weight of the positive electrode at that time is recorded as $M_0$ (g). The positive electrode is thoroughly immersed for 3 days or longer in distilled water at a 100-fold amount (100 $M_0$ (g)) with respect to the weight of the positive electrode. During the procedure, certain measures are preferred such as capping the vessel so that the distilled water does not volatilize off. After immersion for 3 days or longer, the positive electrode is removed from the distilled water (for the aforementioned ion chromatography measurement, the liquid volume is adjusted so that the amount of distilled water is 100 $M_0$ (g)), and vacuum drying is carried out in the same manner as for the methanol washing described above. The weight of the positive electrode at this time is recorded as $M_1$ (g), and then the positive electrode active material layer is removed from the current collector by using a spatula, brush, bristles, etc., for measurement of the weight of the obtained positive electrode current collector of the positive electrode. When the weight of the obtained positive electrode current collector is denoted as $M_2$ (g), the proportion Z (% by weight) of the lithium compound in the positive electrode can be calculated by the following equation.

$$Z=100\times[1-(M_1-M_2)/(M_0-M_2)]$$

[Mean Particle Diameter of Lithium Compound and Positive Electrode Active Material]

Preferably, the expression 0.1 µm≤$X_1$≤10 µm is satisfied, where $X_1$ is the mean particle diameter of the lithium compound and the expressions 2 µm≤$Y_1$≤20 µm and $X_1$<$Y_1$ are satisfied where $Y_1$ is the mean particle diameter of the positive electrode active material. More preferably the range for $X_1$ is 0.5 µm≤$X_1$≤5 µm, and for $Y_1$, the range is 3 µm≤$Y_1$≤10 µm. When $X_1$ is 0.1 µm or greater, it will be possible to have lithium compound remain in the positive electrode after pre-doping of lithium, and therefore the durability for high-load charge/discharge cycle will be increased by adsorption of fluorine ions produced by high-load charge/discharge cycling. When $X_1$ is no greater than 10 µm, the reaction area with the fluorine ions generated by the high-load charge/discharge cycle will increase, which allows the fluorine ions to be adsorbed more efficiently. When $Y_1$ is 2 µm or greater, it will be possible to ensure electron conductivity between the positive electrode active materials. When $Y_1$ is no greater than 20 µm, on the other hand, the reaction area with the electrolyte ion will increase to obtain high input/output characteristic. When $X_1$<$Y_1$, then the lithium compound will fill in the gaps formed between the positive electrode active materials, which allows the electron conductivity between the positive electrode active materials to be ensured while increasing the energy density.

The method of measuring $X_1$ and $Y_1$ is not particularly restricted, and they may be calculated from an SEM image and SEM-EDX image of the positive electrode cross-section. The method of forming the positive electrode cross-section may employ BIB processing in which an Ar beam is irradiated from above the positive electrode, and a smooth cross-section is created along the edges of a masking shield set directly above the sample. When the positive electrode contains lithium carbonate, the carbonate ion distribution can be determined by measurement with Raman imaging of the positive electrode cross-section.

[Method of Discriminating Lithium Compound and Positive Electrode Active Material]

The lithium compound and positive electrode active material can be discriminated by oxygen mapping with an SEM-EDX image of the positive electrode cross-section measured at an observational magnification of 1000-4000×. For the SEM-EDX image measuring conditions, preferably the luminance and contrast are adjusted so that the brightness has no pixel reaching the maximum luminance, and the mean value of the brightness is a luminance in the range of 40% to 60%. In the obtained oxygen mapping, particles containing bright sections, binarized based on the mean value of brightness, for at least 50% of the area were considered to be lithium compound.

[Method of Calculating $X_1$ and $Y_1$]

$X_1$ and $Y_1$ can be determined by analysis of an image obtained from positive electrode cross-sectional SEM-EDX, measured in the same visual field as the positive electrode cross-sectional SEM. The cross-sectional area S is determined for all of the particles X and Y observed in the cross-sectional SEM image, X being lithium compound particles discriminated in the SEM image of the positive electrode cross-section, and Y being the other particles which are particles of the positive electrode active material, and the particle diameter d is determined by calculation by using the following equation ($\pi$ is the circular constant.):

$$d = 2 \times (S/\pi)^{1/2}$$

The obtained particle diameter d is used to determine the volume-average particle diameters $X_0$ and $Y_0$, by the following equation:

$$X_0(Y_0) = \Sigma[4/3\pi \times (d/2)^3 \times d] / \Sigma[4/3\pi \times (d/2)^3]$$

Measurement is carried out at five or more locations varying the visual field of the positive electrode cross-section, and the mean values of $X_0$ and $Y_0$ are recorded as the mean particle diameters $X_1$ and $Y_1$.

[Optional Components of Positive Electrode Active Material Layer]

If necessary, the positive electrode active material layer of the present embodiment may also contain optional components such as a conductive filler, binder, dispersion stabilizer, etc., in addition to the positive electrode active material and lithium compound.

The conductive filler is not particularly restricted, and includes, for example, acetylene black, Ketjen black, vapor grown carbon fibers, graphite and carbon nanotubes, as well as mixtures thereof, etc. The amount of conductive filler is preferably 0 parts by weight or greater and 30 parts by weight or less, more preferably 0.01 parts by weight or greater and 20 parts by weight or less, and still more preferably 1 part by weight or greater and 15 parts by weight or less with respect to 100 parts by weight of the positive electrode active material. When the amount of the conductive filler to be used is greater than 30 parts by weight, the content proportion of the positive electrode active material in the positive electrode active material layer becomes less, and the energy density per volume of the positive electrode active material layer is reduced, which is not preferred.

The binder is not particularly restricted, and for example, PVdF (polyvinylidene difluoride), PTFE (polytetrafluoroethylene), polyimide, latex, styrene-butadiene copolymer, fluorine rubber, an acrylic copolymer, etc., may be used. The amount of binder used is preferably 1 part by weight to 30 parts by weight, with respect to 100 parts by weight of the positive electrode active material. It is more preferably 3 parts by weight or greater and 27 parts by weight or less and even more preferably 5 parts by weight or greater and 25 parts by weight or less. When the amount of binder is 1 weight % or greater, adequate electrode strength will be exhibited. When the amount of binder is no greater than 30 parts by weight, on the other hand, high input/output characteristics will be exhibited without preventing movement or diffusion of ions in and from the positive electrode active material.

The dispersion stabilizer is not particularly restricted, and for example, PVP (polyvinylpyrrolidone), PVA (polyvinyl alcohol), cellulose derivatives, etc., may be used. The amount of the dispersion stabilizer used is preferably 0 parts by weight or greater or 0.1 parts by weight or greater and no greater than 10 parts by weight with respect to 100 parts by weight of the positive electrode active material. When the amount of dispersion stabilizer is no greater than 10 parts by weight, high input/output characteristics will be exhibited without preventing movement or diffusion of ions in and from the positive electrode active material.

[Positive Electrode Current Collector]

The material constituting the positive electrode current of the present embodiment is not particularly restricted provided it is a material that has high electron conductivity and does not undergo degradation by elution into the electrolytic solution or reaction with the electrolyte or ion, but a metal foil is preferred. The positive electrode current collector in the non-aqueous lithium-type electricity storage element of the present embodiment is more preferably an aluminum foil.

The metal foil may be a common metal foil without ruggedness or through-holes, or it may be a metal foil having ruggedness formed by embossing, chemical etching, electrolytic deposition, blasting, etc., or it may be a metal foil having through-holes, such as an expanded metal, punching metal, etching foil, etc.

In particular, the positive electrode current collector is preferably nonporous from the viewpoint of facilitation of electrode fabrication and a high ion conductivity.

The thickness of the positive electrode current collector is not particularly restricted provided that the shape and strength of the positive electrode can be maintained, but 1 to 100 μm, for example, is preferred.

[Production of Positive Electrode Precursor]

In the present embodiment, the positive electrode precursor that is to be the positive electrode of the non-aqueous lithium-type electricity storage element can be produced by publicly known production techniques for electrodes for lithium ion batteries, electrical double layer capacitors, etc. For example, the positive electrode active material and lithium compound, as well as the other optional components that are used as necessary, may be dispersed and dissolved in water or an organic solvent to prepare a slurry-like coating solution, and one or both sides of the positive electrode current collector is coated with the coating solution to form a coating film, which is dried to obtain a positive electrode precursor. Further, the obtained positive electrode precursor may also be pressed to adjust the film thickness or bulk density of the positive electrode active material layer. An alternative method may also be used, in which the positive electrode active material and lithium compound, as well as the other optional components used as necessary, are mixed in a dry state without using a solvent, and the obtained mixture is subjected to press molding, after which a conductive adhesive is used for attachment to the positive electrode current collector.

The coating solution of the positive electrode precursor may also be prepared by dry blending all or a portion of the various starting material powders containing the positive electrode active material, and then adding water or an organic solvent, and/or adding a liquid or slurry-like substance comprising a binder or dispersion stabilizer dissolved or dispersed in them. Moreover, the coating solution may also be prepared by adding various starting powders containing the positive electrode active material, to a liquid or slurry-like substance comprising a binder or dispersion stabilizer dissolved or dispersed in water or an organic solvent. The method of dry blending may be, for example, premixing in which a ball mill, etc., is used to premix the positive electrode active material and lithium compound, and a conductive filler if necessary, and the low-conductivity lithium compound is coated with the conductive material. This will facilitate the lithium compound to decompose in the positive electrode precursor in the lithium doping step described below. When water is used as the solvent for the coating solution, the coating solution may become alkaline by addition of the lithium compound, and therefore a pH modifier may be added as necessary.

Preparation of the coating solution of the positive electrode precursor is not particularly restricted, and dispersing machines such as a homodisperser or multiscrew dispersing machine, planetary mixer, thin-film rotating-type high speed mixer, etc., may be suitably used. In order to obtain a coating solution in a satisfactorily dispersed state, it is preferred for the dispersion to be at a peripheral velocity of 1 m/s or greater and 50 m/s or less. The peripheral velocity of 1 m/s or greater is preferred because this will facilitate each material to satisfactorily dissolve or disperse. The peripheral velocity of no greater than 50 m/s is also preferred because each material will not be broken down by heat or shear force during dispersion, and reaggregation will not take place.

The degree of dispersion of the coating solution is preferably to a granularity of 0.1 μm or greater and 100 μm or smaller, as measured with a fineness gauge. The upper limit for the degree of dispersion is more preferably to a granularity of no greater than 80 μm, and more preferably to a granularity of no greater than 50 μm. It is not preferred when the granularity is smaller than 0.1 μm, because the size will be less than the particle diameter of each starting powder containing the positive electrode active material, which means that the material will have been crushed during preparation of the coating solution. When the granularity is no greater than 100 μm, there will be no clogging during discharge of the coating solution or formation of streaks in the coating film, etc., which allows more stable coating.

The viscosity (ηb) of the coating solution of the positive electrode precursor is preferably 1,000 mPa·s or higher and 20,000 mPa·s or lower, and more preferably 1,500 mPa·s or higher and 10,000 mPa·s or lower, and still more preferably 1,700 mPa·s or higher and 5,000 mPa·s or lower. When the viscosity (ηb) is 1,000 mPa·s or higher, liquid dripping during formation of the coating film will be inhibited, and the coating film width and thickness can be satisfactorily controlled. When it is no higher than 20,000 mPa·s, there will be less pressure loss in the flow channel of the coating solution when a coating machine is used, which facilitates stable coating to be carried out, and allows control to less than the prescribed coating film thickness.

Moreover, the TI value (thixotropy index value) of the coating solution is preferably 1.1 or greater, more preferably 1.2 or greater, and even more preferably 1.5 or greater. When the TI value is 1.1 or greater, the coating film width and thickness can be satisfactorily controlled.

Formation of a coating film of the positive electrode precursor is not particularly restricted, and a coating machine such as a die coater or comma coater, knife coater, gravure coating machine, etc., may be suitably used. The coating film may be formed by monolayer coating or by multilayer coating. In the case of multilayer coating, the coating solution compositions may be adjusted so that the lithium compound content differs within each layer of the coating film. Moreover, the coating speed is preferably 0.1 m/minute or faster and 100 m/minute or slower. The coating speed is more preferably 0.5 m/minute or faster and 70 m/minute or slower, and even more preferably 1 m/minute or faster and 50 m/minute or slower. When the coating speed is 0.1 m/minute or faster, stable coating will be possible. When it is 100 m/minute or slower, on the other hand, the coating precision can be adequately ensured.

Drying of the coating film of the positive electrode precursor is not particularly restricted, and a drying method such as hot air drying or infrared ray (IR) drying may be suitably employed. Drying of the coating film may be drying at a single temperature, or it may be drying while varying the temperature in different stages. Several drying methods may also be used in combination for drying. The drying temperature is preferably 25° C. or higher and 200° C. or lower, more preferably 40° C. or higher and 180° C. or lower, and even more preferably 50° C. or higher and 160° C. or lower. When the drying temperature is 25° C. or higher, it will be possible to adequately volatilize off the solvent in the coating film. When it is no higher than 200° C., on the other hand, it will be possible to reduce cracking of the coating film by rapid volatilization of the solvent or maldistribution of the binder by migration, and oxidation of the positive electrode current collector or positive electrode active material layer.

Pressing of the positive electrode precursor is not particularly restricted, and a pressing machine such as a hydraulic press or vacuum pressing machine, etc., may be suitably used. The film thickness, bulk density and electrode strength of the positive electrode active material layer can be adjusted by the pressing pressure, the gap, and the surface temperature of the pressed portion, as described below.

The pressing pressure is preferably 0.5 kN/cm or greater and 20 kN/cm or less, more preferably 1 kN/cm or greater and 10 kN/cm less, and even more preferably 2 kN/cm or greater and 7 kN/cm or less. When the pressing pressure is 0.5 kN/cm or greater, it will be possible to adequately increase the electrode strength. When it is no greater than 20 kN/cm, on the other hand, distortion or wrinkles will not be produced in the positive electrode precursor, and adjustment can be made to the desired film thickness and bulk density for the positive electrode active material layer.

Moreover, the gap between the press rolls may be set to a desired value depending on the film thickness of the dried positive electrode precursor, so that the desired film thickness and bulk density of the positive electrode active material layer is obtained. The pressing speed may also be set to the desired speed, so as to avoid distortion and wrinkles in the positive electrode precursor.

Furthermore, the surface temperature of the pressed portion may be room temperature, or it may be heated instead, if necessary. In the case of heating, the lower limit for the surface temperature of the pressed portion is preferably at least the melting point of the binder used minus 60° C., more preferably at least the melting point minus 45° C. and even more preferably at least the melting point minus 30° C. In the case of heating, the upper limit for the surface temperature of the pressed portion is preferably no higher than the melting point of the binder used plus 50° C., more preferably no higher than the melting point plus 30° C. and even more preferably no higher than the melting point plus 20° C. For example, when PVdF (polyvinylidene difluoride: melting point=150° C.) is used as the binder, heating to 90° C. or higher and 200° C. or lower is preferred, and more preferably heating to 105° C. or higher and 180° C. or lower and even more preferably 120° C. or higher and 170° C. or lower. Moreover, when styrene-butadiene copolymer (melting point: 100° C.) is used as the binder, it is preferably heated to 40° C. or higher and 150° C. or lower, or heated to more preferably 55° C. or higher and 130° C. or lower and even more preferably 70° C. or higher and 120° C. or lower.

The melting point of the binder can be determined by the endothermic peak position in DSC (Differential Scanning Calorimetry). For example, by using a "DSC7" differential scanning calorimeter manufactured by Perkin-Elmer, Inc., 10 mg of sample resin is set in the measuring cell and the temperature is increased from 30° C. to 250° C. at a temperature-elevating rate of 10° C./min, in a nitrogen gas atmosphere, the melting point being the endothermic peak temperature during the temperature elevation.

Moreover, pressing may also be carried out multiple times while varying the conditions including the pressing pressure, gap, speed, and pressed portion surface temperature.

The basis weight of the positive electrode active material layer is preferably from 20 g·m$^{-2}$ or greater and 150 g·m$^{-2}$ or less per one side of the positive electrode current collector, more preferably from 25 g·m$^{-2}$ or greater and 120 g·m$^{-2}$ or less per one side and still more preferably 30 g·m$^{-2}$ or greater and 80 g·m$^{-2}$ or less. When the basis weight is 20 g·m$^2$ or greater, a sufficient charge/discharge capacity can be produced. On the other hand, when the basis weight is 150 g·m$^{-2}$ or less, the ion diffusion resistance in the electrode can be maintained low. Therefore, sufficient output characteristics can be obtained, and the cell volume can be reduced, and thereby the energy density can be increased. The upper and lower limits of the range of the basis weight of the positive electrode active material layer can be arbitrarily combined.

The thickness of the positive electrode active material layer is preferably 20 μm or greater and 200 μm or less for each side of the positive electrode current collector. The thickness of the positive electrode active material layer per side is more preferably 25 μm or greater and 140 μm or less, and even more preferably 30 μm or greater and 100 μm or less, for each side. When the thickness is 20 μm or greater, sufficient charge/discharge capacity can be produced. When the thickness is 200 μm or less, on the other hand, the ion diffusion resistance in the electrode can be maintained low. Therefore, not only a sufficient output characteristic can be obtained but also the cell volume can be reduced, which enables to increase the energy density. The upper and lower limits of the range of the thickness of the positive electrode active material layer can be arbitrarily combined. Incidentally, when the current collector has through-holes or ruggedness, the thickness of the positive electrode active material layer is the mean value of the thickness for each side at the sections of the current collector without through-holes or ruggedness.

[Positive Electrode After Lithium Doping Step]

The bulk density of the positive electrode active material layer at the positive electrode after the lithium doping step described below is preferably 0.25 g/cm$^3$ or greater and more preferably in the range of 0.30 g/cm$^3$ or greater and 1.3 g/cm$^3$ or less. When the bulk density of the positive electrode active material layer is 0.25 g/cm$^3$ or greater, it will be possible to exhibit high energy density and to miniaturize the electricity storage element. On the other hand, when the bulk density is no higher than 1.3 g/cm$^3$, diffusion of the electrolytic solution in the pores of the positive electrode active material layer will be adequate, and a high output characteristic will be obtained.

[Carbon Material and Lithium Transition Metal Oxide in Positive Electrode Active Material Layer]

When the weight proportion of the carbon material contained in the positive electrode active material layer is $A_1$, the weight proportion of the lithium transition metal oxide is $A_2$, and the weight proportion of the other components is $A_3$, they can be determined by the following method, although the method of quantifying these values is not particularly restricted.

The area of the positive electrode to be measured is not particularly limited but is preferably 5 cm$^2$ or greater and 200 cm$^2$ or less, and more preferably 25 cm$^2$ or greater and 150 cm$^2$ or less from the viewpoint of reducing measurement variations. When the area is 5 cm$^2$ or greater, reproducibility of measurement is ensured. When the area is 200 cm$^2$ or less, the sample is excellent in handleability.

First, the non-aqueous lithium-type electricity storage element is disassembled in an Ar box installed in a room at 23° C., controlled at a dew point of −90° C. or lower and an oxygen concentration of 1 ppm or less, and then a positive electrode is taken out. The taken-out positive electrode was immersed and washed in dimethyl carbonate (DMC), and then dried in a vacuum in a side box while keeping the atmosphere unexposed. The weight of the positive electrode obtained after vacuum drying ($M_0$) is measured. Subsequently, it is immersed in distilled water at a 100- to 150-fold amount with respect to the weight of the positive electrode for 3 days or longer to elute components other than the carbon material and the lithium transition metal oxide into the water. It is preferable to cover the container during immersion so that the distilled water does volatize off. After immersion for 3 days or longer, the positive electrode is taken out from distilled water and vacuum-dried in the same manner as described above. The weight of the obtained positive electrode ($M_1$) is measured. Subsequently, the positive electrode active material layer with which one or both surfaces of the positive electrode current collector were coated is removed by using a spatula, a brush, a bristles, etc. The weight of the remaining positive electrode current collector ($M_2$) is measured, and $A_3$ is calculated by the following equation (1).

$$A_3 = (M_0 - M_1)/(M_0 - M_2) \times 100 \quad (1)$$

Subsequently, in order to calculate $A_1$ and $A_2$, a TG curve is measured for the positive electrode active material layer obtained by removing the alkali metal compound under the following conditions.

Sample pan: platinum
Gas: under atmospheric environment or compressed air
Temperature-elevated rate: 0.5° C./min or less
Temperature range: 25° C. to 500° C. or higher and the melting point of lithium transition metal oxide minus 50° C. or lower.

The weight at 25° C. in the obtained TG curve is $M_3$, and the weight at the first temperature at which the weight reduction rate becomes $M_3 \times 0.01$/min or less at a temperature of 500° C. or higher is $M_4$.

All carbon materials are oxidized and calcinated by heating at a temperature of 500° C. or lower under an oxygen-containing atmosphere (for example, an air atmosphere). On the other hand, the weight of the lithium transition metal oxide is not decreased up to the melting point of the lithium transition metal oxide minus 50° C. even in an oxygen-containing atmosphere.

Therefore, the content of the lithium transition metal oxide in the positive electrode active material layer $A_2$ can be calculated by the following equation (2).

$$A_2 = (M_4/M_3) \times \{1-(M_0-M_1)/(M_0-M_2)\} \times 100 \quad (2)$$

Further, the content of the carbon material in the positive electrode active material layer can $A_1$ be calculated by the following equation (3).

$$A_1 = \{(M_3-M_4)/M_3\} \times \{1-(M_0-M_1)/(M_0-M_2)\} \times 100 \quad (3)$$

The element ratio of the lithium transition metal oxide can be identified by analyzing the positive electrode active material remaining after the heat treatment by ICP measurement, XRD measurement, XPS measurement, XAFS measurement, or a combination thereof.

[Solid-State $^7$Li-NMR in Positive Electrode Active Material Layer]

The non-aqueous lithium-type electricity storage element has a component A having a signal in a range of −2 to 2.5 ppm and a component B having a signal in a range of −6 to −2.5 ppm observed in a solid-state $^7$Li-NMR spectrum of the positive electrode active material layer, and has a signal area ratio a/b of 1.5 to 20.0, where a signal area of the component A denotes a and a signal area of the component B denotes b.

Throughout the present description, the amount ratio of lithium contained in the positive electrode active material layer can be calculated by the soli-state $^7$Li-NMR spectrum according to the following method.

The measurement apparatus used for solid-state $^7$Li-NMR may be a commercially available apparatus. Measurement is carried out by the single pulse method in a room temperature environment, with a magic-angle spinning rotational speed of 14.5 kHz and an irradiation pulse width set to a 45° pulse. The repeated latency was set to sufficient values when measured.

A 1 mol/L aqueous lithium chloride solution is used as the shift reference, and the shift position measured separately as an external standard is defined as 0 ppm.

In the solid-state $^7$Li-NMR spectrum of the positive electrode active material layer obtained under the aforementioned conditions, the signal area ratio a/b can be calculated, where a signal area of the component A having a signal of −2 ppm to 2.5 ppm is a, and a signal area of the component B having a signal of −6 ppm to −3 ppm is b, respectively for signals observed in a range from −30 ppm to 30 ppm.

When the signal A and the signal B overlap, the area ratios of both components each are obtained by separating the peaks with the assumption of the peak top of the signal A at −2 ppm to 2.5 ppm and the peak top of the signal B at −6 ppm to −2.5 ppm. The peaks each were fitted by the least-square method under the assumption that the peaks consist of 25% of a Gaussian curve and 75% of a Lorentz curve and the half width is in the range of 300 Hz to 1000 Hz.

In the present embodiment, the area ratio a/b of the signal area a of the component A to the signal area b of the component B is 1.5 to 20.0, preferably 2.5 to 15.0, and more preferably 3.5 to 10.0. When the area ratio a/b is 1.5 or greater, a portion of the active sites interacting with Li ions on the surface of the activated carbon reacts with the electrolytic solution, and diffusion of Li ions at an interface between the positive electrode active material layer and the electrolytic solution as well as inside the positive electrode active material layer, is not prevented, which enables to increase an output of the electricity storage element. When the area ratio a/b is 15.0 or less, a number of active sites interacting with Li ions on the surface of the activated carbon increases, and thereby the energy density of the electricity storage element can be increased.

The principle of achieving both a high energy density and high output by adjusting the area ratio a/b within the range of 1.5 to 20.0, is not clear, but is assumed as follows. In the present embodiment, active sites that interact reversibly with Li ions have been formed on the surface of the activated carbon contained in the positive electrode active material of the non-aqueous lithium-type electricity storage element, which is assumed that the component B is attributed to the active sites. The active site has made the active site precursor that was formed via the lithium doping step described below activate by charge/discharge treatment in a cell using a positive electrode precursor containing a Li compound. The active site enables the activated carbon in the positive electrode active material to store greater electricity than the capacity of the active material originally possessed, and therefore the battery capacity can be improved. Moreover, the active site that reversibly interacts with Li ions has a relatively low interaction energy with Li ions, and therefore diffusion of Li ions is not prevented even in an environment at a temperature lower than room temperature, and a high output can be maintained.

Incidentally, the active site precursor is formed when the lithium compound in the positive electrode precursor undergoes an oxidative decomposition reaction in the lithium doping step. Therefore, the active site precursor is not formed under the condition that the oxidative decomposition reaction does not sufficiently proceed, and it is not produced even if a charge/discharge treatment is carried out after the lithium doping step. The condition under which the oxidative decomposition reaction does not sufficiently proceed, includes, for example, the case where the active material ratio of the positive electrode active material layer or the negative electrode active material layer, or the basis weight ratio between the positive electrode active material layer and the negative electrode active material layer is largely outside a desirable range, etc., or the case where the charge/discharge treatment step in the lithium doping step is inappropriate.

[Negative Electrode]

The negative electrode has a negative electrode current collector, and a negative electrode active material layer present on one or both sides thereof.

The negative electrode active material layer contains a negative electrode active material that can intercalate and release lithium ions. It may also contain optional components such as a conductive filler, binder, dispersion stabilizer, etc., as necessary.

Throughout the present embodiment, "nonporous negative electrode current collector" refers to a negative electrode current collector that, at least in the region, the surface of which has been coated with the negative electrode active material layer, lacks pores that would allow lithium ions to pass through the negative electrode current collector and result in uniformity of lithium ions on the front and back sides of the negative electrode. Therefore, it does not exclude negative electrode current collectors having very small or microlevel pores, or negative electrode current collectors having pores in regions uncoated with the negative electrode active material layer, within a range in which the effect of the invention is produced. According to the present embodiment, at least the region of the negative electrode current collector that is coated with the negative electrode active material layer is nonporous, and the remaining sections of the negative electrode current collector that are not coated with the negative electrode active material may either have or lack pores.

[Negative Electrode Active Material]

The negative electrode active material used may be a substance capable of intercalating and releasing lithium ions. At least two types of negative electrode active materials are preferably used from the viewpoint of achieving to have an output and capacity of the electricity storage element and maintaining them in a wide temperature range.

The negative electrode active material includes, for example, carbon materials, titanates, silicon, silicon oxides, silicon alloys, silicon compounds, tin, tin compounds, etc. Preferably, the content of the carbon material with respect to the total amount of the negative electrode active material is 50% by weight or greater, and more preferably 70% by weight or greater. The carbon material content may be 100% by weight, but in order to obtain a satisfactory effect by combined use with other materials, it is preferably, for example, no greater than 90% by weight and may even be 80% by weights or less.

The negative electrode active material is preferably doped with lithium ion. The lithium ion doped in the negative electrode active material, as described throughout the present description, includes three major forms.

The first form is lithium ion that is intercalated in advance in the negative electrode active material, as a design value, before fabrication of the non-aqueous lithium-type electricity storage element.

The second form is lithium ion intercalated in the negative electrode active material during fabrication and shipping of the non-aqueous lithium-type electricity storage element.

The third form is lithium ion intercalated in the negative electrode active material after the non-aqueous lithium-type electricity storage element has been used as a device.

By doping the negative electrode active material with lithium ions, it is possible to favorably control the capacity and operating voltage of the obtained non-aqueous lithium-type electricity storage element.

The carbon materials include, for example, hardly graphitizable carbon materials; easily graphitizable carbon materials; carbon black; carbon nanoparticles; activated carbon; artificial graphite; natural graphite; graphitized mesophase carbon microspheres; graphite whiskers; amorphous carbonaceous materials such as polyacene-based materials, etc.; carbonaceous materials obtained by heat treatment of carbonaceous precursors such as petroleum-based pitch, coal-based pitch, mesocarbon microbeads, coke, synthetic resins (for example, phenol resins, etc.), etc.; thermal decomposition products of furfuryl alcohol resins or novolac resins; fullerenes; carbon nanohorns; and carbon materials that are composites of the foregoing.

Among them, from the viewpoint of lowering the resistance of the negative electrode, a composite carbon material is preferred, which is obtained by heat treating one or more of the aforementioned carbon materials (hereunder referred to as "base material") in the copresence of the carbonaceous material precursor, to form a composite of the base material with the carbonaceous material derived from the carbonaceous material precursor. The carbonaceous material precursor to be used, which becomes the composite carbon material by the heat treatment, is not particularly restricted, but it is preferably petroleum-based pitch or coal-based pitch. Before the heat treatment, the base material and the carbonaceous material precursor may be mixed at a temperature higher than the melting point of the carbonaceous material precursor. The heat treatment temperature may be a temperature such that the component generated by volatilization or thermal decomposition of the carbonaceous material precursor used becomes a carbonaceous material, and it is preferably 400° C. or higher and 2500° C. or lower, more preferably 500° C. or higher and 2000° C. or lower, and even more preferably 550° C. or higher and 1500° C. or lower. The atmosphere for heat treatment is not particularly restricted but is preferably a non-oxidizing atmosphere.

[Negative Electrode Active Material Layer]

The negative electrode active material layer preferably contains at least two types of negative electrode active materials consisting of carbon materials.

The carbon materials include, for example, hardly graphitizable carbon materials; easily graphitizable carbon materials; carbon black; carbon nanoparticles; activated carbon; artificial graphite; natural graphite; graphitized mesophase carbon microspheres; graphite whiskers; amorphous carbonaceous materials such as polyacene-based materials, etc.; carbonaceous materials obtained by heat treatment of carbon precursors such as petroleum-based pitch, coal-based pitch, mesocarbon microbeads, coke and synthetic resins (for example, phenol resins, etc.), etc.; thermal decomposition products of furfuryl alcohol resins or novolac resins; fullerenes; carbon nanohorns; and carbon materials that are composites of the foregoing.

Among the two types of the negative electrode active materials, the mean particle diameter of at least one type of the negative electrode active material is preferably 1 μm or greater and 15 μm or less and more preferably 1.5 μm or greater and 10 μm or less. When the negative electrode active material layer contains a negative electrode active material having a mean particle diameter of 1 μm or greater, the electrode strength of the negative electrode can be increased, and the high-load charge/discharge characteristics of the electricity storage element can be improved. When the negative electrode active material layer contains the negative electrode active material having a mean particle diameter of 15 μm or less, the bulk density of the negative electrode can be increased, which enables to increase the energy density of the electricity storage element.

In the present embodiment, the negative electrode active material layer preferably contains the negative electrode active material A having a specific surface area of 0.5 $m^2/g$ or greater and 35 $m^2/g$ or less calculated by the BET method based on the weight of the negative electrode active material, and the negative electrode active material B having a specific surface area of 50 $m^2/g$ or greater and 1,500 $m^2/g$ or less.

The ratio of the negative electrode active material B is preferably 1.0% by weight to 45.0% by weight, more preferably 2.0% by weight to 35.0% by weight, and still more preferably 1.0% by weight to 20.0% by weight, based on the total amount of the negative electrode active materials contained in the negative electrode active material layer. When the ratio of the negative electrode active material B is 1.0% by weight or greater, the diffusion rate of Li ions in the negative electrode active material layer can be increased, and the output of the electricity storage element can be increased. When the ratio of the negative electrode active material B is 45.0% by weight or less, the amount of Li doping per unit area can be increased, which enables sufficient reduction of the negative electrode potential in the lithium doping step described below and the increase in the energy density of the electricity storage element.

The doping amount of lithium ion per unit weight of the negative electrode active material A is preferably 50 mAh/g or greater and 520 mAh/g or less and more preferably 150 mAh/g or greater and 460 mAh/g or less.

Moreover, the doping amount of lithium ion per unit weight of the negative electrode active material B is preferably 530 mAh/g or greater and 2500 mAh/g or less and more preferably 600 mAh/g or greater and 2000 mAh/g or less.

When the doping amounts of lithium ion of the negative electrode active materials A and B are within the aforementioned ranges, in the lithium doping step described below, the negative electrode potential can be sufficiently reduced even when mixing two types of the carbon materials, from which the energy density of the electricity storage element can be increased.

At least one selected from the group consisting of a graphite-based material, soft carbon and hard carbon, or a composite carbon material A comprising at least one thereof as a base material can be used as the negative electrode active material A.

The graphite-based material used for the negative electrode active material A is not particularly limited, and for example, artificial graphite, natural graphite, low crystallinity graphite, graphitized mesophase carbon microspheres, graphite whiskers, and graphite having a high specific surface area, etc., can be used. The mean particle diameter of the graphite-based material is preferably 1 μm or greater and 10 μm or less and more preferably 2 μm or greater and 8 μm or less. The graphite-based material described above may be used as the negative electrode active material A, however, from the viewpoint of lowering the resistance, the graphite-based material can be more preferably used by carrying out a composite treatment as described below.

A carbonaceous material precursor to be used as the negative electrode active material A is a solid, liquid or solvent-soluble organic material that allows the carbonaceous material to be composited with a graphite-based material by heat treatment. The carbonaceous material precursor is not particularly restricted provided that it can be composited with a graphite-based material by heat treatment, and for example, pitch, mesocarbon microbeads, coke or a synthetic resin (for example, a phenol resin, etc.), etc., are included. Among such carbonaceous material precursors, the use of inexpensive pitch is preferred in terms of production cost. Pitch is largely classified as petroleum-based pitch or coal-based pitch. Petroleum-based pitch includes, for example, crude oil distillation residue, fluid catalytic cracking residue (decant oil, etc.), bottom oil from thermal crackers, and ethylene tar obtained during naphtha cracking, etc. Before carrying out the heat treatment, the base material and the carbonaceous material precursor may be mixed at a temperature higher than the melting point of the carbonaceous material precursor. The heat treatment temperature may be a temperature at which a component generated by volatilization or thermal decomposition of the carbonaceous material precursor to be used becomes the carbonaceous material, and the temperature is preferably 400° C. or higher and 2500° C. or lower, more preferably 500° C. or higher and 2,000° C. or lower, and still more preferably 550° C. or higher and 1,500° C. or lower. The atmosphere of carrying out the heat treatment is not particularly limited, but a non-oxidizing atmosphere is preferable.

At least one selected from the group consisting of activated carbon, carbon black, template porous carbon, graphite having a high specific surface area and carbon nanoparticles, or a composite carbon material B comprising at least one of them as a basis material, etc., can be used as the negative electrode active material B.

A carbonaceous material precursor to be used as the negative electrode active material B is a solid, liquid or solvent-soluble organic material that allows the carbonaceous material to be composited with amorphous carbon material by heat treatment. The carbonaceous material precursor is not particularly restricted provided that it can be composited with the amorphous carbon material by heat treatment, and for example, pitch, mesocarbon microbeads, coke or a synthetic resin (for example, a phenol resin, etc.), etc., are included. Among such carbonaceous material precursors, the use of inexpensive pitch is preferred in terms of production cost. Pitch is largely classified as petroleum-based pitch or coal-based pitch. Petroleum-based pitch includes, for example, crude oil distillation residue, fluid catalytic cracking residue (decant oil, etc.), bottom oil from thermal crackers, and ethylene tar obtained during naphtha cracking. Before carrying out the heat treatment, the base material and the carbonaceous material precursor may be mixed at a temperature higher than the melting point of the carbonaceous material precursor. The heat treatment temperature may be a temperature at which a component generated by volatilization or thermal decomposition of the carbonaceous material precursor to be used becomes the carbonaceous material, and the temperature is preferably 400° C. or higher and 2500° C. or lower, more preferably 500° C. or higher and 2,000° C. or lower, and still more preferably 550° C. or higher and 1,500° C. or lower. The atmosphere of carrying out the heat treatment is not particularly limited, but a non-oxidizing atmosphere is preferable.

In the present embodiment, the negative electrode active material layer preferably has a specific surface area calculated by the BET method of 4 $m^2/g$ or greater and 75 $m^2/g$ or less based on the weight of the negative electrode active material. The lower limit of the specific surface area calculated by the BET method is more preferably 5 $m^2/g$ or greater, still more preferably 6 $m^2/g$ or greater and particularly preferably 7 $m^2/g$ or greater. The upper limit of the specific surface area calculated by the BET method is 60 $m^2/g$ or less, more preferably 40 $m^2/g$ or less, and particularly preferably 30 $m^2/g$ or less.

In the present embodiment, the negative electrode active material layer preferably has, in the Raman mapping of the negative electrode active material layer obtained by Raman spectroscopy, the proportion A1 of the mapping area having the ratio ID/IG of the D band peak intensity ID appearing at 1350±15 $cm^{-1}$ to the G band peak intensity IG appearing at 1585±15 $cm^{-1}$ of 0.5 or greater and 1.3 or less, to the entire mapping area of 50% or greater and 95% or less. The lower limit of A1 is preferably 60% or greater and more preferably 65% or greater. The upper limit of A1 is preferably 90% or less or 85% or less.

The negative electrode of the present embodiment has excellent high-load charge/discharge cycle characteristics and excellent elevated temperature storage characteristics at a high voltage by adjusting the distribution of the ratio ID/IG of the intensity ID of the D band peak appearing at 1350±15 $cm^{-1}$ to the intensity IG of the G band peak appearing at 1585±15 $cm^{-1}$ within a specific range, in a specific surface area of the negative electrode active material layer calculated by the BET method and the Raman mapping of the surface of the negative electrode active material layer obtained by Raman spectroscopy. While the principle is not completely understood, and it is not our intention to be limited by theory, the following is assumed.

If the specific surface area calculated by the BET method is 4 $m^2/g$ or greater and A1 is 60% or greater, the high-load charge/discharge cycle characteristics are improved. Although the principle is not completely understood, it is assumed that by adjusting the specific surface area and A1 within the above range, the surface area of the negative electrode active material layer that receives lithium during charging with a large current is large as well as the crystallinity of the carbon material is low, which accelerates diffusion of Li ions upon charge and discharge and improves Li acceptability, and therefore, lithium deposition during charging with a large current is inhibited and high-load charge/discharge cycle characteristics are improved. In particular, when a lithium compound is contained in the positive electrode precursor, a decomposed product of the lithium compound deposits on the negative electrode surface and lithium is less received, which facilitates precipitation of lithium, however, by adjusting the specific surface area and A1 to the aforementioned ranges, precipitation of lithium can be inhibited.

On the other hand, when the specific surface area calculated by the BET method is 75 m²/g or less and A1 is 95% or less, excellent elevated temperature storage characteristics at a high voltage are exhibited. Although the principle is not completely understood, the area and content in the above range enable to inhibit the decomposition reaction of the electrolytic solution on the negative electrode surface and excellent elevated temperature storage characteristics at a high voltage can be produced. In particular, when the lithium compound is contained in the positive electrode precursor, it is decomposed by increasing a voltage, the coating layer on the negative electrode surface ruptures, which facilitates gas generation at an elevated temperature, however, by adjusting the specific surface area and A1 within the above ranges, excellent high-voltage and elevated-temperature storage characteristics can be exhibited.

Moreover, A1 of 60% or greater and 95% or less indicates uniform mixing of two types of carbon materials, and since the resistance distribution in the negative electrode active material layer is small, high-load charge/discharge cycle characteristics are improved.

The negative electrode of the present embodiment has the ratio A2 of the mapping area that has the above $I_D/I_G$ in the negative electrode material layer of 1.0 or greater and 1.3 or less with respect to the entire mapping area, which is preferably 3% or greater and 70% or less. The lower limit of A2 is more preferably 4% or greater and still more preferably 5% or more. The upper limit of A2 is more preferably 50% or less and still more preferably 30% or less. When A2 is 3% or greater, the negative electrode is excellent in the resistance at room temperature, and when A2 is 70% or less, the negative electrode is excellent in the energy density.

When the pore volume derived from fine pores having a diameter of 2 nm or larger and 50 nm or smaller calculated by the BJH method based on the weight of the negative electrode active material, is $V_{m1}$ (cc/g), and the pore volume derived from fine pores having a diameter of 20 nm or larger and 50 nm or smaller is $V_{m2}$ (cc/g), the expression $0.6 \leq V_{m1}/(V_{m1}+V_{m2}) \leq 0.8$ is preferably satisfied for the negative electrode active material layer in the negative electrode of the present embodiment. The lower limit of $V_{m1}/(V_{m1}+V_{m2})$ is more preferably 0.63 or greater. The upper limit of $V_{m1}/(V_{m1}+V_{m2})$ is more preferably 0.75 or less. When $V_{m1}/(V_{m1}+V_{m2})$ is 0.6 or greater, the negative electrode active material layer is excellent in the resistance at room temperature, and when $V_{m1}/(V_{m1}+V_{m2})$ is 0.7 or less, it is excellent in the energy density.

The negative electrode active material layer in the negative electrode of the present embodiment preferably has at least one peak in a diameter region of 20 nm or larger and 50 nm or smaller in the fine pore distribution curve obtained by analyzing an isotherm at the time of nitrogen desorption by the BJH method. When the negative electrode active material layer has at least one peak in a diameter region of 20 nm or larger and 50 nm or smaller, it has excellent resistance at a lowered temperature.

The peel strength of the negative electrode active material layer in the negative electrode of the present embodiment is 0.40 N/cm or greater and 2.00 N/cm or less. When the peel strength is 0.40 N/cm or greater, it is possible to suppress missing of the negative electrode active material layer and to inhibit a micro short-circuit. The peel strength of 2.00 N/cm or less refers to absence of an excessive binder, etc., in the negative electrode active material layer, and therefore, the diffusivity of the electrolytic solution can be improved and the resistance can be reduced.

The peel strength of the negative electrode active material layer according to the present embodiment refers to a value measured after pressing when carrying out the pressing as described below. When carrying out pressing a plurality of times, it refers to a value measured after the final pressing. When not carrying out pressing for a negative electrode, the value refers to one measured without pressing.

The peel strength can be measured by known methods. For example, a peel test according to JIS Z0237 (2009) "Testing method for adhesive tape/adhesive sheet" may be used. Alternatively, the test method used in Examples described below may be applied.

Alternatively, the negative electrode active material may be a material that forms an alloy with lithium (hereinafter, also referred to as "alloy-based negative electrode material"). The alloy-based negative electrode material preferably includes at least one selected from the group consisting of silicon, a silicon compound, tin, a tin compound, and a composite material thereof with carbon or a carbonaceous material. The silicon compound as the negative electrode active material is preferably silicon oxide, and more preferably $SiO_x$ wherein in the formula, x satisfies the expression $0.01 \leq x \leq 1$.

The composite material is a material in which at least one basis material selected from the group consisting of silicon, a silicon compound, tin, a tin compound is composited by heat treatment, etc., with at least one carbon or carbonaceous material selected from the group consisting of hardly graphitizable carbon materials; easily graphitizable carbon materials; carbon black; carbon nanoparticles; activated carbon; artificial graphite; natural graphite; graphitized mesophase carbon microspheres; graphite whiskers; amorphous carbonaceous materials such as polyacene-based materials, etc.; carbonaceous materials obtained by heat treatment of carbon precursors such as petroleum-based pitch, coal-based pitch, mesocarbon microbeads, coke and synthetic resins (for example, phenol resins, etc.), etc.; thermal decomposition products of furfuryl alcohol resins or novolac resins; fullerenes; and carbon nanohorns.

Among them, a composite carbon material is preferred, which is obtained by heat treating one or more of the basis material in the copresence of the petroleum-based pitch or coal-based pitch. Before the heat treatment, the basis material and the pitch may be mixed at a temperature higher than the melting point of the pitch. The heat treatment temperature may be a temperature such that the component generated by volatilization or thermal decomposition of the pitch used becomes a carbonaceous material, and it is preferably 400° C. or higher and 2500° C. or lower, more preferably 500° C. or higher and 2000° C. or lower, and even more preferably 550° C. or higher and 1500° C. or lower. The atmosphere for heat treatment is not particularly restricted but is preferably a non-oxidizing atmosphere.

The mean particle diameter of the alloy-based negative electrode material is preferably 0.01 μm or larger and 30 μm or smaller. When the mean particle diameter is 0.01 μm or larger, the contact area with the non-aqueous electrolytic solution increases, and therefore the resistance of the lithium ion secondary battery can be reduced. When the mean particle diameter of the negative electrode active material is 30 μm or smaller, the negative electrode active material layer can be made sufficiently thin, so that the energy density of the lithium ion secondary battery can be improved.

The mean particle diameter of the alloy-based negative electrode material can be adjusted by pulverization by using a wet or dry jet mill with a classifier, an agitated ball mill, etc. The pulverizer is provided with a centrifugal classifier, and fine particles pulverized in an inert gas environment such as nitrogen or argon, etc., can be collected by a cyclone or a dust collector.

Alternatively, the negative electrode active material layer may contain, as the negative electrode active material, at least one selected from the group consisting of lithium titanate capable of intercalating and releasing lithium ions and titanium oxide capable of intercalating and releasing lithium ions. For example, the lithium titanate is represented by the formula $Li_xTi_yO_4$ wherein, in the formula, x satisfies the expression $0.8 \leq x \leq 1.4$ and y satisfies the expression $1.6 \leq y \leq 2.2$. The titanium oxide includes, for example, rutile-type titanium oxide, anatase-type titanium oxide, etc. Among them, $Li_{4/3}Ti_{5/3}O_4$ is preferable from the viewpoint that the increase in reaction resistance due to insertion and elimination of Li ions is small and a high output can be maintained even in a lowered temperature environment.

The negative electrode active material layer of the present embodiment may contain optional components such as a conductive filler, binder, dispersion stabilizer, etc., as necessary, in addition to the negative electrode active material.

The type of the conductive filler is not particularly restricted, and includes, for example, acetylene black, Ketjen black, vapor grown carbon fibers, etc. The amount of conductive filler used is preferably greater than 0 parts by weight and no greater than 30 parts by weight, more preferably 0 parts by weight or greater and 20 parts by weight or less, and even more preferably 0 parts by weight or greater and 15 parts by weight or less, with respect to 100 parts by weight of the negative electrode active material.

The binder is not particularly restricted, and for example, PVdF (polyvinylidene difluoride), PTFE (polytetrafluoroethylene), polyimide, latex, styrene-butadiene copolymer, fluorine rubber or an acrylic copolymer, etc., may be used. The amount of binder used is preferably 1 part by weight or greater and 30 parts by weight or less, more preferably 2 parts by weight or greater and 27 parts by weight or less, and even more preferably 3 parts by weight or greater and 25 parts by weight or less, with respect to 100 parts by weight of the negative electrode active material. When the amount of binder used is 1 part by weight or greater, adequate electrode strength will be exhibited. When the amount of binder used is no greater than 30 parts by weight, on the other hand, high input/output characteristics will be exhibited without preventing movement of lithium ions into and from the negative electrode active material.

The dispersion stabilizer is not particularly restricted, and for example, PVP (polyvinylpyrrolidone), PVA (polyvinyl alcohol), cellulose derivatives, etc., may be used. The amount of dispersion stabilizer used is preferably greater than 0 parts by weight and no greater than 10 parts by weight, with respect to 100 parts by weight of the negative electrode active material. When the amount of dispersion stabilizer used is no greater than 10 parts by weight, high input/output characteristics will be exhibited without preventing movement of lithium ions into and from the negative electrode active material.

[Negative Electrode Current Collector]

The material constituting the negative electrode current collector of the present embodiment is preferably a metal foil with high electron conductivity and without deterioration by elution into the non-aqueous electrolytic solution or reaction with the electrolyte or ion, etc. There are no particular restrictions on such metal foils which include, for example, aluminum foils, copper foils, nickel foils, stainless steel foils, etc. The negative electrode current collector in the non-aqueous lithium-type electricity storage element of the present embodiment is preferably a copper foil.

The metal foil may be a metal foil without ruggedness or through-holes, or it may be a metal foil having ruggedness formed by embossing, chemical etching, electrolytic deposition, blasting, etc., or it may be a metal foil having through-holes, such as an expanded metal, punching metal, etching foil, etc.

Among them, the negative electrode current collector of the present embodiment is particularly preferably non-porous from the standpoint of facilitation of electrode fabrication and high electron conductivity.

The thickness of the negative electrode current collector is not particularly restricted provided that it allows the shape and strength of the negative electrode to be maintained, but 1 to 100 μm, for example, is preferred. Incidentally, when the negative electrode current collector has holes or ruggedness, the thickness of the negative electrode current collector is measured based on the portion without holes or ruggedness.

[Production of Negative Electrode]

The negative electrode comprises a negative electrode active material layer on one or both sides of a negative electrode current collector. According to a typical mode, the negative electrode active material layer is anchored to the negative electrode current collector.

The negative electrode can be produced by publicly known electrode production techniques for lithium ion batteries, electrical double layer capacitors, etc. For example, various materials containing negative electrode active materials each may be dispersed and dissolved in water or an organic solvent to prepare a slurry-like coating solution, and one or both sides of a negative electrode current collector is coated with the coating solution to form a coating film, which is dried to obtain a negative electrode. The obtained negative electrode may also be pressed to adjust the thickness or bulk density of the negative electrode active material layer. As an alternative method, various materials containing negative electrode active materials each may also be dry-mixed without using a solvent, and the obtained mixture is press-molded and then attached to a negative electrode current collector by using a conductive adhesive.

The coating solution may also be prepared by dry blending all or a portion of each of the starting material powders containing the negative electrode active material, and then adding water or an organic solvent, and/or adding thereto a liquid or slurry-like substance comprising a binder or dispersion stabilizer dissolved or dispersed in them. Moreover, the coating solution may also be prepared by adding various starting powders containing the negative electrode active material each, to a liquid or slurry-like substance comprising a binder or dispersion stabilizer dissolved or dispersed in water or an organic solvent. The method of preparing the coating solution is not particularly restricted, and a disperser such as a homodisperser or multiscrew disperser, planetary mixer, thin-film revolving high-speed mixer, etc., may be suitably used. In order to obtain a coating solution in a satisfactory dispersed state, it is preferred for the dispersion to be at a peripheral velocity of 1 m/s or greater and 50 m/s or less. It is preferred when the peripheral velocity is 1 m/s or greater, because each material will satisfactorily dissolve or disperse. It is also preferred when the peripheral velocity is no greater than 50 m/s, because each material will be unlikely to be broken down by heat or shear force during dispersion, and reaggregation will be unlikely to take place.

The viscosity ($\eta b$) of the coating solution is preferably 1,000 mPa·s or higher and 20,000 mPa·s or lower, more preferably 1,500 mPa·s or higher and 10,000 mPa·s or lower, and even more preferably 1,700 mPa·s or higher and 5,000 mPa·s or lower. When the viscosity ($\eta b$) is 1,000 mPa·s or higher, liquid dripping during formation of the coating film will be minimized, and the coating film width and thickness can be satisfactorily controlled. When the viscosity ($\eta b$) is no higher than 20,000 mPa·s, there will be less pressure loss in the flow channel of the coating solution when a coating machine is used, which allows stable coating to be carried out, and allows control to less than the prescribed coating film thickness.

The TI value (thixotropy index value) of the coating solution is preferably 1.1 or greater, more preferably 1.2 or greater and even more preferably 1.5 or greater. When the TI value is 1.1 or greater, the coating film width and thickness can be satisfactorily controlled.

The method of forming the coating film is not particularly restricted, and a coating machine such as a die coater, comma coater, knife coater, gravure coating machine, etc., may be suitably used. The coating film may be formed by monolayer coating or by multilayer coating. The coating speed is preferably 0.1 m/minute or greater and 100 m/minute or lower, more preferably 0.5 m/minute or greater and 70 m/minute or lower, and even more preferably 1 m/minute or greater and 50 m/minute or lower. When the coating speed is 0.1 m/minute or greater, stable coating will be possible. When the coating speed is 100 m/minute or lower, the coating precision can be adequately ensured.

The drying method for the coating film is not particularly restricted, and a drying method such as hot air drying or infrared ray (IR) drying may be suitably employed. Drying of the coating film may be drying at a single temperature, or it may be drying while varying the temperature in different stages. Several drying methods may also be used in combination for drying. The drying temperature is preferably 25° C. or higher and 200° C. or lower, more preferably 40° C. or higher and 180° C. or lower, and even more preferably 50° C. or higher and 160° C. or lower. When the drying temperature is 25° C. or higher, it will be possible to adequately volatilize off the solvent in the coating film. When the drying temperature is no higher than 200° C., it will be possible to reduce cracking of the coating film by rapid volatilization of the solvent or maldistribution of the binder by migration, and oxidation of the negative electrode current collector or negative electrode active material layer.

The method of pressing the negative electrode is not particularly restricted, and a pressing machine such as a hydraulic press, vacuum pressing machine, etc., may be suitably used. The thickness, bulk density and electrode strength of the negative electrode active material layer can be adjusted by the pressing pressure, the gap, and the surface temperature of the pressing section, as described below. The pressing pressure is preferably 0.5 kN/cm or greater and 20 kN/cm or less, more preferably 1 kN/cm or greater and 10 kN/cm or less, and even more preferably 2 kN/cm or greater and 7 kN/cm or less. When the pressing pressure is 0.5 kN/cm or greater, it will be possible to adequately increase the electrode strength. On the other hand, when the pressing pressure is no greater than 20 kN/cm, distortion or wrinkling will be less likely to be produced in the negative electrode, and adjustment can be made to the desired layer thickness or bulk density for the negative electrode active material layer. Moreover, the gap between the press rolls can be set to a desired value depending on the thickness of the dried negative electrode so that the desired thickness or bulk density of the negative electrode active material layer is obtained. Furthermore, the pressing speed can be set as desired, so as to minimize distortion and wrinkling in the negative electrode. Moreover, the surface temperature of the pressing section may be room temperature, or the pressing section may be heated instead, if necessary. In the case of heating, the lower limit for the surface temperature of the pressing section is preferably at least the melting point of the binder minus 60° C., more preferably at least the melting point minus 45° C., and even more preferably at least the melting point minus 30° C. The upper limit for the surface temperature of the pressing section in the case of heating is also preferably no higher than the melting point of the binder used plus 50° C., more preferably no higher than the melting point plus 30° C., and even more preferably no higher than the melting point plus 20° C. For example, when PVdF (polyvinylidene difluoride: melting point=150° C.) is used as the binder, the surface temperature of the pressing section is preferably between 90° C. or higher and 200° C. or lower, more preferably between 105° C. or higher and 180° C. or lower, and even more preferably between 120° C. or higher and 170° C. or lower. When a styrene-butadiene copolymer (melting point=100° C.) is used as the binder, the surface temperature of the pressing section is preferably between 40° C. or higher and 150° C. or lower, more preferably 55° C. or higher and 130° C. or lower, and even more preferably 70° C. or higher and 120° C. or lower.

The melting point of the binder can be determined by the endothermic peak position in DSC (Differential Scanning Calorimetry). For example, using a "DSC7" differential scanning calorimeter manufactured by Perkin-Elmer, Inc., 10 mg of sample resin is set in the measuring cell and the temperature is increased from 30° C. to 250° C. at a temperature-elevating rate of 10° C./min, in a nitrogen gas atmosphere, the melting point being the endothermic peak temperature during the temperature elevation.

Moreover, pressing may also be carried out multiple times while varying the conditions including the pressing pressure, gap, speed, and pressing section surface temperature.

[Measurement Items]

Throughout the present description, the BET specific surface area, mean fine pore diameter, mesopore volume and micropore volume each are a value determined by the following respective methods. A sample is vacuum dried at 200° C. for a day and a night, and the adsorption/desorption isotherm is measured by using nitrogen as the adsorbate. By using the obtained isotherm on the adsorption side, the BET specific surface area is calculated by the multipoint BET method or single point BET method, the mean pore size is calculated by dividing the total pore volume per weight by the BET specific surface area, the mesopore volume is calculated by the BJH method, and the micropore volume is calculated by the MP method, respectively.

The BJH method is a method of calculation commonly used for analysis of mesopores, and it was advocated by Barrett, Joyner, Halenda et al. (NPL 1).

Moreover, the MP method is a method in which the "t-plot method" (NPL 2) is utilized to determine micropore volume, micropore area and micropore distribution, and it is the method proposed by R. S. Mikhail, Brunauer and Bodor (NPL 3).

The mean particle diameter for the present embodiment is the particle diameter at the point where, when the particle size distribution is measured by using a particle size distribution analyzer, and a cumulative curve with 100% as the total volume is determined, the cumulative curve is at 50% (i.e., the 50% diameter (Median diameter)). The mean particle diameter can be measured by using a commercially available laser diffraction particle size distribution analyzer.

The doping amount of lithium ion in the negative electrode active material of the non-aqueous lithium-type electricity storage element, during shipping and after use, can be determined in the following manner, for example.

First, after washing the negative electrode active material layer in the present embodiment with ethyl methyl carbonate or dimethyl carbonate and drying it in air, it is extracted with a mixed solvent comprising methanol and isopropanol, to obtain the extract and the extracted negative electrode active material layer. The extraction will typically be carried out in an Ar box at an environmental temperature of 23° C.

The lithium amounts in the extract obtained in this manner and the extracted negative electrode active material layer are each quantified by using ICP-MS (Inductively Coupled Plasma-Mass Spectrometry), for example, and the total is calculated to determine the lithium ion doping amount in the negative electrode active material. Then, the obtained value may be compared to the amount of negative electrode active material supplied for extraction, to calculate the lithium ion doping amount.

The primary particle diameter can be obtained by a method in which the powder is photographed with an electron microscope in several visual fields, the particle diameters are calculated for 2,000 to 3,000 particles in the visual fields by using a fully automatic image processing device, etc., and the value of the arithmetic mean is recorded as the primary particle diameter.

Throughout the present description, the degree of dispersion is the value determined based on a dispersion evaluation test by using a fineness gauge conforming to HS K5600. Specifically, a sufficient amount of sample can flow into the tip of a fineness gauge having a groove with the prescribed depth corresponding to the particle size, through the deep part of the groove, and is allowed to slightly spill over from the groove. Next, with the long side of a scraper parallel to the widthwise direction of the gauge, and placed with the blade edge in contact with the deep tip of the groove of the fineness gauge, the scraper is held on the surface of the gauge, the surface of the gauge is pulled at an even speed perpendicular to the long side direction of the groove to a groove depth of 0 for a period of 1 to 2 seconds, observation is made with light irradiated at an angle of 20° or greater and 30° or less within 3 seconds after the pulling has ended, and the depth at which particles appear in the groove of the fineness gauge is read off.

The viscosity ($\eta b$) and TI value are the values determined by the following respective methods. First, an E-type viscometer is used to determine the viscosity ($\eta a$) stabilized after measurement for 2 minutes or longer under conditions with a temperature of 25° C. and a shear rate of 2 $s^{-1}$. Next, the viscosity ($\eta b$) is determined as measured under the same conditions except for changing the shear rate to 20 $s^{-1}$. The viscosity values as obtained above are used to calculate the TI value as: TI value=$\eta a/\eta b$. When increasing the shear rate from 2 $s^{-1}$ to 20 $s^{-1}$, it may be increased in a single stage, or the shear rate may be increased in stages within the range specified above, while appropriately determining the viscosity at each shear rate.

The basis weight of the negative electrode active material layer is preferably 10 $g \cdot m^{-2}$ or greater and 100 $g \cdot m^{-2}$ or less per one side of the negative electrode current collector, more preferably from 12 $g \cdot m^{-2}$ or greater and 80 $g \cdot m^{-2}$ g or less per one side thereof, and still more preferably 15 $g \cdot m^{-2}$ or greater and 50 $g \cdot m^{-2}$ or less. When the basis weight is 10 $g \cdot m^{-2}$ or greater, high-load charge/discharge characteristics can be improved. On the other hand, when the basis weight is 100 $g \cdot m^{-2}$ or less, the ion diffusion resistance in the electrode can be maintained low. Therefore, the sufficient output characteristic can be obtained as well as the cell volume can be reduced, which enables to increase the energy density. The upper and lower limits of the basis weight range of the negative electrode active material layer can be arbitrarily combined.

The thickness of the negative electrode active material layer is preferably 10 μm or greater and 150 μm or lower for each side, the lower limit being more preferably 12 μm or greater, and even more preferably 15 μm or greater, and the upper limit being more preferably no greater than 120 μm and even more preferably no greater than 80 μm. When the thickness of the negative electrode active material layer is 10 μm or greater, the coatability will be excellent with less tendency to produce streaks during coating of the negative electrode active material layer. When the thickness of the negative electrode active material layer is 150 μm or lower, on the other hand, high energy density can be exhibited by reduction of the cell volume. The thickness of the negative electrode active material layer, when the current collector has through-holes or ruggedness, is the mean value of the thickness for each side at the portions of the current collector without through-holes or ruggedness.

The bulk density of the negative electrode active material layer is preferably 0.30 $g/cm^3$ or greater and 1.8 $g/cm^3$ or lower, more preferably 0.40 $g/cm^3$ or greater and 1.5 $g/cm^3$ or lower, and even more preferably 0.45 $g/cm^3$ or greater and 1.3 $g/cm^3$ or lower. When the bulk density is 0.30 $g/cm^3$ or greater, sufficient strength can be obtained and sufficient conductivity can be exhibited between the negative electrode active materials. When the bulk density is 1.8 $g/cm^3$ or lower, it will be possible to have pores through which the ions can be sufficiently diffused in the negative electrode active material layer.

[Metal Element in Negative Electrode Active Material Layer]

The element concentration of at least one element selected from the group consisting of Ni, Mn, Fe, Co and Al, contained in the negative electrode active material layer, is preferably 10 ppm or greater and 5000 ppm or less, more preferably 10 ppm or greater and 3000 ppm or less, and still more preferably 50 ppm or greater and 1000 ppm or less. When the element concentration is 10 ppm or greater, the metal element in the negative electrode is ionized when the electricity storage element is exposed to an elevated temperature and high voltage, which inhibits release of Li ions from the lithium compound in the positive electrode. As a result, generation of reactive species can be inhibited, and a voltage drop at an elevated temperature and high voltage can also be inhibited. When the element concentration is 5000 ppm or less, the diffusion of Li ions in the active material layer in the negative electrode is not prevented, and therefore the output of the non-aqueous lithium-type electricity storage element can be increased. Moreover, since the formation of a protective layer at the interface of the negative electrode active material layer is not prevented by the additive, etc., elevated-temperature durability can be improved. The negative electrode active material layer may include any of these elements and may include two or more of these elements. When the electrolytic solution contains two or more types of elements, the total concentration thereof may be 20 ppm or greater and 10000 ppm or less.
[Method for Quantifying Metal Elements in Negative Electrode Active Material Layer]

The method for quantifying the metal element contained in the negative electrode active material layer is not particularly limited and includes the following methods. After completion of the electricity storage element, the negative electrode is cut out from the electrode stacked body of the electricity storage element and washed with an organic solvent. The organic solvent used for washing is suitably a solvent that removes a decomposed product of the electrolytic solution, deposited on the surface of the negative electrode and reacts with lithium ions in the negative electrode. The solvent is not particularly limited, but, alcohols such as methanol, ethanol, isopropanol, etc. or mixed solvents thereof are preferably used. The method of washing the negative electrode is thorough immersion of the negative electrode for 3 days or longer in an ethanol solution at a 50- to 100-fold amount with respect to the weight of the negative electrode. During the procedure, certain measures are preferred such as capping the vessel so that the ethanol does not volatilize off. The negative electrode is removed from the ethanol after the immersion for 3 days or longer and subjected to vacuum drying. The vacuum drying is carried out so that the ethanol residue in the negative electrode is no greater than 1% by weight under the conditions of a temperature of 100 to 200° C., a pressure of 0 to 10 kPa and a time of 5 to 20 hours. The ethanol residue can be quantified by GC/MS measurement of the following organic solvent after the negative electrode that has been subjected to the vacuum drying, was immersed in the organic solvent such as dimethyl carbonate, diethyl carbonate or ethyl methyl carbonate, etc., based on a pre-drawn calibration curve.

After the vacuum drying, the negative electrode active material layer is completely removed from the negative electrode by using a spatula, brush, bristles, etc., and the weight of the obtained negative electrode active material layer is calculated by using the measurement methods including ICP-AES, atomic absorption analysis, X-ray fluorescence analysis, neutron activation analysis, ICP-MS, etc.
[Coating Layer of Negative Electrode Active Material Layer]

The negative electrode active material layer according to the present embodiment preferably has the element concentration of sulfur (S), $S_{168eV}$ of 0.5 atomic % or greater, which is obtained based on the peak area with 168 eV in the S2p spectrum by X-ray photoelectron spectroscopy (XPS) on the negative electrode active material layer surface. When the elemental concentration of S is 0.5 atomic % or greater, reductive decomposition of the non-aqueous electrolytic solution on the surface of the negative electrode active material layer upon high voltage and storage at an elevated temperature, can be inhibited. Thus, high energy density can be achieved while maintaining durability at elevated temperatures of the electricity storage element.

The method for making the peak described above produced in the negative electrode active material layer according to the present embodiment includes, for example, a method of mixing a sulfur-containing compound in the negative electrode active material layer, a method of adsorbing a sulfur-containing compound to the negative electrode active material layer, a method for electrochemically depositing a sulfur-containing compound on the negative electrode active material layer, etc.

Among them, the preferred method is a method for containing the precursor capable of producing this peak by the decomposition thereof in the non-aqueous electrolytic solution and depositing the above compound inside the negative electrode active material layer by utilizing the decomposition reaction in the step of fabricating the electricity storage element. Furthermore, the method for depositing the aforementioned compound through a step of oxidizing and decomposing the alkali metal compound in the positive electrode precursor described below at a high voltage, is, although the principle is not understood, preferred because the coating layer capable of maintaining high input/output characteristics even in a lowered temperature environment. is formed.

One or more sulfur-containing compounds (Y) selected from the group consisting of the cyclic sulfate compounds represented by the following formula (2-1):

[Chemical formula 7]

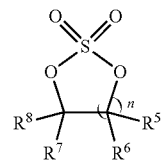

(2-1)

wherein, in formula (2-1), $R^5$, $R^6$, $R^7$, and $R^8$ each represent at least one selected from the group consisting of a hydrogen atom, a halogen atom, an alkyl group having 1 to 12 carbon atoms, and a halogenated alkyl group having 1 to 12 carbon atoms, may be the same or different from each other; and n is an integer from 0 to 3; a sultone compound represented by formula (2-2):

[Chemical formula 8]

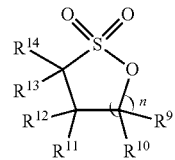

(2-2)

wherein, in formula (2-2), $R^9$, $R^{10}$, $R^{11}$, $R^{12}$, $R^{13}$, and $R^{14}$ each represent at least one selected from the group consisting of a hydrogen atom, a halogen atom, an alkyl group having 1 to 12 carbon atoms, and a halogenated alkyl group having 1 to 12 carbon atoms, may be the same or different from each other; and n is an integer from 0 to 3; a sultone compound represented by formula (2-3):

[Chemical formula 9]

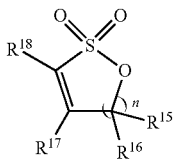

(2-3)

wherein, in formula (2-3), $R^{15}$, $R^{16}$, $R^{17}$, and $R^{18}$ each represent at least one selected from the group consisting of a hydrogen atom, a halogen atom, an alkyl group having 1 to 12 carbon atoms, and a halogenated alkyl group having 1 to 12 carbon atoms, may be the same or different from each other, and n is an integer from 0 to 3; a compound represented by formula (2-4):

[Chemical formula 10]

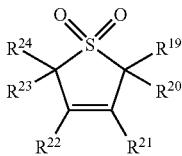

(2-4)

wherein, in formula (2-4), $R^{19}$, $R^{20}$, $R^{21}$, $R^{22}$, $R^{23}$, and $R^{24}$ each represent at least one selected from the group consisting of a hydrogen atom, a halogen atom, an alkyl group having 1 to 12 carbon atoms, and a halogenated alkyl group having 1 to 12 carbon atoms and may be the same or different from each other; and a cyclic sulfite compound represented by formula (2-5):

[Chemical formula 11]

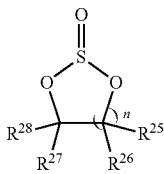

(2-5)

wherein, in formula (2-5), $R^{25}$, $R^{26}$, $R^{27}$, and $R^{28}$ each represent at least one selected from the group consisting of a hydrogen atom, a halogen atom, an alkyl group having 1 to 12 carbon atoms, and a halogenated alkyl group having 1 to 12 carbon atoms, may be the same or different from each other, and n is an integer from 0 to 3, are preferably added to the electrolytic solution as precursors capable of producing the aforementioned peak.

From the viewpoint of addition to the electrolytic solution, the cyclic sulfate compound represented by formula (2-1) is more preferably ethylene sulfate or 1,3-propylene sulfate, the sultone compound represented by formula (2-2) is more preferably 1,3-propane sultone, 2,4-butane sultone, 1,4-butane sultone, 1,3-butane sultone or 2,4-pentane sultone, the sultone compound represented by formula (2-3) is more preferably 1,3-propene sultone or 1,4-butene sultone, the compound represented by formula (2-4) is more preferably 3-sulfolene, and the cyclic sulfite compound represented by formula (2-5) is more preferably ethylene sulfite, 1,2-propylene sulfite, or 1,3-propylene sulfite.

[Coating Layer on Surface of Positive Electrode Active Material Layer]

The Positive electrode active material layer according to the present embodiment preferably has a peak having 162 eV to 168 eV in the S2p spectrum in the X-ray photoelectron spectroscopy (XPS) on the positive electrode active material layer surface. Such a peak enables to inhibit the non-aqueous electrolytic solution from oxidative decomposition on the surface of the positive electrode active material layer upon storage at a high voltage and an elevated temperature, which thus enables to achieve a high energy density of the electricity storage element while maintaining durability thereof at an elevated temperature.

A method for making the peak explained above produced in the positive electrode active material layer according to the present embodiment includes, for example, a method of mixing a compound having a C—S—C structure in the positive electrode active material layer, a method of adsorbing a compound having a C—S—C structure to the positive electrode active material layer, a method of electrochemically depositing a compound having a C—S—C structure on the positive electrode active material layer, etc.

Among them, a method of containing a precursor capable of decomposing in the non-aqueous electrolytic solution to produce this peak and depositing the above compound in the positive electrode active material layer by utilizing the decomposition reaction in a step of fabricating an electricity storage element, is preferred, and further, a method of depositing the above compound via a step of oxidative decomposition of the alkali metal compound in the positive electrode precursor at a high potential, which will be described later, is more preferred because a coated layer that is capable of maintaining high input/output characteristics even in a lowered temperature environment is formed, although the principle is not understood.

As the precursor capable of producing the peak, one or more sulfur-containing compounds (X) selected from the group consisting of the thiophene compounds represented by the following formula (1):

[Chemical formula 12]

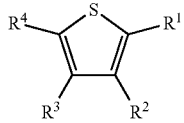

(1)

wherein, in formula (1), $R^1$, $R^2$, $R^3$, and $R^4$ each independently represent a hydrogen atom, a halogen atom, a formyl group, an acetyl group, a nitrile group, an acetyl group, an alkyl group having 1 to 6 carbon atoms, an alkoxy group having 1 to 6 carbon atoms or an alkyl ester having 1 to 6 carbon atoms, are preferably contained in the electrolytic solution.

From the viewpoint of addition to the electrolytic solution, the thiophene compound represented by the above formula (1) is more preferably at least one selected from the group consisting of thiophene, 2-methylthiophene, 3-methylthiophene, 2-cyanothiophene, 3-cyanothiophene, 2, 5-dimethylthiophene, 2-methoxythiophene, 3-methoxythiophene, 2-chlorothiophene, 3-chlorothiophene, 2-acetylthiophene and 3-acetylthiophene.

<Design of Positive and Negative Electrodes>

In the present embodiment, when the basis weight of the positive electrode active material layer of the positive electrode is $C_1$ (g/m²) and the basis weight of the negative electrode active material layer of the negative electrode is $C_2$ (g/m²), $C_1/C_2$ is preferably 0.35 or greater and 5.80 or less, more preferably 0.40 or greater and 3.00 or less, and still more preferably 0.60 or greater and 2.50 or less. When $C_1/C_2$ is 0.35 or more, the potential of the negative electrode can be reduced by sufficiently pre-doping lithium ions from the positive electrode precursor containing the lithium compound to the negative electrode, which enables to improve the energy density of the electricity storage element. On the other hand, when $C_1/C_2$ is 5.80 or less, the activation reaction on the surface of the positive electrode active material by the doping reaction of the lithium compound contained in the positive electrode active material layer sufficiently proceeds, and improvement in the capacity of the electricity storage element and the increased output thereof can be expected. Moreover, when $C_1/C_2$ is 5.80 or less, the capacity use range of the negative electrode active material accompanied by charge/discharge can be narrowed, and therefore high-load charge/discharge characteristics can be improved.

Moreover, when the thickness of the positive electrode active material layer of the positive electrode is $D_1$ (μam) and the thickness of the negative electrode active material layer of the negative electrode is $D_2$ (μm), $D_1/D_2$ is preferably 0.30 or greater and 5.00 or less, more preferably 0.70 or greater and 3.50 or less, and still more preferably 1.00 or greater and 2.50 or less. When $D_1/D_2$ is 0.30 or greater, the diffusion rate of lithium ions in the negative electrode active material layer relative with respect to the surface adsorption rate of lithium ions in the positive electrode active material layer increases and the output characteristic of the electricity storage element can be improved. On the other hand, when $D_1/D_2$ is 5.00 or less, the lithium ion diffusion rate in the positive electrode active material layer with respect to insertion reaction of the lithium ion in the negative electrode active material layer increases, and therefore the input characteristic of the electricity storage element can be improved. Moreover, since the use range of the capacity of the negative electrode active material accompanied by charge/discharge can be narrowed, high-load charge/discharge characteristics can be improved.

<Calculation of Basis Weight of Positive Electrode Active Material Layer>

In the case of the positive electrode precursor, a part of the positive electrode precursor is cut into a predetermined area and weighed. The area of the positive electrode to be measured is not particularly limited but is preferably 5 cm² or greater and 200 cm² or less and more preferably 25 cm² or greater and 150 cm² or less, from the viewpoint of reducing measurement variations. When the area is 5 cm² or greater, measurement reproducibility is ensured. When the area is 200 cm² or less, the sample is excellent in handleability. Subsequently, the positive electrode active material layer of the positive electrode precursor is removed by scraping using a spatula, a brush, a brush, etc., and the positive electrode current collector foil is weighed. When the area of the cut positive electrode precursor is $S_{ZC}$ (m²), the weight thereof is $M_{Z1}$ (g), and the weight of the positive electrode current collector foil is $M_{Z2}$ (g), the basis weight of the positive electrode active material layer of the positive electrode precursor $C_{Z1}$ can be calculated by the following equation (4).

$$C_{Z1}(g \cdot m^{-2}) = (M_{ZC1} - M_{ZC2})/S_{ZC} \quad (4)$$

The method of quantifying the basis weight of the positive electrode active material layer for the positive electrode via the lithium doping step will now be described. The non-aqueous lithium-type electricity storage element in which the voltage has been adjusted to 2.9 V is disassembled in an argon box to take out the electrode stacked body, and the positive electrode is cut out from the electrode stacked body and washed with an organic solvent. The organic solvent used for washing is not particularly restricted and may be any solvent that can remove the decomposed products of the electrolytic solution deposited on the positive electrode surface, and the use of an organic solvent having a lithium compound solubility of 2% or less inhibits elution of the lithium compound. Such an organic solvent includes polar solvents such as, methanol, ethanol, acetone, methyl acetate, etc., and is suitable for use. The area of the positive electrode to be measured is not particularly restricted, but from the viewpoint of reducing measurement variation it is preferably 5 cm² or larger and 200 cm² or smaller and more preferably 25 cm² or larger and 150 cm² or smaller. Measurement reproducibility can be ensured when the area is at least 5 cm². The handleability of the sample will be excellent when the area is no greater than 200 cm².

The method of washing the positive electrode is thorough immersion of the positive electrode for 3 days or longer in an ethanol solution at a 50- to 100-fold amount with respect to the weight of the positive electrode. During the immersion, the vessel is preferably capped, for example, so that the ethanol does not volatilize off. After immersion for 3 days or longer, the positive electrode is removed from the ethanol and vacuum dried. The vacuum drying conditions employed may be conditions such that the ethanol residue in the positive electrode is no greater than 1 weight % in the ranges of a temperature of 100 to 200° C., a pressure of 0 to 10 kPa and a time of 5 to 20 hours. The ethanol residue can be quantified by GC/MS measurement of the water after washing by distilled water that will be described below, based on a pre-drawn calibration curve.

The area of the positive electrode obtained after the vacuum drying denotes $X_C$ (m²). The positive electrode active material layer on the positive electrode is completely removed off by using a spatula, brush, bristles, etc., and the weight of the positive electrode active material layer $M_{0XC}$ (g) and the weight of the obtained current collector of the positive electrode $M_{X2C}$ (g) are measured. Subsequently, the positive electrode active material layer is thoroughly immersed for 3 days or longer in distilled water at a 100- to 150-fold amount with respect to the weight of the positive electrode active material layer measured. During the immersion, the vessel is preferably capped, for example, so that the distilled water does not volatilize off and the aqueous solution is preferably stirred occasionally in order to promote elution of the lithium compound. After the immersion for 3 days or longer, the positive electrode active material layer is taken out from the distilled water, and vacuum-dried as in the case of the above washing by ethanol. Then, the weight $M_{X1C}$ (g) after the vacuum drying is measured. The basis weight of the positive electrode active material layer $C_{X1}$ (g/m²) can be calculated by equation (5).

$$C_{X1} = (M_{X1C} - M_{X2C})/X_C \quad (5)$$

<Calculation of Basis Weight of Negative Electrode Active Material Layer>

In the case of the negative electrode precursor before solution injection, a part of the negative electrode precursor is cut into a predetermined area and weighed. The area of the negative electrode to be measured is not particularly limited but is preferably 5 cm$^2$ or greater and 200 cm$^2$ or less and more preferably 25 cm$^2$ or greater and 150 cm$^2$ or less, from the viewpoint of reducing measurement variations. When the area is 5 cm$^2$ or greater, reproducibility of measurement is ensured. When the area is 200 cm$^2$ or less, handleability of the sample is excellent. Subsequently, the negative electrode active material layer of the negative electrode is removed by scraping using a spatula, a brush, a brush, etc., and the negative electrode current collector foil is weighed. When the area of the cut negative electrode is $S_{ZA}$ (m$^2$), the weight is $M_{Z1}$ (g), and the weight of the negative electrode current collector foil is $M_{Z2}$ (g), the basis weight of the negative electrode active material layer of the negative electrode $A_{Z1}$ can be calculated by the following equation (6).

$$A_{Z1}(\text{g}\cdot\text{m}^{-2}) = (M_{ZA1} - M_{ZA2})/S_{ZA} \tag{6}$$

The method of quantifying the basis weight of the negative electrode active material layer of the negative electrode via the lithium doping step will now be described. In an argon box, the negative electrode is cut out from the electrode stacked body and washed with an organic solvent. The organic solvent used for washing is not particularly restricted, and is suitably a solvent that removes the decomposed products of the electrolytic solution deposited on the negative electrode surface and reacts with lithium ion in the negative electrode, and alcohols such as methanol, ethanol, isopropanol, etc., or mixed solvents thereof, are suitable for use.

The area of the negative electrode to be measured is not particularly restricted, but from the viewpoint of reducing measurement variation it is preferably 5 cm$^2$ or larger and 200 cm$^2$ or smaller and more preferably 25 cm$^2$ or larger and 150 cm$^2$ or smaller. Measurement reproducibility can be ensured when the area is at least 5 cm$^2$. The handleability of the sample will be excellent when the area is no greater than 200 cm$^2$.

The method of washing the negative electrode is thorough immersion of the negative electrode for 3 days or longer in an ethanol solution at a 50- to 100-fold amount with respect to the weight of the negative electrode. During the immersion, the vessel is preferably capped, for example, so that the ethanol does not volatilize off. After immersion for 3 days or longer, the negative electrode is removed from the ethanol and vacuum dried. The vacuum drying conditions employed may be conditions such that the ethanol residue in the negative electrode is no greater than 1 weight % in the ranges of a temperature of 100 to 200° C., a pressure of 0 to 10 kPa and a time of 5 to 20 hours.

The ethanol residue can be quantified by GC/MS measurement of the organic solvent, based on a pre-drawn calibration curve, after immersing the vacuum dried negative electrode in an organic solvent such as dimethyl carbonate, diethyl carbonate, ethyl methyl carbonate, etc.

The area of the negative electrode obtained after the vacuum drying denotes $X_A$ (m$^2$). The negative electrode active material layer on the negative electrode is completely removed off by using a spatula, brush, bristles, etc., and the weight of the negative electrode active material layer $M_{0XA}$ (g) and the weight of the obtained current collector of the negative electrode $M_{X2A}$ (g) are measured. Subsequently, the negative electrode active material layer is thoroughly immersed for 3 days or longer in distilled water at a 100- to 150-fold amount with respect to the weight of the negative electrode active material layer measured. During the immersion, the vessel is preferably capped, for example, so that the distilled water does not volatilize off and the aqueous solution is preferably stirred occasionally in order to promote elution of the lithium compound. After the immersion for 3 days or longer, the negative electrode active material layer is taken out from the distilled water, and vacuum-dried as in the case of the above washing by ethanol. Then, the weight $M_{X1A}$ (g) after the vacuum drying is measured. The basis weight of the negative electrode active material layer $A_{X1}$ (g/m$^2$) can be calculated by equation (7).

$$A_{X1} = (M_{X1A} - M_{X2A})/X_A \tag{7}$$

[Electrolytic Solution]

The electrolytic solution of the present embodiment is a non-aqueous electrolytic solution. The non-aqueous electrolytic solution preferably comprises a lithium salt dissolved at a concentration of 0.5 mol/L or greater based on the total amount of the non-aqueous electrolytic solution. Namely, the non-aqueous electrolytic solution preferably contains lithium ion as an electrolyte.

LiN(SO$_2$F)$_2$, LiN(SO$_2$CF$_3$)$_2$, LiN(SO$_2$C$_2$F$_5$)$_2$, LiN(SO$_2$CF$_3$)(SO$_2$C$_2$F$_5$), LiN(SO$_2$CF$_3$)(SO$_2$C$_2$F$_4$H), LiC(SO$_2$F)$_3$, LiC(SO$_2$CF$_3$)$_3$, LiC(SO$_2$C$_2$F$_5$)$_3$, LiCF$_3$SO$_3$, LiC$_4$F$_9$SO$_3$, LiPF$_6$, LiBF$_4$, etc., may be contained alone or mixtures of two more as the lithium salt may be contained in the non-aqueous electrolytic solution of the present embodiment. The non-aqueous electrolytic solution preferably contains at least one selected from the group consisting of LiPF$_6$, LiN(SO$_2$F)$_2$, and LiBF$_4$ from the viewpoint of producing a high ion conductivity, and more preferably contains LiPF$_6$ and/or LiBF$_4$, and furthermore preferably contains LiPF$_6$ and/or LiBF$_4$ and LiN(SO$_2$F)$_2$.

The lithium salt concentration in the non-aqueous electrolytic solution is preferably 0.5 mol/L or greater, and more preferably in the range of 0.5 mol/L or greater and 2.0 mol/L or less, based on the total amount of the non-aqueous electrolytic solution. When the lithium salt concentration is 0.5 mol/L or greater, anions will be sufficiently present to allow sufficiently high capacity of the electricity storage element. The lithium salt concentration is preferably 2.0 mol/L or lower because it can prevent precipitation of the undissolved lithium salt in the non-aqueous electrolytic solution, prevent the viscosity of the electrolytic solution from becoming too high and will avoid lowering of the conductivity or reduction in the output characteristic as well.

The non-aqueous electrolytic solution of the present embodiment preferably contains LiN(SO$_2$F)$_2$ at a concentration of 0.1 mol/L or greater and 1.5 mol/L or less, based on the total amount of the non-aqueous electrolytic solution, and the concentration of LiN(SO$_2$F)$_2$ is more preferably 0.3 mol/L or greater and 1.2 mol/L or less. When the concentration of LiN(SO$_2$F)$_2$ is 0.1 mol/L or greater, the ionic conductance of the electrolytic solution is enhanced, and an appropriate amount of an electrolyte layer is deposited at the negative electrode interface, which thereby reduces the gas due to decomposition of the electrolytic solution. On the other hand, when the concentration is 1.5 mol/L or less, the electrolyte salt does not precipitate upon charge and discharge, and the viscosity of the electrolytic solution does not increase even after a long period of time.

[Non-Aqueous Solvent]

The non-aqueous electrolyte solution of the present embodiment preferably comprises a cyclic carbonate as the non-aqueous solvent. To contain cyclic carbonate in the non-aqueous electrolytic solution will be advantageous from the viewpoint of dissolving the lithium salt to the desired concentration and depositing an appropriate amount of the lithium compound on the positive electrode active material layer. Cyclic carbonate includes, for example, ethylene carbonate (EC), propylene carbonate, butylene carbonate, vinylene carbonate, fluoroethylene carbonate, etc.

The total content of the cyclic carbonate is preferably 15% by weight or greater and more preferably 20% by weight or greater, based on the total amount of the non-aqueous electrolytic solution. When the total content is 15% by weight or greater, a lithium salt having a desired concentration can be dissolved, and high lithium ion conductance can be produced. Further, it becomes possible to deposit an appropriate amount of the lithium compound on the positive electrode active material layer, and to inhibit oxidative decomposition of the electrolytic solution.

The non-aqueous electrolytic solution of the present embodiment preferably comprises dimethyl carbonate (DMC) and ethyl methyl carbonate (EMC), which are linear carbonate compounds, as the non-aqueous solvent. The volume ratio of dimethyl carbonate to ethyl methyl carbonate (DMC/EMC) is preferably 0.5 or greater and 8.0 or less, more preferably 0.8 or greater and 6.0 or less, and furthermore preferably 1.0 or greater and 4.0 or less. When DMC/EMC is 0.5 or greater, the viscosity of the electrolytic solution can be reduced, and high lithium ion conductance can be exhibited. When DMC/EMC is 8.0 or less, the melting point of the mixed solvent can be maintained low, and high input/output characteristics can be exhibited even in a lowered temperature environment.

Moreover, the non-aqueous electrolytic solution of the present embodiment may contain other linear carbonate as the non-aqueous solvent. Other linear carbonate includes dialkyl carbonate compounds represented by diethyl carbonate, dipropyl carbonate, dibutyl carbonate, etc. The dialkyl carbonate compounds are typically unsubstituted.

The total content of the linear carbonate is preferably 30% by weight or greater, more preferably 35% by weight or greater and preferably 95% by weight or less, more preferably 90% by weight or less, based on the total amount of the non-aqueous electrolytic solution. When the content of the linear carbonate is 30% by weight or greater, the viscosity of the electrolytic solution can be reduced, and high lithium ion conductance can be exhibited. When the total concentration is 95% by weight or less, the electrolytic solution can further contain additives described below.

[Additive]

The non-aqueous electrolytic solution of the present embodiment may also further contain additives. The additives are not particularly restricted, and include, for example, the thiophene compounds represented by the above formula (1), cyclic sulfate compounds represented by the above formula (2-1), sultone compounds, compounds represented by the above formula (2-4), cyclic sulfite compounds represented by the above formula (2-5), cyclic phosphazenes, acyclic fluoroethers, fluorinated cyclic carbonates, cyclic carbonates, cyclic carboxylates, cyclic acid anhydrides, etc., which may be used alone or in mixtures of two or more.

The sultone compounds include sultone compounds represented by formula (2-2) or (2-3) or sultone compounds represented by the following formula (7).

[Chemical formula 13]

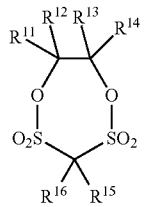

(7)

wherein, in formula (7), $R^{11}$, $R^{12}$, $R^{13}$, $R^{14}$, $R^{15}$, and $R^{16}$ each represent a hydrogen atom, a halogen atom, an alkyl group having 1 to 12 carbon atoms or a halogenated alkyl group having 1 to 12 carbon atoms and may be the same or different. These sultone compounds may be used alone or in mixtures of two or more.

In the present embodiment, the sultone compounds represented by formula (7) is preferably 1,5,2,4-dioxadithiepane 2,2,4,4-tetraoxide from the viewpoint of little adverse effect on the resistance and inhibiting gas generation by inhibition of the decomposition of the non-aqueous electrolytic solution at an elevated temperature, and other sultone compounds include methylenebis(benzenesulfonic acid), methylenebis(phenylmethanesulfonic acid), methylenebis (ethane sulfonic acid), methylenebis(2,4,6, trimethylbenzenesulfonic acid), and methylenebis(2-trifluoromethylbenzenesulfonic acid), and at least one selected from them is preferred.

The total content of the sultone compounds in the non-aqueous electrolytic solution of the non-aqueous lithium-type electricity storage element in the present embodiment is preferably 0.5% by weight or greater and 15% by weight or less based on the total amount of the non-aqueous electrolytic solution. When the total content of the sultone compounds in the non-aqueous electrolytic solution is 0.5% by weight or greater, gas generation due to decomposition of the electrolytic solution at an elevated temperature, can be inhibited. On the other hand, when the total content is 15% by weight or less, a decrease in the ionic conductance of the electrolytic solution can be inhibited, and high input/output characteristics can be maintained. Further, the content of the sultone compound present in the non-aqueous electrolytic solution of the non-aqueous lithium-type electricity storage element is preferably 1% by weight or greater and 10% by weight or less from the viewpoint of achieving both high input/output characteristics and durability, and it is more preferably 3% by weight or greater and 8% by weight or less.

[Cyclic Phosphazene]

Cyclic phosphazene includes, for example, ethoxypentafluorocyclotriphosphazene, diethoxytetrafluorocyclotriphosphazene, phenoxypentafluorocyclotriphosphazene, etc., and preferably one or more selected from them are used.

The content of the cyclic phosphazene in the non-aqueous electrolytic solution is preferably 0.5% by weight or greater and 20% by weight or less based on the total amount of the non-aqueous electrolytic solution. When the value is 0.5% by weight or greater, it will be possible to inhibit decomposition of the electrolytic solution at elevated temperatures and to reduce gas generation. When the value is no greater than 20% by weight, on the other hand, it will be possible to lower the ionic conductance of the electrolytic solution, and to maintain a high input/output characteristic. The cyclic phosphazene content is more preferably 2% by weight or greater and 15% by weight or less, and furthermore preferably 4% by weight or greater and 12% by weight or less.

Incidentally, these cyclic phosphazenes can be used alone or in mixtures of two or more.

[Acyclic Fluorine-Containing Ethers]

Acyclic fluorine-containing ethers include $HCF_2CF_2OCH_2CF_2CF_2H$, $CF_3CFHCF_2OCH_2CF_2CF_2H$, $HCF_2CF_2CH_2OCH_2CF_2CF_2H$, $CF_3CFHCF_2OCH_2CF_2CFHCF_3$, etc., among which $HCF_2CF_2OCH_2CF_2CF_2H$ is preferred from the viewpoint of electrochemical stability.

The content of the acyclic fluorine-containing ether is preferably 0.5% by weight or higher and 15% by weight or lower, and more preferably 1% by weight or higher and 10% by weight or lower, based on the total amount of the non-aqueous electrolytic solution. When the acyclic fluorine-containing ether content is 0.5% by weight or higher, the stability of the non-aqueous electrolytic solution against oxidative decomposition thereof will be increased and an electricity storage element with high durability upon elevated temperatures will be obtained. When the acyclic fluorine-containing ether content is 15% by weight or lower, on the other hand, the electrolyte salt solubility will be kept satisfactory and high ionic conductance of the non-aqueous electrolytic solution will be maintained, which thus allows high input/output characteristics to be exhibited. Incidentally, the acyclic fluorine-containing ether used may be the single ether or a mixture of two or more types.

[Fluorine-Containing Cyclic Carbonate]

The fluorine-containing cyclic carbonate used is preferably one selected from among fluoroethylene carbonate (FEC) and difluoroethylene carbonate (dFEC), from the viewpoint of compatibility with other non-aqueous solvents.

The content of the fluorine-containing cyclic carbonate is preferably 0.5% by weight or higher and 10% by weight or lower, and more preferably 1% by weight or higher and 5% by weight or lower, with respect to the total amount of the non-aqueous electrolytic solution. When the fluorine-containing cyclic carbonate content is 0.5% by weight or higher, it will be possible to form a satisfactory coating layer on the negative electrode, and reductive decomposition of the electrolytic solution on the negative electrode will be inhibited, to obtain an electricity storage element with high durability at elevated temperatures. When the fluorine-containing cyclic carbonate content is 10% by weight or lower, on the other hand, the electrolyte salt solubility will be kept satisfactory and high ionic conductance of the non-aqueous electrolytic solution will be maintained, which thus allows high input/output characteristics to be exhibited.

The fluorine-containing cyclic carbonate may be used as single carbonate or as a mixture of two or more types.

[Cyclic Carbonate]

The cyclic carbonate is preferably vinylene carbonate.

The content of the cyclic carbonate is preferably 0.5% by weight % or higher and 10% by weight or lower, more preferably 1% by weight or higher and 5% by weight or lower, with respect to the total amount of the non-aqueous electrolytic solution. When the cyclic carbonate content is 0.5% by weight or higher, it will be possible to form a satisfactory coating layer on the negative electrode, and reductive decomposition of the electrolytic solution on the negative electrode will be inhibited, to obtain an electricity storage element with high durability at elevated temperatures. When the cyclic carbonate content is 10% by weight or lower, on the other hand, the electrolyte salt solubility will be kept satisfactory and high ionic conductance of the non-aqueous electrolytic solution will be maintained, which thus allows high input/output characteristics to be exhibited.

[Cyclic Carboxylates]

Cyclic carboxylate includes, for example, γ-butyrolactone, γ-valerolactone, γ-caprolactone, ε-caprolactone, etc., and preferably at least one selected from them is used. Particularly preferred among them is γ-butyrolactone, from the viewpoint of improving the cell characteristic due to improved lithium ion dissociation.

The content of the cyclic carboxylate is preferably 0.5% by weight or higher and 15% by weight or lower and more preferably 1% by weight or higher and 5% by weight or lower, with respect to the total amount of the non-aqueous electrolytic solution. When the cyclic acid anhydride content is 0.5% by weight or higher, it will be possible to form a satisfactory coating film on the negative electrode, and reductive decomposition of the electrolytic solution on the negative electrode will be inhibited, to obtain an electricity storage element with high durability upon elevated temperatures. When the cyclic carboxylate content is 15% by weights or lower, on the other hand, the electrolyte salt solubility will be kept favorable and high ionic conductance of the non-aqueous electrolytic solution will be maintained, which thus allows high input/output characteristics to be exhibited. Incidentally, the cyclic carboxylates may be used as single carboxylate or as a mixture of two or more types.

[Cyclic Acid Anhydrides]

The cyclic acid anhydride is preferably one or more selected from among succinic anhydride, maleic anhydride, citraconic anhydride and itaconic anhydride. Among them, succinic anhydride and maleic anhydride are preferably selected from the viewpoint of industrial availability to reduce production cost of the electrolytic solution, and from the viewpoint of facilitation of dissolution in the non-aqueous electrolytic solution.

The content of the cyclic acid anhydride is preferably 0.5% by weight or higher and 15% by weight or lower and more preferably 1% by weight or higher and 10% by weight or lower, with respect to the total amount of the non-aqueous electrolytic solution. When the cyclic acid anhydride content is 0.5% by weight or higher, it will be possible to form a satisfactory coating layer on the negative electrode, and reductive decomposition of the electrolytic solution on the negative electrode will be inhibited, to obtain an electricity storage element with high durability during periods of elevated temperatures. When the cyclic acid anhydride content is 15% by weight or lower, on the other hand, the electrolyte salt solubility will be kept favorable and high ionic conductance of the non-aqueous electrolytic solution will be maintained, which thus allows high input/output characteristics to be exhibited. Incidentally, these cyclic acid anhydrides may be used alone, or two or more may be used in admixture.

[Metal Elements in Electrolytic Solution]

The non-aqueous electrolytic solution according to the present embodiment has the element concentration of at least one element selected from the group consisting of Ni, Mn, Fe, Co, and Al, that is preferably 10 ppm or higher and 1000 ppm or lower, more preferably 15 ppm or higher and 800 ppm or lower, and furthermore preferably 20 ppm or higher and 600 ppm or lower. When the element concentration is 10 ppm or higher, the metal element in the negative electrode is ionized when the electricity storage element is exposed to elevated temperatures and high voltages, which enables to inhibit release of Li ions from the lithium compound in the positive electrode. Consequently, generation of reactive active species can be inhibited, and a voltage drop at elevated temperatures and high voltages can be inhibited. The element concentration of 1000 ppm or lower enables to inhibit formation of a coating layer having low Li ion conductivity at the negative electrode interface, which leads to the increased output of the electricity storage element. Moreover, since the protective layer formed at the negative electrode active material layer interface does not rupture, the electricity storage element having sufficient elevated temperature durability can be obtained. The electrolytic solution may contain any of these elements and may contain two or more thereof. When the electrolytic solution contains two or more elements, the total concentration thereof may be 20 ppm or higher and 2000 ppm or lower.

The method of adding at least one selected from the group consisting of Ni, Mn, Fe, Co, and Al to the electrolytic solution is not particularly limited, but includes a method of mixing a compound containing these elements with the positive electrode precursor, applying an voltage to decompose and elute them; a method of dissolving them in an electrolytic solution, etc. Among them, a method of mixing a compound containing any of Ni, Mn, Fe, Co, and Al with the positive electrode precursor and applying a voltage to decompose and elute them, is preferred.

[Method for Quantifying Metal Elements in Non-Aqueous Electrolytic Solution]

The method for quantifying the metal element contained in the non-aqueous electrolytic solution is not particularly limited, and includes, for example, a method for taking out the non-aqueous electrolytic solution from the electricity storage element after completion thereof, and calculating the quantification value by using ICP-AES, atomic absorption analysis, X-ray fluorescence analysis, a neutron activation analysis, ICP-MS, etc.

[Separator]

The positive electrode precursor and negative electrode may be stacked or wound via a separator, to form an electrode stacked body or electrode wound body comprising a positive electrode precursor, negative electrode and separator.

The separator used may be a polyolefin microporous membrane such as a polyethylene microporous membrane or polypropylene microporous membrane used in lithium ion secondary batteries, or a cellulose nonwoven sheet used in electrical double layer capacitors, nonwoven fabric comprising a polyester-based resin, etc. A film composed of organic or inorganic microparticles may also be stacked on one or both sides of these separators. Organic or inorganic microparticles may also be included inside a separator.

The thickness of the separator is preferably 5 μm or greater and not greater than 35 μm. The thickness is preferably 5 μm or greater, as this will tend to reduce self-discharge due to internal micro short-circuit. On the other hand, the thickness is also preferably no greater than 35 μm, as this will tend to result in higher input/output characteristics of the electricity storage element.

Moreover, the thickness of a film composed of organic or inorganic microparticles is preferably 1 μm or greater and not greater than 10 μm. The thickness of a film composed of organic or inorganic microparticles of 1 μm or greater is preferred, as this will tend to reduce self-discharge due to internal micro short-circuit. The thickness no greater than 10 μm is also preferred as this will tend to result in higher input/output characteristics of the electricity storage element.

The porosity of the separator of the present embodiment is preferably 30% to 75%, and more preferably 55% to 70%. To set the porosity to 30% or more is also preferable from the viewpoint of following the rapid movement of lithium ions during rapid charge and discharge. On the other hand, to set the porosity to 70% or less is preferable from the viewpoint of improving the film strength and enables to inhibit an internal short-circuit of the electricity storage element due to ruggedness or foreign substances on the electrode surface.

[Non-Aqueous Lithium-Type Electricity Storage Element]

The non-aqueous lithium-type electricity storage element of the present embodiment, as described below, consists of the electrode stacked body or the electrode wound body that is housed in a casing together with the non-aqueous electrolytic solution.

[Assembly]

The electrode stacked body obtained in a cell assembly step has a positive electrode terminal and a negative electrode terminal connected to a stacked body obtained by laminating a positive electrode precursor and negative electrode cut into the form of sheets with a separator interposed there between. By using the stacked electrode, the distance between the positive electrode and the negative electrode can be made uniform when housed in the casing, so that the internal resistance is reduced and the output of the electricity storage element can be enhanced.

Moreover, the electrode wound body has a positive electrode terminal and a negative electrode terminal connected to a wound body obtained by winding a positive electrode precursor and negative electrode with a separator interposed there between. The shape of the electrode wound body may be a cylindrical shape or a flat type but is preferably a flat type from the viewpoint of improving the filling ratio of the electricity storage element in the form of a pack. By using the wound electrodes, the time required for the cell assembly step can be shortened, which improves production efficiency.

There are no particular limitations on the method used to connect the positive electrode terminal and negative electrode terminal and these terminals are connected by a method such as resistance welding or ultrasonic welding.

[Casing]

A metal can or laminated film, etc., can be used for the casing.

The metal can is preferably an aluminum can or aluminum alloy can. A safety valve is preferably provided on the lid of the metal can. With the safety valve, gas can be released when the internal pressure of a battery rises due to gas generation. The filling ratio of the electrode stacked body in the casing can be increased by using the metal can, and thereby the energy density can be improved.

A film obtained by laminating a metal foil and resin film is preferable for the laminated film, and an example thereof is that having a three-layer configuration consisting of an outer layer resin film, metal foil and inner resin film. The outer layer resin film serves to prevent the metal foil from being damaged by contact, etc., and a resin such as nylon or polyester, etc., can be preferably used. The metal foil is for preventing permeation of moisture and gas, and copper foil, aluminum foil, stainless steel foil, etc., can be used preferably. Moreover, the inner resin film protects the metal foil from the non-aqueous electrolytic solution housed therein while also serving to melt-seal the casing during heat-sealing, and polyolefin, acid-modified polyolefin, etc., can be used preferably. By using the laminated film, the heat dissipation property of the electricity storage element is enhanced and durability at an elevated temperature can be improved.

[Housing in Casing]

The dried electrode stacked body or electrode wound body is preferably housed in a casing typically represented by a metal can or laminated film and then sealed while leaving only one opening. In the case of the electrode wound body, it is preferably formed into a flat shape by using a press machine before housed in the casing. In this case, the wound body may be heated upon pressing. After the wound body is formed into a flat shape, it is housed in the casing. From the viewpoint of improving the adhesion between the casing and the wound electrode body, it is preferable to press and heat again by using a press machine after the housing.

There are no particular limitations on the method used to seal the casing, and a method such as heat sealing or impulse sealing, etc., is used in the case of using a laminated film.

[Drying]

The electrode stacked body or electrode wound body housed in the casing is preferably removed of residual solvent by drying. There are no particular limitations on the drying method and drying is carried out by vacuum drying, etc. The amount of residual solvent per weight of the positive electrode active material layer or negative electrode active material layer is preferably 1.5% by weight or less. When the amount of residual solvent exceeds 1.5% by weight, solvent remains within the system which causes exacerbation of self-discharging characteristics and cycle characteristics, which thereby makes this undesirable.

[Solution Injection, Impregnation and Sealing Steps]

Following completion of the assembly step, the non-aqueous electrolytic solution is injected into the electrode stacked body or electrode wound body housed in the casing. Following completion of this solution injection step, further impregnation is preferably carried out to thoroughly immerse the positive electrode, negative electrode and separator in the non-aqueous electrolytic solution. In the state in which at least a portion of the positive electrode, negative electrode and separator is immersed in the non-aqueous electrolytic solution, doping proceeds unevenly in a lithium doping step to be subsequently described, and resistance of the resulting non-aqueous lithium-type electricity storage element increases or durability decreases. There are no particular limitations on the method used for the aforementioned impregnation, and a method that can be used consists of installing the electrode stacked body or electrode wound body in pressure reduction chamber following injection of electrolytic solution with the casing left open, reducing pressure inside the chamber by using a vacuum pump, and then returning the pressure inside the chamber to atmospheric pressure. Following completion of the impregnation step, the electrode stacked body or electrode wound body is sealed with the casing open while reducing pressure, to seal inside the casing. When a metal can is used, a sealing means such as welding or crimping, etc., is used.

[Lithium Doping Step]

In the lithium doping step, the negative electrode active material layer is preferably pre-doped with lithium ions by decomposing the lithium compound by applying a voltage between the positive electrode precursor and negative electrode to decompose the lithium compound in the positive electrode precursor and release lithium ions followed by reducing lithium ions at the negative electrode.

In this lithium doping step, gases such as $CO_2$, etc., is generated accompanying oxidative decomposition of the lithium compound in the positive electrode precursor. Consequently, when applying a voltage, it is preferable to devise a means for releasing the generated gas outside the casing. Such a means includes, for example, a method consisting of applying voltage with a portion of the casing open, and a method consisting of applying voltage with a suitable gas release means such as a gas venting valve or gas-permeable film installed in a portion of the casing, etc.

[Aging Step]

Aging is preferably carried out on the electrode stacked body or electrode wound body following completion of the lithium doping step. Solvent present in the non-aqueous electrolytic solution is decomposed at the interface between the electrode and the electrolytic solution in the aging step, and a solid polymer coating layer that is permeable to lithium ions is formed on the surface of the electrode.

There are no particular limitations on the aforementioned aging method, and for example, a method consisting of having the solvent present in the non-aqueous electrolytic solution reacted in an elevated temperature environment, etc., can be used.

[Additional Charge and Discharge]

Additional charge and discharge are preferably carried out on the electrode stacked body or electrode wound body after aging of the electricity storage element according to the present embodiment. By carrying out the additional charge and discharge, the surface functional groups on the activated carbon surface formed by the decomposition reaction of the lithium compound upon the lithium doping step, are stabilized, and active sites that interact reversibly with Li ions are formed. Consequently, it becomes possible to store more electricity than the active material capacity that the activated carbon originally has possessed in the positive electrode active material, which enables to improve the battery capacity. Moreover, active sites that interact reversibly with Li ions have low interaction energy with Li ions, so that even in a lowered temperature environment, diffusion of Li ions is not prevented and the output can be maintained high.

[Gas Venting Step]

By following completion of the aging step, gas venting is preferably carried out to reliably remove gas remaining in the non-aqueous electrolytic solution, positive electrode and negative electrode. In a state in which gas remains in at least a portion of the non-aqueous electrolytic solution, positive electrode and negative electrode, resistance of the resulting non-aqueous lithium-type electricity storage element ends up increasing due to prevention of ion conduction.

There are no particular limitations on the method used to carry out the aforementioned gas venting, and a method that can be used consists of installing the electrode stacked body or electrode wound body in a pressure reduction chamber with the casing left open and then reducing pressure inside the chamber by using a vacuum pump.

[Electrostatic Capacitance]

In the present description, the electrostatic capacitance F (F) refers to a value obtained by the following method:

A cell corresponding to the non-aqueous lithium-type electricity storage elements was charged with a constant current charge at a current value of 20 C until reaching 4.2 V in a thermostatic bath set to 25° C., and then charged with application of a constant voltage of 4.2 V for a total of 30 minutes. Subsequently, the capacitance obtained when it was discharged with a constant current at a current value of 2 C down to 2.2 V, refers to Q, and by using the obtained Q, $F=Q/(4.2-2.2)$ was calculated as the electrostatic capacitance F.

[Electrical Energy]

Throughout the present description, the electrical energy E (Wh) is the value obtained by the following method:

By using the electrostatic capacitance F (F) calculated according to the method previously described, $F \times (4.2-2.2)/2/3600$ can be calculated as the electrical energy E.

[Volume]

The volume of the non-aqueous lithium-type electricity storage element is not particularly prescribed, but it is the volume of the portion of the electrode stacked body or electrode wound body in which the region where the positive electrode active material layer and negative electrode active material layer are stacked, is housed by the casing.

For example, in the case of an electrode stacked body or electrode wound body housed with a laminate film, the region of the electrode stacked body or electrode wound body where the positive electrode active material layer and negative electrode active material layer are present, is housed in a cup-shaped laminate film, but the volume ($V_{11}$) of the non-aqueous lithium-type electricity storage element is calculated by $V_{11}=l_1 \times w_1 \times t_1$, by using the outer length ($l_1$) and outer width ($w_1$) of the cup-shaped portion, and the thickness ($t_1$) of the non-aqueous lithium-type electricity storage element including the laminate film.

In the case of an electrode stacked body or electrode wound body housed in a rectilinear metal can, the volume of the outer dimensions of the metal can is simply used as the volume of the non-aqueous lithium-type electricity storage element. Namely, the volume ($V_{22}$) of the non-aqueous lithium-type electricity storage element is calculated by $V_{22}=l_2 \times w_2 \times t_2$, based on the outer length ($l_2$) and outer width ($w_2$), and outer thickness ($t_2$), of the rectilinear metal can.

Moreover, even in the case of an electrode wound body housed in a cylindrical metal can, the volume of the outer dimensions of the metal can is used as the volume of the non-aqueous lithium-type electricity storage element. Namely, the volume ($V_{33}$) of the non-aqueous lithium-type power storage element is calculated by $V_{33}=3.14 \times r \times r \times l_3$, using the outer radius (r) and outer length ($l_3$) of the bottom face or top face of the cylindrical metal can.

[Energy Density]

In the present description, energy density refers to the value obtained from the formula E/Vi (Wh/L) by using electrical energy E and volume Vii (wherein, i=1, 2 or 3).

[Room-Temperature Internal Resistance]

In the present description, room-temperature internal resistance Ra (Ω) refers to the value obtained according to the method indicated below:

First, a cell corresponding to the non-aqueous lithium-type electricity storage element is charged with a constant current at a current value of 20 C until reaching 4.2 V in a thermostatic chamber set to 25° C., and subsequently charged with a constant voltage by applying a constant voltage of 4.2 V for a total of 30 minutes. Continuing, it is discharged with a constant current at a current value of 20 C down to 2.2 V to obtain a discharging curve (time vs. voltage). The room-temperature internal resistance is the value calculated from equations consisting of voltage drop ΔE=4.2−Eo, and Ra=ΔE/(20 C (current value A)) when the voltage at a discharge time is 0 seconds, obtained by extrapolating by linear approximation from the voltages at discharge times of 2 seconds and 4 seconds in the discharging curve, is defined as Eo.

[Lowered Temperature Internal Resistance]

In the present description, lowered temperature internal resistance Rc refers to the value obtained according to the method indicated below.

First, a cell corresponding to the non-aqueous lithium-type electricity storage element is allowed to stand for 2 hours in a thermostatic chamber set to −30° C. Subsequently, while holding the temperature of the thermostatic chamber at −30° C., the cell is charged with a constant current at a current value of 1.0 C up to 4.2 V, and then charged with a constant voltage for a total of 2 hours by applying a constant voltage of 4.2 V. Continuing, it is discharged at a current value of 10 C down to 2.2 V to obtain a discharging curve (time vs. voltage). The lowered temperature internal resistance is the value calculated from equations consisting of voltage drop ΔE=4.2−Eo, and Rc=ΔE/(10 C (current value A)) when the voltage at a discharge time is 0 seconds, obtained by extrapolating by linear approximation from the voltages at discharge times of 2 seconds and 4 seconds in the discharging curve, is defined as Eo.

[Elevated Temperature Storage Test]

In the present description, the amount of gas generated during an elevated temperature storage test and the ratio of the increase in room-temperature internal resistance after an elevated temperature storage test are measured according to the methods indicated below.

First, a cell corresponding to the non-aqueous lithium-type electricity storage element is charged with a constant current at a current value of 100 C until reaching 4.2 V in a thermostatic chamber set to 25° C., and then charged with a constant voltage for 10 minutes by applying a constant voltage of 4.2 V. Subsequently, the cell is stored in an environment at 60° C., removed from the 60° C. environment every 2 weeks and then charged up to a cell voltage of 4.2 V by using the aforementioned charging step and again stored in an environment at 60° C. This step is repeated and a cell volume prior to the start of storage Va and a cell volume after carrying out the storage test for 2 months Vb are measured according to the Archimedes method. Vb−Va is taken to be the amount of gas generated when the cell is stored for 2 months at a cell voltage of 4.2 V and ambient temperature of 60° C.

When the resistance value of the cell following the aforementioned elevated temperature storage test obtained by using the same measurement method as that used to measure room-temperature internal resistance as previously described, is defined as a room-temperature internal resistance Rb after the elevated temperature storage test, the ratio of the increase in room-temperature internal resistance after the elevated temperature storage test to the room-temperature internal resistance Ra prior to the start of the elevated temperature storage test is determined according to Rb/Ra.

(High-Load Charge/Discharge Cycle Test)

Throughout the present specification, the ratio of increase in resistance after a charge/discharge cycle testing under a high load is measured by the following method: First, in a thermostatic bath set to 25° C., a cell corresponding to the non-aqueous lithium-type electricity storage element is charged with a constant current at the 300 C current value until 4.2 V is reached, and then discharged with a constant current at the 300 C current value until 2.2 V is reached. The charge/discharge step is repeated 60,000 times followed by measurement of the capacitances before the start of the test and after completion of the test, and when the capacitance before the start of the test is Fa (F) and the capacitance after completion of the test is Fd (F), the capacitance retention ratio Fd/Fa is calculated.

The non-aqueous lithium-type electricity storage element according to the present embodiment preferably simultaneously satisfies the following requirements when the initial room-temperature resistance is defined as Ra (Ω), electrostatic capacitance is defined as F (F), electrical energy is defined as E (Wh), volume of the casing in which the electricity storage element is housed, is defined as V (L), and internal resistance is defined as Rc:

(a) the product Ra·F of Ra and F is 0.5 or greater and not greater than 3.0, (b) E/V is 20 or greater and not greater than 80, and (c) Rc/Ra is not greater than 30.

With regard to requirement (a), Ra·F is preferably 3.0 or less, more preferably 2.6 or less and even more preferably 2.4 or less from the viewpoint of producing sufficient charge capacity and discharge capacity with respect to large current. If Ra·F is equal to or less than the aforementioned upper limit value, a non-aqueous lithium-type electricity storage element can be obtained that has superior input/output characteristics. Consequently, when an electricity storage system using the non-aqueous lithium-type electricity storage element is combined with a highly efficient engine, etc., the electricity storage system is able to adequately withstand high loads applied to the non-aqueous lithium-type electricity storage element, which thereby makes this preferable.

With regard to requirement (b), E/V is preferably 20 or greater, more preferably 25 or greater and even more preferably 30 or greater from the viewpoint of producing adequate charge capacity and discharge capacity. If E/V is equal to or greater than the aforementioned lower limit value, an electricity storage element can be obtained that has superior volumetric energy density. Consequently, in the case of using an electricity storage system using the non-aqueous lithium-type electricity storage element by combining with an automobile engine, for example, the electricity storage system can be installed in a limited confined space within the automobile, which thereby makes this preferable.

With regard to requirement (c), Rc/Ra is preferably 30 or less, more preferably 26 or less and even more preferably 22 or less from the viewpoint of producing adequate charge capacity and discharge capacity under a lowered temperature environment at −30° C. If Rc/Ra is equal to or less than the aforementioned upper limit value, an electricity storage element can be obtained that has superior output characteristics even under a lowered temperature environment. Consequently, the non-aqueous lithium-type electricity storage element becomes capable of imparting an electric power to drive a motor when starting an engine of an automobile or motorbike, etc., under a lowered temperature environment.

The non-aqueous lithium-type electricity storage element according to the present embodiment preferably simultaneously satisfies the following requirements (d) and (e) when the initial room-temperature resistance is defined as Ra ($\Omega$), electrostatic capacitance is defined as F (F), internal resistance at 25° C. after storing for 2 months at a cell voltage of 4.2 V and ambient temperature of 60° C. is defined as Rb ($\Omega$), and internal resistance at an ambient temperature of −30° C. is defined as Rc:

(d): Rb/Ra is 0.3 or greater and not greater than 3.0 and (e) the amount of gas generated when stored for 2 months at a cell voltage of 4.2 V and ambient temperature of 60° C. is $30 \times 10^{-3}$ cc/F or less at 25° C.

With respect to requirement (d), Rb/Ra is preferably 3.0 or less from the viewpoint of exhibiting sufficient charge capacity and discharge capacity for a large current when exposed to an elevated temperature environment for a long time, and it is more preferably 2.0 or less, and even more preferably 1.5 or less. When Rb/Ra is equal to or less than the above upper limit, excellent output characteristics can stably be obtained for a long period of time, which leads to longevity of the element.

With respect to requirement (e), the amount of gas generated when stored for 2 months at a cell voltage of 4.2 V and ambient temperature of 60° C. when measured at 25° C. is preferably $30 \times 10^{-3}$ cc/F or less, more preferably $20 \times 10^{-3}$ cc/F or less, and even more preferably $15 \times 10^{-3}$ cc/F or less from the viewpoint of preventing decreases in element characteristics caused by generated gas. If the amount of gas generated under the aforementioned conditions is equal to or less than the aforementioned upper limit value, there is no risk of swelling of the cell due to generation of gas even in the case of a device being exposed to elevated temperatures for a long period of time. Consequently, an electricity storage element can be obtained that has satisfactory stability and durability.

[Application of Non-Aqueous Alkali Metal-Type Electricity Storage Elements]

A plurality of non-aqueous alkali metal-type electricity storage elements according to the present embodiment may be connected in series or in parallel to create an electricity storage module. Moreover, since the non-aqueous alkali metal-type electricity storage element and electricity storage module of the present embodiment can also achieve high input/output characteristics as well as safety at elevated temperatures, they may be suitably utilized in a regeneration power assist system, power load leveling system, uninterruptible power supply system, contactless power supply system, energy harvesting system, electricity storage system, electric power steering system, emergency power supply system, in-wheel motor system, idling stop system, rapid charging system, smart grid system, backup power supply systems, etc. The backup power supply system can be used for a plurality of power supplies for vehicles such as electric vehicles and electric motorcycles and refers to a second or subsequent power supply system among the plurality of power supply systems. The electricity storage system is suitably used for natural power generation such as solar power generation or wind power generation, etc., the power load-leveling system is suitably used for micro grids, etc., and the uninterruptible power supply system is suitably used for factory production facilities, etc., respectively. In the contactless power supply system, the non-aqueous alkali metal electricity-type storage element is utilized for leveling voltage fluctuations of microwave transmission or electric field resonance, etc., and electricity storage of energy, and in the energy harvesting system, the non-aqueous alkali metal-type electricity storage element is suitably utilized in order to use the electric power generated by vibration power generation, etc., respectively.

In the electricity storage system, as a cell stack, a plurality of non-aqueous alkali metal-type electricity storage elements are connected in series or in parallel, or the non-aqueous alkali metal-type electricity storage element and a lead-acid battery, a nickel metal hydride battery, a lithium ion secondary battery or a fuel cell are connected in series or in parallel.

Moreover, since the non-aqueous lithium-type electricity storage element according to the present embodiment can achieve both high input/output characteristics and safety at elevated temperatures, it can be installed in, for example, vehicles such as electric vehicles, plug-in hybrid vehicles, hybrid vehicles, electric motorcycles, etc., or a hybrid construction machine. The hybrid construction machine is a construction machine provided with a combination of a fuel engine such as light oil or gasoline, etc., and an electricity storage element, and may be a manned (manned vehicle) vehicle or an unmanned (unmanned driverless) vehicle, which may be, for example, a shovel car, wheel loader, replaceable attachment construction machine, etc. The power regeneration assist system, electric power steering system, emergency power supply system, in-wheel motor system, idling stop system, backup power supply system, or a combination thereof described above is suitably mounted on the vehicles or the hybrid construction machines.

EXAMPLES

The invention will now be explained in greater detail by using examples and comparative examples, with the understanding that the invention is not limited to the examples.

Example 1

<Pulverization of Lithium Carbonate>

15 parts by weight of lithium carbonate having a BET specific surface area of 0.9 m$^2$/g and a fine pore volume P of 0.001 cc/g and 85 parts by weight of IPA (isopropanol) were used and mixed with a homodisper to obtain a lithium carbonate suspension. This lithium carbonate suspension was pulverized with a wet bead mill for 2 hours to obtain a lithium compound-containing slurry. The obtained lithium compound-containing slurry was heated to 50° C. under reduced pressure with a heating mixer, and then dried while stirring for 3 hours to prepare lithium carbonate. The mean particle diameter of the obtained lithium carbonate was measured to determine the particle diameter of the lithium carbonate charged of 0.5 μm.

[Preparation of Positive Electrode Active Material A]

A carbide was obtained by subjecting pulverized coconut shell carbide to carbonization treatment for 3 hours at 500° C. in a compact carbonization furnace in the presence of nitrogen. The resulting carbide was placed in an activation furnace and steam was introduced into the aforementioned activation furnace at the rate of 1 kg/h while in a warmed state to activate the carbide by raising the temperature to 900° C. over the course of 8 hours. The carbide was removed following activation and cooled in a nitrogen atmosphere to obtain activated carbon. The resulting activated carbon was washed by rinsing with water for 10 hours and then allowed to drain. Subsequently, after drying for 10 hours in an electric dryer held at a temperature of 115° C., pulverization was carried out for 1 hour with a ball mill to obtain activated carbon A.

Measurement of mean particle diameter of this activated carbon A by using a laser diffraction-type particle size distribution measurement apparatus (SALD-2000) manufactured by Shimadzu Corp. yielded a value of 4.2 μm. Moreover, fine pore size distribution was measured by using a fine pore size distribution measurement apparatus (AUTOSORB-1 AS-1-MP) manufactured by Yuasa Ionics Co., Ltd. As a result, BET specific surface area was 2360 m$^2$/g, mesopore volume (V1) was 0.52 cc/g, micropore volume (V2) was 0.88 cc/g, and V1/V2=0.59.

[Preparation of Positive Electrode Active Material B]

A carbide having a mean particle diameter of 7 μm was obtained by carrying out carbonization treatment on a phenol resin for 2 hours at 600° C. in a calcination furnace in a nitrogen atmosphere followed by pulverizing with a ball mill and classification. KOH was mixed with this carbide at a weight ratio of 1:5 followed by activating by heating for 1 hour at 800° C. in the calcination furnace in a nitrogen atmosphere. Subsequently, after washing the activated compound by stirring for 1 hour in dilute hydrochloric acid adjusted to 2 mol/L, the activated compound was washed by boiling in distilled water until the pH stabilized between 5 and 6 and then dried to obtain activated carbon B.

Fine pore size distribution of this activated carbon B was measured by using a fine pore size distribution measurement apparatus (AUTOSORB-1 AS-1-MP) manufactured by Yuasa Ionics Co., Ltd. As a result, BET specific surface area was 3627 m$^2$/g, mesopore volume (V1) was 1.50 cc/g, micropore volume (V2) was 2.28 cc/g, and V1/V2=0.66.

<Production of Positive Electrode Precursor A>

A positive electrode precursor was produced by using the activated carbon A obtained in the manner described above for the positive electrode active material.

42.4 parts by weight of activated carbon A, 45.1 parts by weight of a lithium compound in the form of lithium carbonate having a mean particle diameter of 0.5 μm, 3.0 parts by weight of KB (Ketjen black), 1.5 parts by weight of PVP (polyvinylpyrrolidone), 8.0 parts by weight of PVDF (polyvinylidene difluoride) and NMP (N-methylpyrrolidone) were mixed followed by dispersing under conditions of a peripheral velocity of 17 m/s by using the FILMIX® thin film rotating-type high-speed mixer manufactured by Primix Corp. to obtain a coating solution. The viscosity (ηb) and TI value of the resulting coating solution were measured by using the TVE-35H E-type viscometer manufactured by Toki Sangyo Co., Ltd. As a result, viscosity (ηb) was 2,700 mPa·s and the TI value was 3.5. Moreover, dispersity of the resulting coating solution was measured by using a particle gauge manufactured by Yoshimitsu Seiki Co., Ltd. As a result, dispersity was 35 μm. One side or both sides of an aluminum foil having a thickness of 15 μm was coated with the coating solution under conditions of a coating speed of 1 m/s by using a die coater manufactured by Toray Engineering Co., Ltd., and the coating film was dried at a drying temperature of 100° C. to obtain a positive electrode precursor. The resulting positive electrode precursor was pressed under conditions of a pressure of 4 kN/cm and pressed surface temperature of 25° C. by using a roll press. The film thickness of the positive electrode active material layer of the positive electrode precursor obtained as described above was determined by subtracting the thickness of the aluminum foil from the average value of thickness of the positive electrode precursor measured at ten arbitrary locations by using the GS-551 Linear Gauge Sensor film thickness gauge manufactured by Ono Sokki Co., Ltd. As a result, film thickness of the positive electrode active material layer was 110 μm per side. The basis weight of the positive electrode active material layer per one side thereof was 52 g·m$^{-2}$ by the method describe above.

In the following descriptions, a single-sided positive electrode precursor and double-sided positive electrode precursor by using activated carbon A are respectively referred to as single-sided positive electrode precursor A and double-sided positive electrode precursor A (collectively referred to as "positive electrode precursor A"). A single-sided positive electrode precursor and double-sided positive electrode precursor by using activated carbon B are respectively referred to as single-sided positive electrode precursor B and double-sided positive electrode precursor B (collectively referred to as "positive electrode precursor B").

<Preparation of Negative Electrode Active Material>

[Preparation of Negative Electrode Active Material A]

150 g of artificial graphite having a mean particle diameter of 6.2 μm and BET specific surface area of 7.2 m$^2$/g was placed in a stainless steel mesh cage, the cage was placed on a stainless steel tray containing 15 g of coal-based pitch (softening point: 65° C.), and both the cage and tray were installed in an electric furnace (effective internal furnace dimensions: 300 mm×300 mm×300 mm). The temperature of the cage and tray was raised to 1,250° C. in 8 hours in nitrogen atmosphere and subjected to heat reaction by holding at the same temperature for 4 hours to obtain negative electrode active material A. Continuing, after allowing to cool naturally to 60° C., the negative electrode active material A was removed from the furnace.

The resulting negative electrode active material A was measured for mean particle diameter and BET specific surface area by using the same methods as previously described. As a result, mean particle diameter was 6.4 μm and BET specific surface area was 5.2 m$^2$/g.

<Production of Negative Electrode A>

Next, a negative electrode was produced by using the negative electrode active material A for the negative electrode active material.

85 parts by weight of the negative electrode active material A, 10 parts by weight of acetylene black, 5 parts by weight of PVdF (polyvinylidene difluoride) and NMP (N-methylpyrrolidone) were mixed followed by dispersing under conditions of a peripheral velocity of 15 m/s by using the FILMIX® thin film rotating-type high-speed mixer manufactured by Primix Corp. to obtain a coating solution. The viscosity (ηb) and TI value of the resulting coating solution were measured by using the TVE-35H E-type viscometer manufactured by Toki Sangyo Co., Ltd. As a result, viscosity (0) was 2,789 mPa·s and the TI value was 4.3. Both sides of an electrolytic copper foil having a thickness of 10 μm and free of through holes was coated with the aforementioned coating solution under conditions of a coating speed of 1 m/s by using a die coater manufactured by Toray Engineering Co., Ltd., and the coating film was dried at a drying temperature of 85° C. to obtain negative electrode A. The resulting negative electrode A was pressed under conditions of a pressure of 4 kN/cm and pressed surface temperature of 25° C. using a roll press. The film thickness of the negative electrode active material layer of the negative electrode A obtained as described above was determined by subtracting the thickness of the copper foil from the average value of thickness of the negative electrode A measured at ten arbitrary locations by using the GS-551 Linear Gauge Sensor film thickness gauge manufactured by Ono Sokki Co., Ltd. As a result, the basis weight of the negative electrode A per one side thereof was 30 g/m$^2$ and the film thickness was 40 μm.

[Measurement of Capacity Per Unit Weight of Negative Electrode]

The obtained negative electrode A was cut out to a single size of 1.4 cm×2.0 cm (2.8 cm$^2$), and one side of the negative electrode active material layer, with which both sides of copper foil were coated, was removed using a spatula, brush or bristles to produce a working electrode. Metal lithium was used as the counter electrode and reference electrode, respectively to fabricate an electrochemical cell in an argon box by using a non-aqueous solution of LiPF$_6$ dissolved to a concentration of 1.0 mol/L in a mixed solvent of ethylene carbonate (EC) and ethyl methyl carbonate (EMC) at a volume ratio of 1:1, as the electrolytic solution.

The initial charge capacity of the obtained electrochemical cell was measured by the following procedure by using a charge/discharge apparatus (TOSCAT-3100U) manufactured by Toyo System Co., Ltd.

The electrochemical cell was subjected to constant-current charge at a temperature of 25° C., with a current value of 0.5 mA/cm$^2$ until reaching a voltage value of 0.01 V, and then to constant-voltage charge until the current value reached 0.01 mA/cm$^2$. When the charge capacity during constant-current charge and constant-voltage charge was evaluated as the initial charge capacity, the capacity per unit weight of the negative electrode A (lithium ion doping amount) was 400 mAh/g.

[Preparation of Negative Electrode Active Material B]

150 g of commercially available coconut shell activated carbon having a mean particle diameter of 3.0 μm and BET specific surface area of 1,780 m$^2$/g was placed in a stainless steel mesh cage, the cage was placed on a stainless steel tray containing 270 g of coal-based pitch (softening point: 50° C.), and both the cage and tray were installed in an electric furnace (effective internal furnace dimensions: 300 mm×300 mm×300 mm) and subjected to a thermal reaction to obtain negative electrode active material B. This heat treatment was carried out in a nitrogen atmosphere according to a method consisting of raising the temperature to 600° C. for 8 hours and holding at the same temperature for 4 hours. Continuing, after allowing to cool naturally to 60° C., the negative electrode active material B was removed from the furnace.

The resulting negative electrode active material B was measured for mean particle diameter and BET specific surface area by using the same methods as previously described. As a result, mean particle diameter was 3.2 μm and BET specific surface area was 262 m$^2$/g.

[Preparation of Negative Electrode Active Material C]

100 parts by weight of carbon black (CB1) having a mean particle diameter of 30 nm and a BET specific surface area of 254 m$^2$/g, and 50 parts by weight of an optically isotropic pitch (P1) having a softening point of 110° C. and a metaphase amount (QI amount) of 13% were kneaded with a heating kneader, and the obtained kneaded product was calcinated at 1,000° C. in a non-oxidizing atmosphere. The calcinated product was pulverized to a mean particle diameter (D50) of 7 μm to obtain composite porous material C as negative electrode active material C. The BET specific surface area of the obtained negative electrode active material C was measured by using the same method as previously described, which results in the BET specific surface area of 180 m$^2$/g.

[Preparation of Negative Electrode Active Material D]

By pulverizing the hardly graphitizable carbon, negative electrode active material D having a mean particle diameter of 5 μm and a BET specific surface area of 6 m$^2$/g was obtained.

<Production of Negative Electrode B, Negative Electrode C, and Negative Electrode D>

Negative electrode B, negative electrode C, and negative electrode D were respectively produced in the same manner as the negative electrode A except that the negative electrode active materials B, C, and D obtained above were used as the negative electrode active materials. As a result of measuring the doping amount of lithium ions in the same manner as in the negative electrode A, the doping amount of the negative electrode B was 750 mAh/g, the doping amount of the negative electrode C was 1300 mAh/g, and the doping amount of the negative electrode D was 420 mAh/g.

<Production of Negative Electrode E>

75 parts by weight of silicone having a mean particle diameter of 0.9 μm, 10 parts by weight of Ketjen black, 15 parts by weight of a polyimide binder and NMP (N-methylpyrrolidone were mixed followed by dispersing under conditions of a peripheral velocity of 15 m/s using the FILMIX® thin film rotating-type high-speed mixer manufactured by Primix Corp. to obtain a coating solution (negative electrode active material E). The viscosity (ηb) and TI value of the resulting coating solution were measured by using the TVE-35H E-type viscometer manufactured by Toki Sangyo Co., Ltd. As a result, viscosity (ηb) was 2,982 mPa·s and the TI value was 3.2. Both sides of an electrolytic copper foil having a thickness of 10 μm and R$_{zjis}$ of 1.5 μm was coated with the coating solution under conditions of a coating speed of 1 m/s by using a die coater manufactured by Toray Engineering Co., Ltd., and the coating film was dried at a drying temperature of 85° C. to obtain a negative electrode (hereinafter also referred to as "double-sided negative electrode"). The resulting double-sided negative electrode was pressed under conditions of a pressure of 4 kN/cm and pressed surface temperature of 25° C. by using a roll press to obtain negative electrode E. The total film thickness of the negative electrode E was measured at ten arbitrary locations of the negative electrode by using the GS-551 Linear Gauge Sensor film thickness gauge manufactured by Ono Sokki Co., Ltd. The film thickness of the negative electrode active material layer of the negative electrode E was determined by subtracting the thickness of the copper foil from the average value of total thickness of the negative electrode E. As a result, the basis weight of the negative electrode active material layer of the negative electrode E per one side thereof was 20 g/m² and the film thickness thereof was 30 μm. The doping amount of lithium ions was measured in the same manner as in the negative electrode A, and the doping amount of the negative electrode E was 600 mAh/g.

<Production of Negative Electrode F>

85 parts by weight of lithium titanate ($Li_{4/3}Ti_{5/3}O_4$) having a mean particle diameter of 5 μm and a BET specific surface area of 7 m²/g, 10 parts by weight of acetylene black, 5 parts by weight of PVdF (polyvinylidene difluoride), and NMP (N-methylpyrrolidone) were mixed followed by dispersing under conditions of a peripheral velocity of 15 m/s by using the FILMIX® thin film rotating-type high-speed mixer manufactured by Primix Corp. to obtain a coating solution (negative electrode active material F). The viscosity (ηb) and TI value of the resulting coating solution were measured by using the TVE-35H E-type viscometer manufactured by Toki Sangyo Co., Ltd. As a result, viscosity (ηb) was 2,789 mPa·s and the TI value was 4.3. Both sides of an electrolytic copper foil having a thickness of 10 μm without through-holes were coated with the coating solution under conditions of a coating speed of 1 m/s by using a die coater manufactured by Toray Engineering Co., Ltd., and the coating film was dried at a drying temperature of 85° C. to obtain a negative electrode. The resulting negative electrode was pressed under conditions of a pressure of 4 kN/cm and pressed surface temperature of 25° C. by using a roll press to obtain negative electrode F. The film thickness of the negative electrode active material layer of the negative electrode F obtained above was determined by subtracting the thickness of the copper foil from the average value of thickness of the negative electrode F measured at ten arbitrary locations by using the GS-551 Linear Gauge Sensor film thickness gauge manufactured by Ono Sokki Co., Ltd. As a result, the basis weight of the negative electrode active material layer of the negative electrode F per one side thereof was 35 g/m² and the film thickness thereof was 40 μm. The doping amount of lithium ions was measured in the same manner as in the negative electrode A, and the doping amount of the negative electrode F was 180 mAh/g.

<Preparation of Electrolytic Solution>

A solution obtained by using an organic solvent in the form of a mixed solvent of ethylene carbonate (EC), dimethyl carbonate (DMC) and methyl ethyl carbonate (EMC) at a ratio (volume ratio) of 34:44:22 and dissolving electrolyte salts respectively consisting of $LiN(SO_2F)_2$ and $LiPF_6$ at a concentration ratio of 25:75 (molar ratio) and a total concentration of $LiN(SO_2F)_2$ and $LiPF_6$ of 1.2 mol/L, in the entire non-aqueous electrolytic solution, was used as a non-aqueous electrolytic solution 1.

The concentrations of $LiN(SO_2F)_2$ and $LiPF_6$ in the prepared nonaqueous electrolytic solution were 0.3 mol/L and 0.9 mol/L, respectively.

<Assembly of Electricity Storage Element>

The resulting double-sided negative electrode A and double-sided positive electrode precursor A were cut to a size of 10 cm×10 cm (100 cm²). Single-sided positive electrode precursors were used on the uppermost side and lowermost side, and polyethylene microporous membrane separators A having a thickness of 15 μm and porosity of 65% were stacked interposed between the negative electrode and positive electrode precursor by using 21 sheets of the double-sided negative electrode and 20 sheets of the double-sided positive electrode precursor.

<Welding of Terminals>

Subsequently, the negative electrode and positive electrode precursor were respectively connected to a negative electrode terminal and positive electrode terminal by ultrasonic welding to obtain an electrode stacked body. This electrode stacked body was vacuum-dried for 60 hours at 80° C. and 50 Pa. This electrode stacked body was then inserted into a casing composed of a laminated film in a dry atmosphere having a dew point of −45° C. followed by heat sealing the casing of the electrode terminal portion and bottom portion on three sides at 180° C. and 1.0 MPa for 20 seconds.

<Solution Injection, Impregnation and Sealing Steps of Electricity Storage Element>

Approximately 80 g of the aforementioned non-aqueous electrolytic solution 1 was injected under atmospheric pressure into the electrode stacked body housed in an aluminum laminated film in a dry air environment at a temperature of 25° C. and dew point of −40° C. or lower. Continuing, the aforementioned non-aqueous lithium-type electricity storage element was placed in a pressure reduction chamber and the pressure was reduced from normal pressure to −87 kPa followed by returning to atmospheric pressure and allowed to stand undisturbed for 5 minutes. Subsequently, a step consisting of reducing pressure from normal pressure to −87 kPa and then returning to atmospheric pressure was repeated four times followed by allowing to stand undisturbed for 15 minutes. Moreover, pressure was again reduced from normal pressure to −91 kPa followed by returning to normal pressure. The aforementioned step of reducing pressure followed by returning to normal pressure was repeated a total of seven times (while reducing pressure to −95 kPa, −96 kPa, −97 kPa, −81 kPa, −97 kPa, −97 kPa and −97 kPa each time). The non-aqueous electrolytic solution was impregnated in the electrode stacked body according to the aforementioned process.

Subsequently, the non-aqueous lithium-type electricity storage element was placed in a reduced-pressure sealing machine and sealed for 10 seconds at 180° C. and pressure of 0.1 MPa while reducing the pressure in the machine to −95 kPa, to seal the aluminum laminated film.

<Lithium Doping Step>

The resulting non-aqueous lithium-type electricity storage element was charged with a constant current at a current value of 0.7 A until the voltage reached 4.7 V in an environment at 25° C. by using a charge and discharge apparatus (TOSCAT-3100U) manufactured by Toyo System Co., Ltd., and initial charging was then carried out according to a procedure consisting of continuing constant voltage charging at 4.7 V for 10 hours to dope the negative electrode with lithium.

<Aging Step>

The non-aqueous lithium-type electricity storage element after the lithium doping was discharged with a constant current at 0.7 A in an environment at 25° C. until the voltage reached 3.0 V, the voltage was adjusted to 4.0 V by carrying out constant current and constant voltage charging up to 4.0 V for 1 hour. Continuing, the non-aqueous lithium-type electricity storage element was stored for 20 hours in a thermostatic chamber at 60° C.

<Additional Charge/Discharge Step>

The non-aqueous lithium-type electricity storage element after the aging was discharged with a constant current at 10 A in an environment at 25° C. until the voltage reached 2.5 V, the charge/discharge step of charging from 2.5 V to 3.9 V at a current of 10 A, and discharging down to 2.5 V at a current of 10 A, was repeated 5 times.

<Gas Venting Step>

A portion of the aluminum laminated film of the non-aqueous lithium-type electricity storage element after the additional charge/discharge step, was opened in a dry air environment at a temperature of 25° C. and dew point of −40° C. Continuing, the aforementioned non-aqueous lithium-type electricity storage element was placed in a pressure reduction chamber, and after reducing pressure from atmospheric pressure to −80 kPa over the course of 3 minutes by using a diaphragm pump (N816.3KT.45.18) manufactured by KNF Japan Co., Ltd., pressure was returned to atmospheric pressure over the course of 3 minutes, and this step was repeated a total of three times. Subsequently, the non-aqueous lithium-type electricity storage element was placed in a pressure reduction chamber and pressure was reduced to −90 kPa followed by sealing for 10 seconds at 200° C. and pressure of 0.1 MPa to seal the aluminum laminated film.

<Analysis of Positive Electrode Active Material Layer>

After adjusting the voltage of the completed non-aqueous lithium-type electricity storage element to 2.9 V, the electricity storage element was disassembled in an Ar glovebox installed in a room at 23° C. and controlled to a dew point of −90° C. or lower and oxygen concentration of 1 ppm or less followed by removal of the positive electrode. After washing the removed positive electrode by immersing in dimethyl carbonate (DMC), the positive electrode was vacuum-dried in a side box while maintaining prevention of exposure to the atmosphere.

the positive electrode following the drying was transferred from the side box to an Ar glovebox while maintaining prevention of exposure to the atmosphere.

[Solid-State $^7$Li-NMR Measurement]

The positive electrode active material layer was collected from the positive electrode obtained above and weighed. Solid-state $^7$Li-NMR measurement of the obtained positive electrode active material layer was carried out as a sample. NMR measurement was carried out by using an ECA700 manufactured by JEOL Resonance Inc. (having an $^7$Li-NMR resonance frequency of 272.1 MHz) as the measuring apparatus in a room temperature environment according to the single pulse method by using a magic-angle spinning speed of 14.5 kHz and an irradiation pulse width of 45°. A 0.8 mol/L aqueous lithium chloride solution was used for the shift reference, and a separately measured shift location was set to 0 ppm for use as an external standard. During measurement, repetitive latency was set to 300 seconds and integration times were set to 32 times to ensure an adequate repetitive latency between measurements.

In the solid-state $^7$Li NMR spectrum of the positive electrode active material layer obtained under the aforementioned conditions, the area ratios of both components each are obtained by separating the peaks with the assumption of the peak top of the signal A appearing at −2 ppm to 2.5 ppm and the peak top of the signal B appearing at −6 ppm to −2.5 ppm with respect to the signals observed in the range of −30 ppm to 30 ppm. The peak separation was carried out by fitting by the least-square method under the assumption that the peaks each consist of 25% of a Gaussian curve and 75% of a Lorentz curve and the half width is in the range of 300 Hz to 1000 Hz.

[Determination of Energy Density]

Constant current charging was carried out on the electricity storage element obtained according to the aforementioned steps up to 4.2 V at a current value of 2 C by using a charge and discharge apparatus (5 V, 360 A) manufactured by Fujitsu Telecom Networks Ltd. in a thermostatic chamber at 25° C., followed by carrying out constant voltage charging for 30 minutes by applying a constant voltage of 4.2 V. Subsequently, determination of energy density according to $E/V=F\times(4.2-2.2)^2/2/V$ by defining capacitance during constant current discharge down to 2.2 V at a current value of 2 C, that was carried out after the aforementioned constant voltage charging, as Q and using electrostatic capacitance F (F) determined according to $F=Q/(4.2-2.2)$, yielded a value of 35.3 Wh/L.

[Determination of Ra·F]

The electricity storage element obtained according to the aforementioned steps was charged up to 4.2 V with a constant current at a current value of 20 C by using a charge and discharge apparatus (5 V, 360 A) manufactured by Fujitsu Telecom Networks Ltd. in a thermostatic chamber at 25° C., followed by carrying out constant voltage charging for 30 minutes by applying a constant voltage of 4.2 V and carrying out constant current discharging down to 2.2 V at a current value of 20 C to obtain a discharging curve (time vs. voltage). Room-temperature internal resistance Ra was determined according to voltage drop $\Delta E=4.2-E_o$, and $Ra=\Delta E/(20\ C$ (current value A)) when the voltage at a discharge time of 0 seconds, obtained by extrapolating by linear approximation from the voltage values at discharge times of 2 seconds and 4 seconds in the discharging curve, was defined as Eo.

The product Ra·F of electrostatic capacitance F and internal resistance Ra at 25° C. was 2.45 ΩF.

[Determination of Rc/Ra]

After allowing the electricity storage element obtained according to the aforementioned steps to stand for 2 hours in a thermostatic chamber set to −30° C., the electricity storage element was charged up to 4.2 V with a constant current at a current value of 1.0 C by using a charge and discharge apparatus (5 V, 360 A) manufactured by Fujitsu Telecom Networks Ltd. while holding the thermostatic chamber at −30° C., followed by charging at a constant voltage for a total of 2 hours by applying a constant voltage of 4.2 V. Continuing, constant current discharging was carried out down to 2.2 V at a current value of 120 C to obtain a discharging curve (time vs. voltage) followed by determining lowered temperature internal resistance Rc according to the aforementioned method used to determine internal resistance.

The ratio Rc/Ra of internal resistance Rc at −30° C. to internal resistance Ra at 25° C. was 16.3.

Examples 2 to 8 and Comparative Examples 1 and 2

Non-aqueous lithium-type electricity storage elements were each fabricated in the same manner as in Example 1 and subjected to various evaluations, except that the negative electrode, positive electrode precursor active material, lithium compound, lithium compound ratio in the positive electrode precursor were changed to those respectively shown in Table 1.

Evaluation results are shown in Table 2.

Example 9

Non-aqueous lithium-type electricity storage element was fabricated in the same manner as in Example 1 and subjected to various evaluations, except for the lithium doping step as described below.

Evaluation results are shown in Table 2.
<Lithium Doping Step>

The obtained non-aqueous lithium-type electricity storage element was charged with a constant current at a current value of 0.7 A until the voltage reached 4.8 V in an environment at 25° C. by using a charge and discharge apparatus (TOSCAT-3100U) manufactured by Toyo System Co., Ltd., and initial charging was then carried out according to a procedure consisting of continuing constant voltage charging at 4.8 V for 10 hours to dope the negative electrode with lithium.

Example 10

Non-aqueous lithium-type electricity storage elements was fabricated in the same manner as in Example 1 and subjected to various evaluations, except for the lithium doping step as described below.
<Lithium Doping Step>

The obtained non-aqueous lithium-type electricity storage element was charged with a constant current at a current value of 0.7 A until the voltage reached 4.5 V in an environment at 25° C. by using a charge and discharge apparatus (TOSCAT-3100U) manufactured by Toyo System Co., Ltd., and initial charging was then carried out according to a procedure consisting of continuing constant voltage charging at 4.5 V for 10 hours to dope the negative electrode with lithium.

Example 11

Non-aqueous lithium-type electricity storage element was fabricated in the same manner as in Example 1 and subjected to various evaluations, except for the lithium doping step as described below.
<Lithium Doping Step>

The obtained non-aqueous lithium-type electricity storage element was charged with a constant current at a current value of 0.7 A until the voltage reached 4.3 V in an environment at 25° C. by using a charge and discharge apparatus (TOSCAT-3100U) manufactured by Toyo System Co., Ltd., and initial charging was then carried out according to a procedure consisting of continuing constant voltage charging at 4.3 V for 10 hours to dope the negative electrode with lithium.

Example 12

Non-aqueous lithium-type electricity storage element was fabricated in the same manner as in Example 1 and subjected to various evaluations, except for the additional charge/discharge step as described below.
<Additional Charge/Discharge Step>

The non-aqueous lithium-type electricity storage element after the aging was discharged with a constant current at 10 A in an environment at 25° C. until the voltage reached 2.6 V, charged from 2.6 V to 4.0 V at a current of 10 A, and then discharged down to 2.6 V at a current of 10 A, and this charge and discharge step was repeated 5 times.

Example 13

Non-aqueous lithium-type electricity storage element was fabricated in the same manner as in Example 1 and subjected to various evaluations, except for the additional charge/discharge step as described below.
<Additional Charge/Discharge Step>

The non-aqueous lithium-type electricity storage element after the aging was discharged with a constant current at 10 A in an environment at 25° C. until the voltage reached 2.4 V, charged from 2.4 V to 3.8 V at a current of 10 A, and then discharged down to 2.4 V at a current of 10 A, and this charge and discharge step was repeated 5 times.

Example 14

Non-aqueous lithium-type electricity storage element was fabricated in the same manner as in Example 1 and subjected to various evaluations, except for the additional charge/discharge step as described below.
<Additional Charge/Discharge Step>

The non-aqueous lithium-type electricity storage element after the aging was discharged with a constant current at 10 A in an environment at 25° C. until the voltage reached 2.3 V, charged from 2.3 V to 3.6 V at a current of 10 A, and then discharged down to 2.3 V at a current of 10 A, and this charge and discharge step was repeated 5 times.

Comparative Example 3

Non-aqueous lithium-type electricity storage element was fabricated in the same manner as in Example 1 and subjected to various evaluations, except for not carrying out the additional charge/discharge step.

Example 15

[Fabrication of Positive Electrode Precursor C Containing Transition Metal Oxide]

43.1 parts by weight of activated carbon A, 14.4 parts by weight of $LiCoO_2$ having a mean particle diameter of 3.5 µm as lithium transition metal oxide, 30 parts by weight of lithium carbonate, 3.0 parts by weight of Ketjen black, 1.5 parts by weight of PVP (polyvinylpyrrolidone), 8.0 parts by weight of PVDF (polyvinylidene difluoride), and NMP (N-methyl-2-pyrrolidone) so that the weight ratio of the solid content was 24.5%, were mixed, and the mixture was dispersed for 3 minutes under conditions of a peripheral velocity of 20 m/s by using the FILMIX® (registered trademark) thin film rotating-type high-speed mixer manufactured by Primix Corp. to obtain a positive electrode coating solution 1.

The viscosity ($\eta b$) and TI value of the resulting positive electrode coating solution 1 were measured by using the TVE-35H E-type viscometer manufactured by Toki Sangyo Co., Ltd. As a result, viscosity ($\eta b$) was 2,690 mPa·s and the TI value was 6.6. Moreover, dispersity of the resulting positive electrode coating solution 1 was measured by using a particle gauge manufactured by Yoshimitsu Seiki Co., Ltd. As a result, dispersity was 23 µm.

One side or both sides of an aluminum foil having a thickness of 15 μm was coated with the positive electrode coating solution 1 under conditions of a coating speed of 1 m/s by using a double-sided die coater manufactured by Toray Engineering Co., Ltd. and the coating film was dried sequentially at 70° C., 90° C., 110° C., and 130° C. in this order in a drying chamber set to these chamber temperatures followed by drying by an IR heater to obtain positive electrode precursor C. The resulting positive electrode precursor C was pressed under conditions of a pressure of 6 kN/cm and pressed surface temperature of 25° C. by using a roll press. The total film thickness of the positive electrode precursor C was measured at ten arbitrary locations of the positive electrode precursor C by using the GS-551 Linear Gauge Sensor film thickness gauge manufactured by Ono Sokki Co., Ltd. The film thickness of the positive electrode active material layer obtained by subtracting the thickness of the aluminum foil was 70 μm per one side. As a result of calculating the basis weight of the positive electrode active material layer in the manner described above, the basis weight thereof was 45 g·m$^{-2}$ per one side.

A non-aqueous lithium-type electricity storage element was fabricated in the same manner as in Example 1 except for the preparation of the aforementioned positive electrode precursor and subjected to the various evaluations. The weight proportion $A_1$ of the carbon material and the weight proportion $A_2$ of the lithium transition metal oxide contained in the positive electrode active material layer in the positive electrode of the completed non-aqueous lithium-type electricity storage element were calculated by the above-described method. The results are shown in Table 2.

Examples 16 to 33 and Comparative Examples 4 to 7

Non-aqueous lithium-type electricity storage elements were each fabricated in the same manner as in Example 15 and subjected to various evaluations, except that the negative electrode, positive electrode active material in the positive electrode precursor, lithium compound, lithium compound ratio in the positive electrode precursor were changed to those respectively shown in Table 1.

Evaluation results are shown in Table 2.

Incidentally, the abbreviated titles of the positive electrode active materials in Tables 1, 3, 5 and 10 refer to the following, respectively.

NCA: $LiNi_{0.80}Co_{0.15}Al_{0.05}O_2$
NCM: $LiNi_{0.33}Co_{0.33}Al_{0.33}O_2$

Example 34

The electricity element was assembled in the same manner as Example 23 by using the negative electrode F. The non-aqueous lithium-type electricity storage element was fabricated in the same manner as in Example 23 except that the following steps from the lithium doping step to the additional charge/discharge step as described below were carried out.

<Lithium Doping Step>

The obtained non-aqueous lithium-type electricity storage element was charged with a constant current at a current value of 0.7 A until the voltage reached 3.2 V in an environment at 25° C. by using a charge and discharge apparatus (TOSCAT-3100U) manufactured by Toyo System Co., Ltd., and initial charging was then carried out according to a procedure consisting of continuing constant voltage charging at 3.2 V for 10 hours to dope the negative electrode with lithium.

<Aging Step>

The non-aqueous lithium-type electricity storage element after the lithium doping was discharged with a constant current at 0.7 A in an environment at 25° C. until the voltage reached 1.6 V, the voltage was adjusted to 3.0 V by carrying out constant current and constant voltage charging up to 3.0 V for 1 hour. Continuing, the nonaqueous lithium-type power storage element was stored for 20 hours in a thermostatic chamber at 60° C.

<Additional Charge/Discharge Step>

The non-aqueous lithium-type electricity storage element after the aging was discharged with a constant current at 10 A in an environment at 25° C. until the voltage reached 1.6 V, the charge/discharge step of charging from 1.6 V to 3.0 V at a current of 10 A, and discharging down to 1.6 V at a current of 10 A, was repeated 5 times.

[Determination of Energy Density]

Constant current charging was carried out on the electricity storage element obtained according to the aforementioned step up to 3.0 V at a current value of 2 C by using a charge and discharge apparatus (5 V, 360 A) manufactured by Fujitsu Telecom Networks Ltd. in a thermostatic chamber at 25° C., followed by carrying out constant voltage charging for 30 minutes by applying a constant voltage of 3.0 V. Subsequently, determination of energy density according to E/V=F×(3.0−1.5)$^2$/2/V by defining capacitance during constant current discharging down to 1.5 V at a current value of 2 C as Q and using electrostatic capacitance F (F) determined according to F=Q/(3.0−1.5), yielded a value of 35.4 Wh/L.

[Determination of Ra·F]

The electricity storage element obtained according to the aforementioned steps was charged with a constant current up to 3.0 V at a current value of 20 C by using a charge and discharge apparatus (5 V, 360 A) manufactured by Fujitsu Telecom Networks Ltd. in a thermostatic chamber at 25° C., followed by carrying out constant voltage charging for 30 minutes by applying a constant voltage of 3.0 V and carrying out constant current discharging down to 1.5 V at a current value of 20 C to obtain a discharging curve (time vs. voltage). Room-temperature internal resistance Ra was determined according to voltage drop ΔE=3.0−Eo, and Ra=ΔE/(20 C (current value A)) when the voltage at a discharge time of 0 seconds, obtained by extrapolating by linear approximation from the voltage values at discharge times of 2 seconds and 4 seconds in the discharging curve, was defined as Eo.

The product Ra·F of electrostatic capacitance F and internal resistance Ra at 25° C. was 0.75 ΩF.

[Determination of Rc/Ra]

After allowing the electricity storage element obtained according to the aforementioned steps to stand for 2 hours in a thermostatic chamber set to −30° C., the electricity storage element was charged with a constant current up to 3.0 V at a current value of 1.0 C by using a charge and discharge apparatus (5 V, 360 A) manufactured by Fujitsu Telecom Networks Ltd. while holding the thermostatic chamber at −30° C., followed by charged with a constant voltage for a total of 2 hours by applying a constant voltage of 3.8 V. Continuing, constant current discharging was carried out down to 1.5 V at a current value of 120 C to obtain a discharging curve (time vs. voltage) followed by determining lowered temperature internal resistance Rc according to the aforementioned method used to determine internal resistance.

The ratio Rc/Ra of internal resistance Rc at −30° C. to internal resistance Ra at 25° C. was 6.4.

Comparative Examples 8 to 11

Non-aqueous lithium-type electricity storage elements were each fabricated in the same manner as in Example 15 and subjected to various evaluations, except that the type or proportion of the positive electrode active material was changed to the type or proportion shown in Table 1 and the additional charge/discharge step was not carried out.

Comparative Example 12

The negative electrode B2 was fabricated in the same manner as in the fabrication of the negative electrode B except that the negative electrode current collector was changed to a 15 μm-thick copper foil having through-holes. As a result, the thickness of the negative electrode active material layer of the negative electrode B2 was 40 μm per one side.

<Production of Positive Electrode Precursor A2>

A positive electrode precursor A2 was produced by using the activated carbon A as a positive electrode active material.

87.5 parts by weight of activated carbon A, 3.0 parts by weight of KB (Ketjen black), 1.5 parts by weight of PVP (polyvinylpyrrolidone), 8.0 parts by weight of PVDF (polyvinylidene difluoride) and NMP (N-methylpyrrolidone) were mixed followed by dispersing under conditions of a peripheral velocity of 17 m/s by using the FILMIX® thin film rotating-type high-speed mixer manufactured by Primix Corp. to obtain a coating solution. The viscosity (ηb) and TI value of the resulting coating solution were measured by using the TVE-35H E-type viscometer manufactured by Toki Sangyo Co., Ltd. As a result, viscosity (ηb) was 2,700 mPa·s and the TI value was 3.5. Moreover, dispersity of the resulting coating solution was measured by using a particle gauge manufactured by Yoshimitsu Seiki Co., Ltd. As a result, dispersity was 35 μm. One side or both sides of aluminum foil having a thickness of 15 μm was coated with the coating solution under conditions of a coating speed of 1 m/s by using a die coater manufactured by Toray Engineering Co., Ltd., and the coating film was dried at a drying temperature of 100° C. to obtain a positive electrode precursor. The resulting positive electrode precursor was pressed under conditions of a pressure of 4 kN/cm and pressed surface temperature of 25° C. by using a roll press to obtain positive electrode precursor A2. The film thickness of the positive electrode active material layer of the positive electrode precursor A2 obtained as described above was determined by subtracting the thickness of the aluminum foil from the average thickness value of the positive electrode precursor measured at ten arbitrary locations by using the GS-551 Linear Gauge Sensor film thickness gauge manufactured by Ono Sokki Co., Ltd. As a result, film thickness of the positive electrode active material layer was 120 μm per side. As a result of calculating a basis weight by the method described above, the basis weight of the positive electrode active material layer per one side thereof was 36 g·m$^{-2}$.

<Assembly of Electricity Storage Element>

The resulting double-sided negative electrode B2 and double-sided positive electrode precursor A2 were cut to a size of 10 cm×10 cm (100 cm$^2$). On one side of the double-sided negative electrode B2, a lithium metal foil equivalent to 760 mAh/g per unit weight of the negative electrode active material B was adhered. Single-sided positive electrode precursors were used on the uppermost side and lowermost side, and the microporous membrane separators having a thickness of 15 μm were stacked interposed between the negative electrode and positive electrode precursor by using 21 sheets of the double-sided negative electrode subjected to the lithium adhesion step and 20 sheets of the double-sided positive electrode precursor. Subsequently, the negative electrode and positive electrode precursor were respectively connected to a negative electrode terminal and positive electrode terminal by ultrasonic welding to obtain an electrode stacked body. This electrode stacked body was vacuum-dried for 60 hours at 80° C. and 50 Pa. This electrode stacked body was then inserted into a casing composed of a laminated film in a dry atmosphere having a dew point of −45° C. followed by heat sealing the casing of the electrode terminal portions and bottom portion on three sides at 180° C. and 1.0 MPa for 20 seconds, to assemble a non-aqueous lithium-type electricity storage element.

<Lithium Doping Step>

The resulting non-aqueous lithium-type electricity storage element was allowed to stand for 21 hours in a thermostat chamber setting the inside temperature to 45° C. to dope the negative electrode with lithium.

<Aging Step>

After the non-aqueous lithium-type electricity storage element after the lithium doping was adjusted to a cell voltage of 3.0 v, it was stored in a thermostat chamber setting the inside temperature to 45° C. for 24 hours. Subsequently, the charge/discharge cycle in which constant current charging and constant voltage discharging were carried out between the lower voltage of 2.0 V and the upper voltage of 4.0 V with a charging current of 10 A and a discharging current of 10 A, was repeated 2 times by using a charge and discharge apparatus manufactured by Aska Electronic Co., Ltd.

Non-aqueous lithium-type electricity storage element was fabricated in the same manner as in Example 1 and subjected to various evaluations, except that the electricity element assembly, lithium doping step, and aging step were changed to the methods as described above.

The evaluation results are shown in Table 2.

Comparative Examples 13 to 15

Non-aqueous lithium-type electricity storage elements were each fabricated in the same manner as in Comparative Example 12 and subjected to various evaluations, except that the negative electrode, negative electrode active material, and active material in the positive electrode precursor in Comparative Example 12 were changed to those described in Table 1.

The evaluation results are shown in Table 2.

TABLE 1

| | Negative electrode | Positive electrode | | | | |
|---|---|---|---|---|---|---|
| | Active material species | | | Constitutional ratio in positive electrode precursor | | |
| | | Active material | | Active material 1 [wt %] | Active material 2 [wt %] | Lithium compound species | Lithium compound ratio [wt %] |
| | Active material | Active material 1 | Active material 2 | | | | |
| Example 1 | Negative electrode active material A | Activated carbon A | None | 42.4 | — | Lithium carbonate | 45.1 |
| Example 2 | Negative electrode active material A | Activated carbon A | None | 57.5 | — | Lithium carbonate | 30.0 |
| Example 3 | Negative electrode active material A | Activated carbon A | None | 72.5 | — | Lithium carbonate | 15.0 |
| Example 4 | Negative electrode active material A | Activated carbon A | None | 79.5 | — | Lithium carbonate | 8.0 |
| Example 5 | Negative electrode active material A | Activated carbon A | None | 85.5 | — | Lithium carbonate | 2.0 |
| Example 6 | Negative electrode active material B | Activated carbon A | None | 57.5 | — | Lithium carbonate | 30.0 |
| Example 7 | Negative electrode active material A | Activated carbon B | None | 57.5 | — | Lithium carbonate | 30.0 |
| Example 8 | Negative electrode active material B | Activated carbon B | None | 57.5 | — | Lithium carbonate | 30.0 |
| Example 9 | Negative electrode active material A | Activated carbon A | None | 57.5 | — | Lithium carbonate | 30.0 |
| Example 10 | Negative electrode active material A | Activated carbon A | None | 57.5 | — | Lithium carbonate | 30.0 |
| Example 11 | Negative electrode active material A | Activated carbon A | None | 57.5 | — | Lithium carbonate | 30.0 |
| Example 12 | Negative electrode active material A | Activated carbon A | None | 57.5 | — | Lithium carbonate | 30.0 |
| Example 13 | Negative electrode active material A | Activated carbon A | None | 57.5 | — | Lithium carbonate | 30.0 |
| Example 14 | Negative electrode active material A | Activated carbon A | None | 57.5 | — | Lithium carbonate | 30.0 |
| Example 15 | Negative electrode active material A | Activated carbon A | $LiCoO_2$ | 43.1 | 14.4 | Lithium carbonate | 30.0 |
| Example 16 | Negative electrode active material A | Activated carbon A | $LiCoO_2$ | 28.8 | 28.7 | Lithium carbonate | 30.0 |
| Example 17 | Negative electrode active material A | Activated carbon A | $LiCoO_2$ | 19.0 | 38.5 | Lithium carbonate | 30.0 |
| Example 18 | Negative electrode active material A | Activated carbon A | $LiCoO_2$ | 51.8 | 5.7 | Lithium carbonate | 30.0 |
| Example 19 | Negative electrode active material A | Activated carbon A | NCA | 43.1 | 14.4 | Lithium carbonate | 30.0 |
| Example 20 | Negative electrode active material B | Activated carbon A | NCA | 43.1 | 14.4 | Lithium carbonate | 30.0 |
| Example 21 | Negative electrode active material A | Activated carbon A | NCA | 19.0 | 38.5 | Lithium carbonate | 30.0 |
| Example 22 | Negative electrode active material A | Activated carbon A | NCA | 51.8 | 5.7 | Lithium carbonate | 30.0 |
| Example 23 | Negative electrode active material A | Activated carbon A | $LiFePO_4$ | 43.1 | 14.4 | Lithium carbonate | 30.0 |
| Example 24 | Negative electrode active material B | Activated carbon A | $LiFePO_4$ | 43.1 | 14.4 | Lithium carbonate | 30.0 |
| Example 25 | Negative electrode active material E | Activated carbon A | $LiFePO_4$ | 43.1 | 14.4 | Lithium carbonate | 30.0 |
| Example 26 | Negative electrode active material A | Activated carbon A | $LiFePO_4$ | 28.8 | 28.7 | Lithium carbonate | 30.0 |
| Example 27 | Negative electrode active material A | Activated carbon A | $LiFePO_4$ | 17.3 | 40.2 | Lithium carbonate | 30.0 |
| Example 28 | Negative electrode active material A | Activated carbon A | $LiFePO_4$ | 51.8 | 5.7 | Lithium carbonate | 30.0 |
| Example 29 | Negative electrode active material A | Activated carbon A | $LiMn_2O_4$ | 43.1 | 14.4 | Lithium carbonate | 30.0 |
| Example 30 | Negative electrode active material A | Activated carbon A | $LiMn_2O_4$ | 28.8 | 28.7 | Lithium carbonate | 30.0 |
| Example 31 | Negative electrode active material A | Activated carbon A | $LiMn_2O_4$ | 17.3 | 40.2 | Lithium carbonate | 30.0 |
| Example 32 | Negative electrode active material A | Activated carbon A | $LiMn_2O_4$ | 51.8 | 5.7 | Lithium carbonate | 30.0 |
| Example 33 | Negative electrode active material A | Activated carbon A | NCM | 43.1 | 14.4 | Lithium carbonate | 30.0 |
| Example 34 | Negative electrode active material F | Activated carbon A | $LiFePO_4$ | 43.1 | 14.4 | Lithium carbonate | 30.0 |

TABLE 1-continued

| | Negative electrode | Positive electrode | | | | |
|---|---|---|---|---|---|---|
| | Active material | Active material | | Constitutional ratio in positive electrode precursor | | |
| | species | | | Active | Active | Lithium | Lithium |
| | Active material | Active material 1 | Active material 2 | material 1 [wt %] | material 2 [wt %] | compound species | compound ratio [wt %] |
| Comparative example 1 | Negative electrode active material A | Activated carbon A | None | 34.5 | — | Lithium carbonate | 53.0 |
| Comparative example 2 | Negative electrode active material A | Activated carbon A | None | 87.0 | — | Lithium carbonate | 0.5 |
| Comparative example 3 | Negative electrode active material A | Activated carbon A | None | 57.5 | — | Lithium carbonate | 30.0 |
| Comparative example 4 | Negative electrode active material A | Activated carbon A | $LiCoO_2$ | 11.5 | 46.0 | Lithium carbonate | 30.0 |
| Comparative example 5 | Negative electrode active material A | Activated carbon A | NCA | 11.5 | 46.0 | Lithium carbonate | 30.0 |
| Comparative example 6 | Negative electrode active material A | Activated carbon A | $LiFePO_4$ | 11.5 | 46.0 | Lithium carbonate | 30.0 |
| Comparative example 7 | Negative electrode active material A | Activated carbon A | $LiMn_2O_4$ | 11.5 | 46.0 | Lithium carbonate | 30.0 |
| Comparative example 8 | Negative electrode active material A | Activated carbon A | $LiCoO_2$ | 19.0 | 38.5 | Lithium carbonate | 30.0 |
| Comparative example 9 | Negative electrode active material A | Activated carbon A | NCA | 19.0 | 38.5 | Lithium carbonate | 30.0 |
| Comparative example 10 | Negative electrode active material A | Activated carbon A | $LiFePO_4$ | 17.3 | 40.2 | Lithium carbonate | 30.0 |
| Comparative example 11 | Negative electrode active material A | Activated carbon A | $LiMn_2O_4$ | 17.3 | 40.2 | Lithium carbonate | 30.0 |
| Comparative example 12 | Negative electrode active material B | Activated carbon A | None | 87.5 | 0.0 | None | |
| Comparative example 13 | Negative electrode active material B | Activated carbon A | NCA | 26.3 | 61.2 | None | |
| Comparative example 14 | Negative electrode active material B | Activated carbon A | $LiFePO_4$ | 26.3 | 61.2 | None | |
| Comparative example 15 | Negative electrode active material B | Activated carbon A | $LiMn_2O_4$ | 26.3 | 61.2 | None | |

TABLE 2

| | Lithium transition metal compound in positive electrode active material layer | | | | | Evaluation results | | |
|---|---|---|---|---|---|---|---|---|
| | Solid-state $^7$Li-NMR | | | Wight ratio of | | Initial characteristics | | |
| | Area of component A a | Area of component B b | a/b | lithium transition metal compound A2 [wt %] | A2/A1 [wt %] | Volume density E/V [Wh/L] | Initial time constant Ra·F [ΩF] | Lowered temperature resistance ratio Rc/Ra |
| Example 1 | 920 | 240 | 3.8 | — | — | 35.3 | 2.45 | 16.3 |
| Example 2 | 834 | 187 | 4.5 | — | — | 32.7 | 2.13 | 13.2 |
| Example 3 | 780 | 146 | 5.3 | — | — | 29.8 | 1.83 | 12.1 |
| Example 4 | 753 | 94 | 8.0 | — | — | 25.9 | 2.01 | 13.8 |
| Example 5 | 702 | 45 | 15.6 | — | — | 22.8 | 2.27 | 16.9 |
| Example 6 | 865 | 165 | 5.2 | — | — | 28.0 | 1.87 | 11.6 |
| Example 7 | 828 | 220 | 3.8 | — | — | 33.8 | 1.99 | 12.6 |
| Example 8 | 901 | 204 | 4.4 | — | — | 29.0 | 1.71 | 9.8 |
| Example 9 | 850 | 265 | 3.2 | — | — | 34.0 | 2.22 | 13.9 |
| Example 10 | 824 | 165 | 5.0 | — | — | 30.0 | 2.01 | 12.5 |
| Example 11 | 809 | 124 | 6.5 | — | — | 25.2 | 2.45 | 14.9 |
| Example 12 | 830 | 209 | 4.0 | — | — | 37.9 | 2.18 | 13.7 |
| Example 13 | 827 | 175 | 4.7 | — | — | 33.8 | 2.10 | 13.3 |
| Example 14 | 835 | 159 | 5.3 | — | — | 29.0 | 2.27 | 14.6 |
| Example 15 | 898 | 150 | 6.0 | 18.0 | 0.3 | 50.5 | 1.59 | 13.6 |
| Example 16 | 949 | 130 | 7.3 | 35.9 | 1.0 | 40.1 | 1.44 | 11.3 |
| Example 17 | 1104 | 103 | 10.7 | 48.1 | 2.0 | 33.8 | 1.72 | 17.9 |
| Example 18 | 845 | 163 | 5.2 | 7.1 | 0.1 | 48.3 | 1.61 | 13.5 |
| Example 19 | 748 | 187 | 4.0 | 18.3 | 0.3 | 48.1 | 1.51 | 12.5 |
| Example 20 | 790 | 162 | 4.9 | 18.3 | 0.3 | 40.1 | 1.39 | 10.3 |
| Example 21 | 920 | 128 | 7.2 | 49.0 | 2.0 | 32.1 | 1.65 | 16.4 |
| Example 22 | 723 | 198 | 3.7 | 7.3 | 0.1 | 47.1 | 1.56 | 12.9 |
| Example 23 | 1030 | 187 | 5.5 | 17.5 | 0.3 | 60.8 | 1.37 | 11.3 |
| Example 24 | 1110 | 171 | 6.5 | 17.5 | 0.3 | 55.8 | 1.25 | 10.7 |
| Example 25 | 960 | 196 | 4.9 | 17.5 | 0.3 | 65.3 | 1.29 | 10.7 |

TABLE 2-continued

|  | Solid-state $^7$Li-NMR | | | Lithium transition metal compound in positive electrode active material layer | | Evaluation results Initial characteristics | | |
| --- | --- | --- | --- | --- | --- | --- | --- | --- |
|  | Area of component A a | Area of component B b | a/b | Wight ratio of lithium transition metal compound A2 [wt %] | A2/A1 [wt %] | Volume E density E/V [Wh/L] | Initial time constant Ra · F [ΩF] | Lowered temperature resistance ratio Rc/Ra |
| Example 26 | 1180 | 143 | 8.3 | 34.8 | 1.0 | 50.1 | 1.26 | 9.1 |
| Example 27 | 1270 | 98 | 13.0 | 48.7 | 2.3 | 39.7 | 1.50 | 13.9 |
| Example 28 | 1010 | 205 | 4.9 | 6.9 | 0.1 | 57.6 | 1.41 | 11.6 |
| Example 29 | 673 | 214 | 3.1 | 17.8 | 0.3 | 63.2 | 1.49 | 13.1 |
| Example 30 | 711 | 189 | 3.8 | 35.4 | 1.0 | 45.3 | 1.41 | 13.8 |
| Example 31 | 827 | 146 | 5.7 | 49.6 | 2.3 | 33.7 | 1.65 | 18.4 |
| Example 32 | 973 | 98 | 9.9 | 7.0 | 0.1 | 56.7 | 1.48 | 12.6 |
| Example 33 | 769 | 179 | 4.3 | 17.8 | 0.3 | 49.2 | 1.45 | 11.8 |
| Example 34 | 1210 | 145 | 8.3 | 17.8 | 0.3 | 35.4 | 0.75 | 6.4 |
| Comparative example 1 | 640 | 450 | 1.4 | — | — | 54.5 | 3.76 | 40.4 |
| Comparative example 2 | 743 | 32 | 23.2 | — | — | 17.4 | 2.67 | 35.4 |
| Comparative example 3 | 893 | 0 | — | — | — | 28.7 | 2.76 | 30.1 |
| Comparative example 4 | 1325 | 42 | 31.4 | 57.5 | 4.0 | 33.1 | 3.83 | 48.9 |
| Comparative example 5 | 1204 | 52 | 23.0 | 58.6 | 4.0 | 35.2 | 3.65 | 44.0 |
| Comparative example 6 | 1524 | 40 | 38.0 | 55.8 | 4.0 | 42.7 | 3.19 | 37.6 |
| Comparative example 7 | 1192 | 55 | 21.7 | 56.8 | 4.0 | 43.1 | 3.46 | 40.6 |
| Comparative example 8 | 620 | 0 | — | 48.1 | 2.0 | 17.3 | 2.10 | 25.7 |
| Comparative example 9 | 567 | 0 | — | 49.0 | 2.0 | 16.4 | 1.85 | 23.0 |
| Comparative example 10 | 689 | 0 | — | 48.7 | 2.3 | 19.5 | 1.69 | 20.5 |
| Comparative example 11 | 501 | 0 | — | 49.6 | 2.3 | 17.0 | 1.83 | 24.3 |
| Comparative example 12 | 870 | 0 | — | — | — | 12.4 | 1.05 | 10.4 |
| Comparative example 13 | 769 | 0 | — | 56.4 | 2.3 | 13.5 | 1.83 | 22.6 |
| Comparative example 14 | 984 | 0 | — | 54.4 | 2.3 | 17.2 | 1.65 | 20.8 |
| Comparative example 15 | 655 | 0 | — | 55.1 | 2.3 | 14.6 | 1.84 | 24.6 |

Example 35

[Production of Negative Electrode Containing Two Types of Active Materials]

80 parts by weight of the active material mixture consisting of the negative electrode active material A and the negative electrode active material B that were mixed at a ratio of 95:5, 8 parts by weight of acetylene black, 12 parts by weight of PVdF (polyvinylidene difluoride) and NMP (N-methylpyrrolidone) were mixed followed by dispersing under conditions of a peripheral velocity of 15 m/s by using the FILMIX® thin film rotating-type high-speed mixer manufactured by Primix Corp. to obtain a coating solution. The viscosity (ηb) and TI value of the resulting coating solution were measured by using the TVE-35H E-type viscometer manufactured by Toki Sangyo Co., Ltd. As a result, viscosity (0) was 2,789 mPa·s and the TI value was 4.3. Both sides of a 10 μm-thick electrolytic copper foil without through-holes were coated with the coating solution under conditions of a coating speed of 1 m/s by using a die coater manufactured by Toray Engineering Co., Ltd., and the coating film was dried at a drying temperature of 85° C. to obtain a negative electrode. The resulting negative electrode was pressed under conditions of a pressure of 4 kN/cm and pressed surface temperature of 25° C. by using a roll press to obtain negative electrode 2. The film thickness of the negative electrode active material layer of the negative electrode 2 obtained as described above was determined by subtracting the thickness of the copper foil from the average value of thickness of the negative electrode 2 measured at ten arbitrary locations by using the GS-551 Linear Gauge Sensor film thickness gauge manufactured by Ono Sokki Co., Ltd. As a result, the basis weight of the negative electrode active material layer of the negative electrode 2 per one side was 28 g/m² and the film thickness of the negative electrode active material layer was 40 μm.

The non-aqueous lithium-type electricity storage element was fabricated in the same manner as in Example 1 and subjected to various evaluations. The evaluation results are shown in Table 4.

Examples 36 to 52 and Comparative Examples 16 to 19

Non-aqueous lithium-type electricity storage elements were each fabricated in the same manner as in Example 35 and subjected to various evaluations, except that the negative electrode, negative electrode active material, active material in the positive electrode precursor, lithium compound, lithium compound ratio in the positive electrode precursor in Example 35, were changed to those respectively shown in Table 3.

Evaluation results are shown in Table 4.

Examples 53 to 55

Non-aqueous lithium-type electricity storage elements were each fabricated in the same manner as in Example 43 and subjected to various evaluations, except that the active material in the positive electrode precursor, lithium compound, lithium compound ratio in the positive electrode precursor were changed to those respectively shown in Table 3, and the separator having a porosity of 60%, in which the dielectric porous layer having a thickness of 5 μm was formed on a polyolefin microporous membrane having a thickness of 16 μm, was used.

Evaluation results are shown in Table 4.

Example 56

Non-aqueous lithium-type electricity storage element was fabricated in the same manner as in Example 43 and subjected to various evaluations, except that a polyolefin microporous membrane was used as a base material, the separator having a thickness of 16 μm and a porosity of 66%, and comprising the base material containing inorganic particles therein was used, and further the positive electrode active material was changed to that as described in Table 3.

Evaluation results are shown in Table 4.

Example 57

Non-aqueous lithium-type electricity storage element was fabricated in the same manner as in Example 43 and subjected to various evaluations, except that a cellulose nonwoven cloth separator having a thickness of 16 μm and a porosity of 70% was used and the positive electrode active material was changed to that as described in Table 3.

Evaluation results are shown in Table 4.

Example 58

Non-aqueous lithium-type electricity storage element was fabricated in the same manner as in Example 43 and subjected to various evaluations, except that a separator having a porosity of 60%, in which a dielectric porous layer having a thickness of 4 μm was formed on a polyester nonwoven cloth having a thickness of 20 μm, was used and the positive electrode active material was changed to that as described in Table 3.

Evaluation results are shown in Table 4.

Example 59

<Welding of Terminals>

An electrode stacked body was fabricated in the same manner as in Example 43, and the negative electrode and positive electrode precursor were respectively connected to a negative electrode terminal and positive electrode terminal, respectively by ultrasonic welding to obtain an electrode stacked body. This electrode stacked body was vacuum-dried for 60 hours at 80° C. and 50 Pa.

<Solution Injection, Impregnation and Sealing Steps of Electricity Storage Element>

The obtained electrode stacked body was housed in a metal casing made of aluminum. Approximately 80 g of the aforementioned non-aqueous electrolytic solution was injected under atmospheric pressure into the casing in a dry air environment at a temperature of 25° C. and dew point of −40° C. or lower. Subsequently, the non-aqueous lithium-type electricity storage element was placed in a pressure reduction chamber and the pressure was reduced from normal pressure to −87 kPa followed by returning to atmospheric pressure and allowed to stand undisturbed for 5 minutes. Thereafter, a step consisting of reducing pressure from normal pressure to −87 kPa and then returning to atmospheric pressure was repeated four times followed by allowing the electricity storage element to stand undisturbed for 15 minutes. Further, pressure was again reduced from normal pressure to −91 kPa followed by returning to normal pressure. The aforementioned step of reducing pressure followed by returning to normal pressure was repeated a total of seven times (while reducing pressure to −95 kPa, −96 kPa, −97 kPa, −81 kPa, −97 kPa, −97 kPa and −97 kPa each time). The non-aqueous electrolytic solution was impregnated in the electrode stacked body according to the aforementioned process.

<Lithium Doping Step>

The resulting non-aqueous lithium-type electricity storage element was charged with a constant current at a current value of 0.7 A until the voltage reached 4.7 V in a dry air environment at 25° C. and dew point of −40° C. or lower by using a charge and discharge apparatus (TOSCAT-3100U) manufactured by Toyo System Co., Ltd., and initial charging was then carried out according to a procedure consisting of continuing constant voltage charging at 4.7 V for 10 hours to dope the negative electrode with lithium.

<Aging Step>

The non-aqueous lithium-type electricity storage element after the lithium doping was discharged with a constant current at 0.7 A in an environment at 25° C. until the voltage reached 3.0 V, and the voltage was adjusted to 4.0 V by carrying out constant current and constant voltage charging up to 4.0 V for 1 hour. Continuing, the non-aqueous lithium-type electricity storage element was stored for 20 hours in a thermostatic chamber at 60° C.

<Additional Charge/Discharge Step>

The non-aqueous lithium-type electricity storage element after the aging was discharged with a constant current at 10 A in an environment at 25° C. until the voltage reached 2.4 V, the charge/discharge step of charging from 2.4 V to 3.8 V at a current of 10 A, and discharging down to 2.4 V at a current of 10 A, was repeated 5 times.

<Gas Venting Step>

The non-aqueous lithium-type electricity storage element after the additional charge/discharge step was placed in a pressure reduction chamber in a dry air environment at 25° C. and dew point of −40° C. or lower, and a step of reducing a pressure from atmospheric pressure to −80 kPa over the course of 3 minutes by using a diaphragm pump (N816.3KT.45.18) manufactured by KNF Japan Co., Ltd., and then returning a pressure to atmospheric pressure over the course of 3 minutes, was repeated a total of three times. Thereafter, a lid was installed to a metal can casing to seal it by welding and crimping the lid.

Evaluations were carried out by the same method as in Example 43 and the evaluation results are shown in Table 4.

Examples 60 and 61 and Comparative Example 20

Non-aqueous lithium-type electricity storage elements were each fabricated in the same manner as in Example 36 and subjected to various evaluations, except that the negative electrode, active material in the positive electrode precursor, lithium compound, lithium compound ratio in the positive electrode precursor were changed to those respectively described in Table 3.

Examples 62 to 64 and Comparative Example 21

Non-aqueous lithium-type electricity storage elements were each fabricated in the same manner as in Example 60 and subjected to various evaluations, except that a separator having a porosity of 60%, in which a dielectric porous layer having a thickness of 5 μm was formed on a polyolefin microporous membrane having a thickness of 16 μm, was used, and the positive electrode active materials were also changed to those as described in Table 3 for Examples 62 and 64.

Evaluation results are shown in Table 4.

TABLE 3

|  | Negative electrode | | | |
|---|---|---|---|---|
|  | Active material species | | Active material ratio | |
|  | Active material 1 | Active material 2 | Active material 1 [wt %] | Active material 2 [wt %] |
| Example 35 | Negative electrode active material A | Negative electrode active material B | 95 | 5 |
| Example 36 | Negative electrode active material A | Negative electrode active material C | 95 | 5 |
| Example 37 | Negative electrode active material D | Negative electrode active material B | 95 | 5 |
| Example 38 | Negative electrode active material D | Negative electrode active material C | 95 | 5 |
| Example 39 | Negative electrode active material A | Negative electrode active material C | 98 | 2 |
| Example 40 | Negative electrode active material A | Negative electrode active material C | 80 | 20 |
| Example 41 | Negative electrode active material A | Negative electrode active material C | 70 | 30 |
| Example 42 | Negative electrode active material A | Negative electrode active material C | 60 | 40 |
| Example 43 | Negative electrode active material A | Negative electrode active material C | 95 | 5 |
| Example 44 | Negative electrode active material A | Negative electrode active material C | 95 | 5 |
| Example 45 | Negative electrode active material A | Negative electrode active material C | 95 | 5 |
| Example 46 | Negative electrode active material A | Negative electrode active material C | 95 | 5 |
| Example 47 | Negative electrode active material D | Negative electrode active material C | 95 | 5 |
| Example 48 | Negative electrode active material A | Negative electrode active material C | 95 | 5 |
| Example 49 | Negative electrode active material A | Negative electrode active material C | 95 | 5 |
| Example 50 | Negative electrode active material A | Negative electrode active material C | 95 | 5 |
| Example 51 | Negative electrode active material A | Negative electrode active material C | 95 | 5 |
| Example 52 | Negative electrode active material A | Negative electrode active material C | 95 | 5 |
| Example 53 | Negative electrode active material A | Negative electrode active material C | 95 | 5 |
| Example 54 | Negative electrode active material A | Negative electrode active material C | 95 | 5 |
| Example 55 | Negative electrode active material A | Negative electrode active material C | 95 | 5 |
| Example 56 | Negative electrode active material A | Negative electrode active material C | 95 | 5 |
| Example 57 | Negative electrode active material A | Negative electrode active material C | 95 | 5 |
| Example 58 | Negative electrode active material A | Negative electrode active material C | 95 | 5 |
| Example 59 | Negative electrode active material A | Negative electrode active material C | 95 | 5 |
| Example 60 | Negative electrode active material A | Negative electrode active material C | 95 | 5 |
| Example 61 | Negative electrode active material A | Negative electrode active material C | 95 | 5 |
| Example 62 | Negative electrode active material A | Negative electrode active material C | 95 | 5 |
| Example 63 | Negative electrode active material A | Negative electrode active material C | 95 | 5 |

TABLE 3-continued

| | Negative electrode | | | |
|---|---|---|---|---|
| Example 64 | Negative electrode active material A | Negative electrode active material C | 95 | 5 |
| Comparative example 16 | Negative electrode active material A | Negative electrode active material C | 50 | 50 |
| Comparative example 17 | Negative electrode active material A | Negative electrode active material C | 50 | 50 |
| Comparative example 18 | Negative electrode active material A | Negative electrode active material C | 50 | 50 |
| Comparative example 19 | Negative electrode active material D | Negative electrode active material C | 50 | 50 |
| Comparative example 20 | Negative electrode active material A | Negative electrode active material C | 50 | 50 |
| Comparative example 21 | Negative electrode active material A | Negative electrode active material C | 50 | 50 |

| | Positive electrode | | | | | |
|---|---|---|---|---|---|---|
| | Active material | | Constitutional ratio in positive electrode precursor | | | |
| | Active material 1 | Active material 2 | Active material 1 [wt %] | Active material 2 [wt %] | Lithium compound species | Lithium compound ratio [wt %] |
| Example 35 | Activated carbon A | — | 52.5 | | Lithium carbonate | 35.0 |
| Example 36 | Activated carbon A | — | 52.5 | | Lithium carbonate | 35.0 |
| Example 37 | Activated carbon A | — | 52.5 | | Lithium carbonate | 35.0 |
| Example 38 | Activated carbon A | — | 52.5 | | Lithium carbonate | 35.0 |
| Example 39 | Activated carbon A | — | 57.5 | | Lithium carbonate | 30.0 |
| Example 40 | Activated carbon A | — | 57.5 | | Lithium carbonate | 30.0 |
| Example 41 | Activated carbon A | — | 57.5 | | Lithium carbonate | 30.0 |
| Example 42 | Activated carbon A | — | 57.5 | | Lithium carbonate | 30.0 |
| Example 43 | Activated carbon A | NCA | 43.1 | 14.4 | Lithium carbonate | 30.0 |
| Example 44 | Activated carbon A | NCA | 19.0 | 38.5 | Lithium carbonate | 30.0 |
| Example 45 | Activated carbon A | NCA | 51.8 | 5.7 | Lithium carbonate | 30.0 |
| Example 46 | Activated carbon A | $LiFePO_4$ | 43.1 | 14.4 | Lithium carbonate | 30.0 |
| Example 47 | Activated carbon A | $LiFePO_4$ | 43.1 | 14.4 | Lithium carbonate | 30.0 |
| Example 48 | Activated carbon A | $LiFePO_4$ | 17.3 | 40.2 | Lithium carbonate | 30.0 |
| Example 49 | Activated carbon A | $LiFePO_4$ | 51.8 | 5.7 | Lithium carbonate | 30.0 |
| Example 50 | Activated carbon A | $LiMn_2O_4$ | 43.1 | 14.4 | Lithium carbonate | 30.0 |
| Example 51 | Activated carbon A | $LiMn_2O_4$ | 17.3 | 40.2 | Lithium carbonate | 30.0 |
| Example 52 | Activated carbon A | $LiMn_2O_4$ | 51.8 | 5.7 | Lithium carbonate | 30.0 |
| Example 53 | Activated carbon A | NCA | 43.1 | 14.4 | Lithium carbonate | 30.0 |
| Example 54 | Activated carbon A | $LiFePO_4$ | 43.1 | 14.4 | Lithium carbonate | 30.0 |
| Example 55 | Activated carbon A | $LiMn_2O_4$ | 43.1 | 14.4 | Lithium carbonate | 30.0 |
| Example 56 | Activated carbon A | $LiFePO_4$ | 43.1 | 14.4 | Lithium carbonate | 30.0 |
| Example 57 | Activated carbon A | $LiFePO_4$ | 43.1 | 14.4 | Lithium carbonate | 30.0 |
| Example 58 | Activated carbon A | $LiFePO_4$ | 43.1 | 14.4 | Lithium carbonate | 30.0 |
| Example 59 | Activated carbon A | NCA | 43.1 | 14.4 | Lithium carbonate | 30.0 |
| Example 60 | Activated carbon A | $LiFePO_4$ | 43.1 | 14.4 | Lithium carbonate | 30.0 |
| Example 61 | Activated carbon A | $LiMn_2O_4$ | 43.1 | 14.4 | Lithium carbonate | 30.0 |

TABLE 3-continued

| | | | | | | |
|---|---|---|---|---|---|---|
| Example 62 | Activated carbon A | NCA | 43.1 | 14.4 | Lithium carbonate | 30.0 |
| Example 63 | Activated carbon A | LiFePO$_4$ | 43.1 | 14.4 | Lithium carbonate | 30.0 |
| Example 64 | Activated carbon A | LiMn$_2$O$_4$ | 43.1 | 14.4 | Lithium carbonate | 30.0 |
| Comparative example 16 | Activated carbon A | — | 57.5 | — | Lithium carbonate | 30.0 |
| Comparative example 17 | Activated carbon A | NCA | 43.1 | 14.4 | Lithium carbonate | 30.0 |
| Comparative example 18 | Activated carbon A | LiFePO$_4$ | 43.1 | 14.4 | Lithium carbonate | 30.0 |
| Comparative example 19 | Activated carbon A | LiFePO$_4$ | 43.1 | 14.4 | Lithium carbonate | 30.0 |
| Comparative example 20 | Activated carbon A | LiFePO$_4$ | 43.1 | 14.4 | Lithium carbonate | 30.0 |
| Comparative example 21 | Activated carbon A | LiFePO$_4$ | 43.1 | 14.4 | Lithium carbonate | 30.0 |

TABLE 4

| | Solid-state $^7$Li-NMR | | | Lithium transition metal compound in positive electrode active material layer | | Evaluation results | | |
|---|---|---|---|---|---|---|---|---|
| | | | | Weight ratio of lithium | | Initial characteristics | | |
| | Area of Component A a | Area of component B b | a/b | transition metal compound A1 [wt %] | A2/A1 [wt %] | Volume E density E/V [Wh/L] | Initial time constant Ra · F [ΩF] | Lowered temperature resistance ratio Rc/Ra |
| Example 35 | 845 | 181 | 4.7 | — | — | 31.4 | 2.05 | 12.3 |
| Example 36 | 858 | 176 | 4.9 | — | — | 29.6 | 1.89 | 10.6 |
| Example 37 | 881 | 169 | 5.2 | — | — | 30.4 | 2.07 | 11.7 |
| Example 38 | 890 | 160 | 5.6 | — | — | 28.6 | 1.86 | 10.8 |
| Example 39 | 849 | 178 | 4.8 | — | — | 31.2 | 2.03 | 12.1 |
| Example 40 | 934 | 163 | 5.7 | — | — | 27.4 | 1.73 | 10.0 |
| Example 41 | 1022 | 141 | 7.2 | — | — | 25.3 | 1.59 | 9.1 |
| Example 42 | 1269 | 119 | 10.7 | — | — | 23.6 | 1.45 | 8.2 |
| Example 43 | 786 | 178 | 4.4 | 18.3 | 0.3 | 38.3 | 1.21 | 8.9 |
| Example 44 | 965 | 120 | 8.0 | 49.0 | 2.0 | 28.0 | 1.46 | 13.8 |
| Example 45 | 758 | 187 | 4.1 | 7.3 | 0.1 | 44.3 | 1.35 | 11.0 |
| Example 46 | 1090 | 175 | 6.2 | 17.6 | 0.3 | 54.7 | 1.14 | 9.4 |
| Example 47 | 1116 | 168 | 6.6 | 17.6 | 0.3 | 53.2 | 1.12 | 8.7 |
| Example 48 | 1333 | 91 | 14.6 | 49.0 | 2.3 | 35.6 | 1.30 | 11.2 |
| Example 49 | 1060 | 196 | 5.4 | 7.0 | 0.1 | 51.6 | 1.21 | 9.6 |
| Example 50 | 709 | 202 | 3.5 | 17.7 | 0.3 | 60.0 | 1.28 | 11.2 |
| Example 51 | 869 | 136 | 6.4 | 49.3 | 2.3 | 32.3 | 1.45 | 15.4 |
| Example 52 | 1022 | 91 | 11.2 | 7.0 | 0.1 | 53.7 | 1.24 | 10.7 |
| Example 53 | 782 | 177 | 4.4 | 18.3 | 0.3 | 35.6 | 1.42 | 11.5 |
| Example 54 | 1333 | 91 | 14.6 | 17.6 | 0.3 | 50.9 | 1.31 | 13.0 |
| Example 55 | 709 | 201 | 3.5 | 17.7 | 0.3 | 56.8 | 1.51 | 15.0 |
| Example 56 | 1092 | 175 | 6.2 | 17.6 | 0.3 | 52.5 | 1.11 | 8.9 |
| Example 57 | 1083 | 171 | 6.3 | 17.6 | 0.3 | 53.9 | 1.15 | 9.1 |
| Example 58 | 1077 | 168 | 6.4 | 17.6 | 0.3 | 51.1 | 1.38 | 14.7 |
| Example 59 | 785 | 173 | 4.5 | 18.3 | 0.3 | 46.0 | 1.34 | 10.8 |
| Example 60 | 1095 | 175 | 6.3 | 17.6 | 0.3 | 58.6 | 1.27 | 11.7 |
| Example 61 | 705 | 198 | 3.6 | 17.7 | 0.3 | 66.3 | 1.42 | 13.8 |
| Example 62 | 780 | 171 | 4.6 | 18.3 | 0.3 | 42.6 | 1.55 | 14.4 |
| Example 63 | 1088 | 175 | 6.2 | 17.6 | 0.3 | 54.1 | 1.43 | 16.7 |
| Example 64 | 690 | 197 | 3.5 | 17.7 | 0.3 | 62.1 | 1.67 | 18.9 |
| Comparative Example 16 | 1328 | 61 | 21.8 | — | — | 18.5 | 1.43 | 10.3 |
| Comparative Example 17 | 1060 | 43 | 24.7 | 18.3 | 0.3 | 14.8 | 1.65 | 16.3 |
| Comparative Example 18 | 1315 | 56 | 23.5 | 17.6 | 0.3 | 16.9 | 1.55 | 18.9 |
| Comparative Example 19 | 1379 | 51 | 27.0 | 17.6 | 0.3 | 16.6 | 1.49 | 17.8 |
| Comparative Example 20 | 1325 | 53 | 25.0 | 17.6 | 0.3 | 19.8 | 1.45 | 13.2 |
| Comparative Example 21 | 1342 | 47 | 28.6 | 17.6 | 0.3 | 19.1 | 1.65 | 16.8 |

Example 65

<Production of Positive Electrode Precursor D>

30.3 parts by weight of activated carbon A, 27.2 parts by weight of $LiNi_{0.80}Co_{0.15}Al_{0.05}O_2$ having a mean particle diameter of 4.0 μm as lithium transition metal oxide, 30.0 parts by weight of lithium carbonate, 3.0 parts by weight of Ketjen black, 1.5 parts by weight of PVP (polyvinylpyrrolidone), 8.0 parts by weight of PVdF (polyvinylidene difluoride) and NMP (N-methylpyrrolidone) so that the weight ratio of the solid content was 24.5%, were mixed followed by dispersing for 3 minutes under conditions of a peripheral velocity of 20 m/s using the FILMIX® (registered trademark) thin film rotating-type high-speed mixer manufactured by Primix Corp. to obtain a positive electrode coating solution 1C.

The viscosity (ηb) and TI value of the resulting positive electrode coating solution 1C were measured by using the TVE-35H E-type viscometer manufactured by Toki Sangyo Co., Ltd. As a result, viscosity (ηb) was 2,690 mPa·s and the TI value was 6.6. Moreover, dispersity of the resulting positive electrode coating solution 1C was measured by using a particle gauge manufactured by Yoshimitsu Seiki Co., Ltd. As a result, dispersity was 23 μm.

One side or both sides of an aluminum foil having a thickness of 15 μm was coated with the coating solution 1C under conditions of a coating speed of 1 m/s by using a double-sided die coater manufactured by Toray Engineering Co., Ltd., and the coating film was dried at a drying temperature of 120° C. to obtain a positive electrode precursor 1 (single side) and a positive electrode precursor 1 (double side). The discharging pressure of the die was 55 kPa when one side of the aluminum foil was coated with the coating solution 1C, and the discharging pressure of the upper side die was 55 kPa and that of the lower side die was 60 kPa when both sides of the aluminum foil were coated with the coating solution 1C. The resulting positive electrode precursor 1 (single side) and positive electrode precursor 1 (double side) were pressed under conditions of a pressure of 6 kN/cm and pressed surface temperature of 25° C. by using a roll press to obtain positive electrode precursor D.

The total thickness of the positive electrode precursor D (double side) was measured at ten arbitrary locations by using the GS-551 Linear Gauge Sensor film thickness gauge manufactured by Ono Sokki Co., Ltd. The film thickness of the positive electrode active material layer by subtracting the thickness of the aluminum foil was 76.9 μm per one side. The basis weight was calculated by the method described above and the resulting basis weight of the positive electrode active material layer per one side was 47.8 g·m$^{-2}$.

<Production of Negative Electrode G>

The negative electrode G was produced by using the active materials A and C as negative electrode active materials.

84 parts by weight of the active material mixture consisting of the active material A and the active material C that were mixed at a ratio of 95:5, 10 parts by weight of acetylene black, 6 parts by weight of PVdF (polyvinylidene difluoride) and NMP (N-methylpyrrolidone) were mixed followed by dispersing under conditions of a peripheral velocity of 17 m/s by using the FILMIX® thin film rotating-type high-speed mixer manufactured by Primix Corp. to obtain a coating solution 1A. The viscosity (ηb) and TI value of the resulting coating solution 1A were measured by using the TVE-35H E-type viscometer manufactured by Toki Sangyo Co., Ltd. As a result, viscosity (ηb) was 2,520 mPa·s and the TI value was 4.0.

Both sides of an electrolytic copper foil having a thickness of 10 μm were coated with the coating solution 1A under conditions of a coating speed of 2 m/s by using a die coater manufactured by Toray Engineering Co., Ltd., and the coating film was dried at a drying temperature of 120° C. to obtain negative electrode G1. The discharging pressure of the upper side die was 45 kPa and the discharging pressure of the lower side die was 50 kPa when both sides of the electrolytic copper foil were coated with the coating solution 1A. The resulting negative electrode G1 was pressed under conditions of a pressure of 5 kN/cm and pressed surface temperature of 25° C. by using a roll press.

The total thickness of the pressed negative electrode G was measured at ten arbitrary locations by using the GS-551 Linear Gauge Sensor film thickness gauge manufactured by Ono Sokki Co., Ltd. Subsequently, the negative electrode active material layer of one side of the negative electrode G was removed and again the thickness was measured. Thereafter, the negative electrode active material layer remaining on the negative electrode current collector was completely removed, and the thickness of the copper foil was measured. The film thickness of the negative electrode active material layer by subtracting the thickness of the copper foil was 80.1 μm per one side. The basis weight was calculated by the method described above and the resulting basis weight of the negative electrode active material layer per one side was 62.3 g·m$^{-2}$.

Non-aqueous lithium-type electricity storage element was fabricated in the same manner as in Example 43 and subjected to various evaluations, except that the positive electrode precursor D and the negative electrode G were used. Further, the electricity storage element obtained by the steps described above was subjected to the charge/discharge cycle test under a high load according to the following method.

[High-Load Charge/Discharge Cycle Test)

With regard to the electricity storage element obtained by the steps described above, a cell corresponding to the non-aqueous lithium-type electricity storage element was charged with a constant current of 300 C current value until 4.2 V was reached in a thermostat chamber set to 25° C., and then discharged with a constant current of 300 C current value until 2.2 V was reached. The above-described charge/discharge step was repeated 60,000 times followed by measurement of the room-temperature internal resistances upon discharge before the start of the test and after completion of the test, and when the electrostatic capacitance before the start of the test was Fa (F) and the electrostatic capacitance after completion of the test was Fd (F), the electrostatic capacitance retention ratio Fd/Fa after the high-load charge/discharge cycle test with respect to that before the test was 0.95.

Examples 66 to 83 and Comparative Examples 22 to 29

Non-aqueous lithium-type electricity storage elements were each fabricated in the same manner as in Example 65 and subjected to various evaluations, except that the active material contained in the positive electrode precursor and the active material contained in the negative electrode were changed to those as described in Table 5, to prepare each coating solution, and the thickness and basis weight of the positive electrode precursor and thickness and basis weight of the negative electrode were changed to those as described in Table 5 by adjusting discharging amounts of the die upon the coating.

TABLE 5

| | Negative electrode | | | | | |
|---|---|---|---|---|---|---|
| | Active material species | | Constitutional ratio | | Basis weight and thickness | |
| | Active material 1 | Active material 2 | Active material 1 [wt %] | Active material 2 [wt %] | Basis weight C2 [g/m$^2$] | Thickness D2 [μm] |
| Example 65 | Negative electrode active material A | Negative electrode active material C | 95 | 5 | 62.3 | 80.1 |
| Example 66 | Negative electrode active material A | Negative electrode active material C | 95 | 5 | 62.3 | 80.1 |
| Example 67 | Negative electrode active material A | Negative electrode active material C | 95 | 5 | 62.3 | 80.1 |
| Example 68 | Negative electrode active material D | Negative electrode active material C | 95 | 5 | 28.3 | 40 |
| Example 69 | Negative electrode active material D | Negative electrode active material C | 95 | 5 | 55.3 | 72.1 |
| Example 70 | Negative electrode active material A | Negative electrode active material C | 95 | 5 | 26.8 | 37.2 |
| Example 71 | Negative electrode active material A | Negative electrode active material C | 90 | 10 | 25.8 | 41 |
| Example 72 | Negative electrode active material A | Negative electrode active material C | 85 | 15 | 25.9 | 47.9 |
| Example 73 | Negative electrode active material A | Negative electrode active material C | 95 | 5 | 26.8 | 37.2 |
| Example 74 | Negative electrode active material A | Negative electrode active material C | 95 | 5 | 53.1 | 68.9 |
| Example 75 | Negative electrode active material A | Negative electrode active material C | 85 | 15 | 12.3 | 15.8 |
| Example 76 | Negative electrode active material A | Negative electrode active material C | 85 | 15 | 53.1 | 68.9 |
| Example 77 | Negative electrode active material D | Negative electrode active material C | 95 | 5 | 28.3 | 40 |
| Example 78 | Negative electrode active material D | Negative electrode active material C | 95 | 5 | 55.3 | 72.1 |
| Example 79 | Negative electrode active material A | Negative electrode active material C | 95 | 5 | 27.6 | 39.1 |
| Example 80 | Negative electrode active material A | Negative electrode active material C | 95 | 5 | 27.6 | 39.1 |
| Example 81 | Negative electrode active material A | Negative electrode active material C | 95 | 5 | 14.3 | 20.7 |
| Example 82 | Negative electrode active material D | Negative electrode active material C | 95 | 5 | 25.1 | 34.7 |
| Example 83 | Negative electrode active material A | Negative electrode active material C | 95 | 5 | 50.3 | 65.9 |
| Comparative example 22 | Negative electrode active material A | Negative electrode active material C | 85 | 15 | 12.3 | 15.8 |
| Comparative example 23 | Negative electrode active material A | Negative electrode active material C | 95 | 5 | 80.4 | 96.2 |
| Comparative example 24 | Negative electrode active material A | Negative electrode active material C | 85 | 15 | 12.3 | 15.8 |
| Comparative example 25 | Negative electrode active material A | Negative electrode active material C | 95 | 5 | 80.4 | 96.2 |
| Comparative example 26 | Negative electrode active material D | Negative electrode active material C | 95 | 5 | 22.3 | 35.9 |
| Comparative example 27 | Negative electrode active material D | Negative electrode active material C | 95 | 5 | 65.7 | 92.3 |
| Comparative example 28 | Negative electrode active material A | Negative electrode active material C | 95 | 5 | 12.3 | 15.8 |
| Comparative example 29 | Negative electrode active material A | Negative electrode active material C | 95 | 5 | 80.4 | 96.2 |

| | Positive electrode | | | | | | Design | |
|---|---|---|---|---|---|---|---|---|
| | Active material | | Constitutional ratio | | Basis weight and thickness | | Basis weight ratio C1/C2 | Thickness ratio D1/D2 |
| | Active material 1 | Active material 2 | Active material 1 [wt %] | Active material 2 [wt %] | C1 [g/m$^2$] | D1 [μm] | | |
| Example 65 | Activated carbon A | NCA | 30.3 | 27.2 | 47.8 | 76.9 | 0.77 | 1.0 |
| Example 66 | Activated carbon A | NCA | 35.8 | 21.7 | 62.4 | 82.3 | 1.00 | 1.0 |

TABLE 5-continued

| | | | | | | | | |
|---|---|---|---|---|---|---|---|---|
| Example 67 | Activated carbon A | NCA | 43.1 | 14.4 | 128.8 | 170.3 | 2.07 | 2.1 |
| Example 68 | Activated carbon A | NCA | 43.1 | 14.4 | 47.8 | 76.9 | 1.69 | 1.9 |
| Example 69 | Activated carbon A | NCA | 43.1 | 14.4 | 47.8 | 76.9 | 0.86 | 1.1 |
| Example 70 | Activated carbon A | $LiFeO_4$ | 43.1 | 14.4 | 47.4 | 71.1 | 1.77 | 1.9 |
| Example 71 | Activated carbon A | $LiFeO_4$ | 43.1 | 14.4 | 72.4 | 96.4 | 2.81 | 2.4 |
| Example 72 | Activated carbon A | $LiFeO_4$ | 43.1 | 14.4 | 130.3 | 190.2 | 5.03 | 4.0 |
| Example 73 | Activated carbon A | $LiFeO_4$ | 35 | 22.5 | 42.4 | 55 | 1.58 | 1.5 |
| Example 74 | Activated carbon A | $LiFeO_4$ | 43.1 | 14.4 | 47.4 | 71.1 | 0.89 | 1.0 |
| Example 75 | Activated carbon A | $LiFeO_4$ | 43.1 | 14.4 | 22.5 | 30.4 | 1.83 | 1.9 |
| Example 76 | Activated carbon A | $LiFeO_4$ | 30.3 | 27.2 | 20.1 | 27.2 | 0.38 | 0.4 |
| Example 77 | Activated carbon A | $LiFeO_4$ | 43.1 | 14.4 | 47.4 | 71.1 | 1.67 | 1.8 |
| Example 78 | Activated carbon A | $LiFeO_4$ | 43.1 | 14.4 | 47.4 | 71.1 | 0.86 | 1.0 |
| Example 79 | Activated carbon B | $LiMn_2O_4$ | 35.7 | 21.8 | 57.3 | 89.4 | 2.08 | 2.3 |
| Example 80 | Activated carbon B | $LiMn_2O_4$ | 48 | 9.5 | 90.4 | 130.6 | 3.28 | 3.3 |
| Example 81 | Activated carbon B | $LiMn_2O_4$ | 35.7 | 21.8 | 57.3 | 89.4 | 4.01 | 4.3 |
| Example 82 | Activated carbon B | $LiMn_2O_4$ | 35.7 | 21.8 | 57.3 | 89.4 | 2.28 | 2.6 |
| Example 83 | Activated carbon A | $LiMn_2O_4$ | 28.7 | 28.8 | 25.4 | 40.2 | 0.50 | 0.6 |
| Comparative example 22 | Activated carbon A | NCA | 43.1 | 14.4 | 75.4 | 90.3 | 6.13 | 5.7 |
| Comparative example 23 | Activated carbon A | NCA | 28.7 | 28.8 | 23.5 | 26.5 | 0.29 | 0.28 |
| Comparative example 24 | Activated carbon A | $LiFeO_4$ | 43.1 | 14.4 | 72.4 | 96.4 | 5.89 | 6.1 |
| Comparative example 25 | Activated carbon A | $LiFeO_4$ | 30.3 | 27.2 | 20.1 | 27.2 | 0.25 | 0.28 |
| Comparative example 26 | Activated carbon A | $LiFeO_4$ | 43.1 | 14.4 | 130.3 | 190.2 | 5.84 | 5.3 |
| Comparative example 27 | Activated carbon A | $LiFeO_4$ | 30.3 | 27.2 | 20.1 | 27.2 | 0.31 | 0.29 |
| Comparative example 28 | Activated carbon B | $LiMn_2O_4$ | 48 | 9.5 | 90.4 | 130.6 | 7.35 | 8.3 |
| Comparative example 29 | Activated carbon B | $LiMn_2O_4$ | 20.5 | 37.0 | 20.1 | 24.3 | 0.25 | 0.25 |

TABLE 6

| | Evaluation results | | | | | |
|---|---|---|---|---|---|---|
| | Solid-state $^7$Li-NMR | | | Initial characteristics | | High-load charge/discharge characteristics |
| | Area of component A $a$ | Area of component B $b$ | $a/b$ | Volume E density E/V [Wh/L] | Initial time constant $Ra \cdot F$ [$\Omega F$] | Lowered temperature resistance ratio $Rc/Ra$ | Capacitance retention ratio $Fd/Fa$ |
| Example 65 | 1276 | 98 | 13.0 | 30.5 | 1.89 | 26.7 | 0.95 |
| Example 66 | 1256 | 95 | 13.2 | 35.6 | 1.48 | 20.6 | 0.83 |
| Example 67 | 870 | 158 | 5.5 | 40.4 | 1.25 | 11.8 | 0.72 |
| Example 68 | 792 | 169 | 4.7 | 36.8 | 1.29 | 9.6 | 0.82 |
| Example 69 | 930 | 144 | 6.5 | 29.8 | 1.72 | 20.7 | 0.92 |
| Example 70 | 1090 | 175 | 6.2 | 55.6 | 1.19 | 10.3 | 0.8 |
| Example 71 | 1210 | 140 | 8.6 | 62.3 | 1.57 | 21.8 | 0.71 |
| Example 72 | 1330 | 118 | 11.3 | 68.8 | 2.56 | 27.9 | 0.63 |
| Example 73 | 1189 | 98 | 12.1 | 58.2 | 1.08 | 9.2 | 0.75 |
| Example 74 | 1088 | 173 | 6.3 | 45.2 | 1.48 | 18.5 | 0.94 |
| Example 75 | 1076 | 165 | 6.5 | 72.6 | 0.89 | 7.1 | 0.61 |
| Example 76 | 1187 | 108 | 11.0 | 51.2 | 1.39 | 14.3 | 0.83 |

TABLE 6-continued

| | Evaluation results | | | | | | |
|---|---|---|---|---|---|---|---|
| | Solid-state $^7$Li-NMR | | | Initial characteristics | | High-load charge/discharge characteristics | |
| | | | | Initial time | Lowered | Capacitance | |
| | Area of component A a | Area of component B b | a/b | Volume E density E/V [Wh/L] | constant Ra · F [ΩF] | temperature resistance ratio Rc/Ra | retention ratio Fd/Fa |
| Example 77 | 1078 | 171 | 6.3 | 53.4 | 1.26 | 12.1 | 0.83 |
| Example 78 | 1083 | 166 | 6.5 | 41.3 | 1.60 | 21.6 | 0.96 |
| Example 79 | 890 | 121 | 7.4 | 48.2 | 1.43 | 16.3 | 0.78 |
| Example 80 | 1176 | 84 | 14.0 | 55.3 | 2.35 | 27.4 | 0.67 |
| Example 81 | 1234 | 74 | 16.7 | 58.4 | 1.10 | 11.9 | 0.6 |
| Example 82 | 923 | 116 | 8.0 | 46.2 | 1.56 | 18.0 | 0.82 |
| Example 83 | 1028 | 106 | 9.7 | 30.1 | 1.41 | 16.5 | 0.95 |
| Comparative example 22 | 1216 | 55 | 22.1 | 45.8 | 3.03 | 34.1 | 0.35 |
| Comparative example 23 | 1320 | 61 | 21.6 | 17.5 | 3.25 | 35.8 | 0.8 |
| Comparative example 24 | 1216 | 42 | 29.0 | 60.4 | 3.23 | 35.1 | 0.37 |
| Comparative example 25 | 1189 | 54 | 22.0 | 18.9 | 3.06 | 30.4 | 0.75 |
| Comparative example 26 | 1367 | 38 | 36.0 | 63.5 | 3.22 | 31.5 | 0.28 |
| Comparative example 27 | 1277 | 35 | 36.5 | 16.7 | 3.14 | 33.0 | 0.85 |
| Comparative example 28 | 1308 | 55 | 23.8 | 50.7 | 4.14 | 45.7 | 0.21 |
| Comparative example 29 | 1157 | 43 | 26.9 | 14.3 | 3.56 | 34.4 | 0.68 |

Example 84

<Preparation of Electrolytic Solution>

A solution obtained by using an organic solvent in the form of a mixed solvent of ethylene carbonate (EC), dimethyl carbonate (DMC) and methyl ethyl carbonate (EMC) at a ratio (volume ratio) of 33:26:41 and dissolving the following electrolyte salts respectively consisting of LiN(SO$_2$F)$_2$ and LiPF$_6$ at a concentration ratio of 25:75 (molar ratio) and a total concentration of LiN(SO$_2$F)$_2$ and LiPF$_6$ of 1.2 mol/L, in the entire non-aqueous electrolytic solution was used as a non-aqueous electrolytic solution.

The concentrations of LiN(SO$_2$F)$_2$ (abbreviated as "LiFSI" in Table 7) and LiPF$_6$ in the prepared non-aqueous electrolytic solution were 0.3 mol/L and 0.9 mol/L, respectively.

Moreover, the non-aqueous electrolytic solution 2 was obtained by dissolving thiophene as an additive to 1% by weight with respect to the total electrolytic solution.

By using the non-aqueous electrolytic solution 2, a non-aqueous lithium-type electricity storage element was fabricated in the same manner as in Example 43 and subjected to various evaluations.

[Preparation of Negative Electrode Sample]

The above obtained electricity storage element was disassembled, and the obtained negative electrode, on both sides of which the negative electrode active material layers were coated was cut out into a size of 10 cm×10 cm, immersed in 30 g of a diethyl carbonate solvent, and occasionally moved by tweezers followed by washing for 10 minutes. Subsequently, the negative electrode was taken out, air-dried in an argon box for 5 minutes, immersed in 30 g of a newly prepared diethyl carbonate solvent, and washed for 10 minutes in the same manner as described above. The washed negative electrode was taken out of the argon box and dried by using a vacuum dryer (DP33, manufactured by Yamato Scientific Co., Ltd.) at a temperature of 25° C. and a pressure of 1 kPa for 20 hours to obtain a negative electrode sample.

Parts of the obtained negative electrode sample were cut into a size of 5 cm×5 cm, each was immersed in 20 g of methanol in a vessel, and the vessel was capped, and allowed to stand undisturbed at a 25° C. environment for 3 days. Thereafter, the negative electrode sample was taken out and vacuum-dried at 120° C. and 5 kPa for 10 hours. The methanol solution after washing was subjected to GC/MS measurement under conditions obtained based on the preliminarily prepared calibration curve, and it was confirmed that diethyl carbonate residue was less than 1%.

<XPS Analysis of Negative Electrode Active Material Layer Surface>

A part of the obtained negative electrode sample was cut into a size of 3 mm×3 mm, installed into an XPS apparatus (Thermo Fisher ESCALLAB250) while maintaining prevention of exposure to the atmosphere, and subjected to XPS measurement. All elements were detected by a survey scan in a binding energy range of 0 to 1100 eV by using an X-ray source of monochromatic AlKα (15 kV, 10 mA) and an X-ray beam diameter of 200 μmϕ, and the sample was narrow-scanned with charge neutralization in a range of the binding energy corresponding to each detected element, to obtain spectra of C1s, O1s, S2p, F1s, N1s, Li1s, and P2p. The relative element concentration of S was calculated by using the peak areas thereof to be 1.5 atomic %. The results are shown in Table 8.

<Metal Element in Negative Electrode Active Material Layer>

With regard to the obtained negative electrode sample, the negative electrode active material layer on the negative electrode current collector was completely removed by using a spatula made of Teflon (registered trademark), and the obtained negative electrode active material layer was acid-decomposed with concentrated nitric acid. After diluting the obtained solution with pure water to an acid concentration of 2%, the abundance (ppm) of each metal element was determined by an ICP-MS (X series 2, manufactured by Thermo Fisher Scientific Inc). The concentration of Ni was 4560 ppm.

<Metal Element Quantification in Electrolytic Solution>

0.2 g of the electrolytic solution obtained by disassembling the electricity storage element was placed in a Teflon (registered trademark) vessel, and 4 cc of 60% nitric acid was added. The obtained sample was decomposed by using a microwave decomposer (Milestone General K.K., ETHOS PLUS), and was diluted to 50 ml with pure water. The measurement of this non-aqueous electrolytic solution was carried out by ICP/MS (X series 2, manufactured by Thermo Fisher Scientific Inc.) to determine the abundance (ppm) of Na per unit weight of the non-aqueous electrolytic solution, and Al and Ni were detected. The total concentration of them was 840 ppm.

<XPS Analysis of Positive Electrode Active Material Layer Surface>

XPS analysis was carried out on the surface of the positive electrode active material layer in the same manner as the negative electrode active material layer, and a peak was detected in a range of 162 eV to 166 eV. The results are shown in Table 8.

[Amount of Gas Generated After Elevated Temperature Storage Test]

The obtained non-aqueous lithium-type electricity storage element was charged with a constant current of a current value of 100 C until reaching 4.2 V in a thermostatic chamber set to 25° C. by using a charge and discharge apparatus (5 V, 360 A) manufactured by Fujitsu Telecom Networks Ltd. and then charged with application of a constant voltage of 4.2 V for a total of 10 minutes. Subsequently, the cell was stored in an environment at 60° C., removed from the 60° C. environment every 2 weeks and then charged up to a cell voltage of 4.2 V by applying the same charging step and again stored in an environment at 60° C. This step was repeated for 2 months and a cell volume prior to the start of the storage test Va and a cell volume after carrying out the storage test for 2 months Vb were measured according to the Archimedes method. The amount of gas generated that was obtained by Vb−Va was $23.5 \times 10^{-3}$ cc/F.

[Determination of Rb/Ra]

With regard to the electricity storage element after the elevated temperature storage test, the room-temperature internal resistance after the elevated temperature storage test Rb was determined in the same manner as in the "Determination of Ra·F" described above.

The ratio Rb/Ra that was determined by dividing this Rb ($\Omega$) by the room-temperature internal resistance prior to the start of the elevated temperature storage test Ra, was 1.25.

Examples 85 to 120 and Comparative Examples 30 to 35

Non-aqueous lithium-type electricity storage elements were each fabricated in the same manner as in Example 84 and subjected to various evaluations, except that the salt in the non-aqueous electrolytic solution, solvent composition ratio, and additive were changed to those respectively as described in Table 7.

The evaluation results are shown in Tables 8 and 9.

Abbreviations of additives in Table 7 refer to the following compounds.

[Additives]
PES: 1-Propene 1,3-sultone
PS: 1,3-Propane sultone
ESF: Ethylene sulfite
PSF: 1,2-Propylene sulfite
SFL: 3-Sulfolene
ES: Ethylene sulfate
TP: Thiophene

TABLE 7

| | Salt | | Additive in electrolytic solution prepared | | | |
|---|---|---|---|---|---|---|
| | LiPF$_6$ [mol/L] | LiFSI [mol/L] | Additive 1 | Additive 2 | Amount of additive 1 added [wt %] | Amount of additive 2 added [wt %] |
| Example 84 | 0.9 | 0.3 | PSF | — | 0.1 | — |
| Example 85 | 0.9 | 0.3 | PSF | — | 0.5 | — |
| Example 86 | 0.9 | 0.3 | PSF | — | 1.0 | — |
| Example 87 | 0.9 | 0.3 | SFL | — | 0.1 | — |
| Example 88 | 0.9 | 0.3 | SFL | — | 0.5 | — |
| Example 89 | 0.9 | 0.3 | SFL | — | 1.0 | — |
| Example 90 | 0.9 | 0.3 | PES | — | 0.5 | — |
| Example 91 | 0.9 | 0.3 | PES | — | 1.0 | — |
| Example 92 | 0.9 | 0.3 | PES | — | 2.0 | — |
| Example 93 | 0.9 | 0.3 | ES | — | 0.5 | — |
| Example 94 | 0.9 | 0.3 | ES | — | 1.0 | — |
| Example 95 | 0.9 | 0.3 | ES | — | 2.0 | — |
| Example 96 | 0.9 | 0.3 | TP | — | 0.1 | — |
| Example 97 | 0.9 | 0.3 | TP | — | 0.5 | — |
| Example 98 | 0.9 | 0.3 | TP | — | 1.0 | — |
| Example 99 | 0.9 | 0.3 | PS | — | 0.5 | — |
| Example 100 | 0.9 | 0.3 | PS | — | 1.0 | — |
| Example 101 | 0.9 | 0.3 | PS | — | 2.0 | — |
| Example 102 | 0.9 | 0.3 | PES | SFL | 1.0 | 0.1 |
| Example 103 | 0.9 | 0.3 | PES | SFL | 1.0 | 0.5 |
| Example 104 | 0.9 | 0.3 | PES | SFL | 1.0 | 1.0 |
| Example 105 | 0.9 | 0.3 | ES | TP | 1.0 | 0.1 |
| Example 106 | 0.9 | 0.3 | ES | TP | 1.0 | 0.5 |
| Example 107 | 0.9 | 0.3 | ES | TP | 1.0 | 1.0 |

TABLE 7-continued

|  | Electrolytic solution | | | | | |
|---|---|---|---|---|---|---|
|  | Salt | | Additive in electrolytic solution prepared | | | |
|  | LiPF$_6$ [mol/L] | LiFSI [mol/L] | Additive 1 | Additive 2 | Amount of additive 1 added [wt %] | Amount of additive 2 added [wt %] |
| Example 108 | 1.2 | 0 | ES | TP | 1.0 | 0.5 |
| Example 109 | 0.9 | 0.3 | PS | TP | 1.0 | 0.1 |
| Example 110 | 0.9 | 0.3 | PS | TP | 1.0 | 0.5 |
| Example 111 | 0.9 | 0.3 | PS | TP | 1.0 | 1.0 |
| Example 112 | 1.2 | 0 | PS | ES | 1.0 | 1.0 |
| Example 113 | 1.2 | 0 | PS | TP | 1.0 | 0.5 |
| Example 114 | 0.9 | 0.3 | None | — | — | — |
| Example 115 | 0.9 | 0.3 | PSF | 0.05 | — | — |
| Example 116 | 0.9 | 0.3 | SFL | 0.05 | — | — |
| Example 117 | 0.9 | 0.3 | PS | 0.1 | — | — |
| Example 118 | 0.9 | 0.3 | PES | 0.05 | — | — |
| Example 119 | 0.9 | 0.3 | TP | 0.05 | — | — |
| Example 120 | 0.9 | 0.3 | ES | 0.05 | — | — |
| Comparative example 30 | 0.9 | 0.3 | PSF | 5.00 | — | — |
| Comparative example 31 | 0.9 | 0.3 | SFL | 5.00 | — | — |
| Comparative example 32 | 0.9 | 0.3 | PS | 6.0 | — | — |
| Comparative example 33 | 0.9 | 0.3 | PES | 5.00 | — | — |
| Comparative example 34 | 0.9 | 0.3 | TP | 5.00 | — | — |
| Comparative example 35 | 0.9 | 0.3 | ES | 5.00 | — | — |

TABLE 8

| | Solid-State $^7$Li-NMR | | | XPS | | Negative electrode active material layer | | Electrolytic solution | |
|---|---|---|---|---|---|---|---|---|---|
| | | | | Negative electrode active material layer Element | Positive electrode active material layer Presence or | | | | |
| | Area of component A a | Area of component B b | a/b | concentration of S [atomic %] | absence of peak from 162 eV to 166 eV | Element detected | Total element concentration [ppm] | Element | Element concentration [ppm] |
| Example 84 | 797 | 169 | 4.7 | 1.5 | Present | Ni | 4560 | Al, Ni | 840 |
| Example 85 | 820 | 168 | 4.9 | 1.6 | Present | Ni | 3240 | Al, Ni | 634 |
| Example 86 | 840 | 169 | 5.0 | 2.8 | Present | Ni | 1310 | Al, Ni | 456 |
| Example 87 | 793 | 170 | 4.7 | 1.3 | Present | Ni | 3420 | Al, Ni | 640 |
| Example 88 | 812 | 169 | 4.8 | 1.8 | Present | Ni | 2650 | Al, Ni | 330 |
| Example 89 | 829 | 168 | 4.9 | 4.1 | Present | Ni | 890 | Al, Ni | 180 |
| Example 90 | 802 | 169 | 4.8 | 1.6 | Present | Ni | 2190 | Al, Ni | 420 |
| Example 91 | 834 | 170 | 4.9 | 2.3 | Present | Ni | 1010 | Al, Ni | 230 |
| Example 92 | 890 | 170 | 5.2 | 4.7 | Present | Ni | 450 | Al, Ni | 85 |
| Example 93 | 1097 | 175 | 6.3 | 1.5 | Present | Fe | 1560 | Al, Fe | 180 |
| Example 94 | 1108 | 174 | 6.4 | 2.1 | Present | Fe | 740 | Al, Fe | 94 |
| Example 95 | 1198 | 171 | 7.0 | 4.5 | Present | Fe | 140 | Al, Fe | 56 |
| Example 96 | 1090 | 174 | 6.3 | 0.6 | Present | Fe | 1030 | Al, Fe | 110 |
| Example 97 | 1130 | 174 | 6.5 | 1.1 | Present | Fe | 460 | Al, Fe | 63 |
| Example 98 | 1210 | 174 | 6.9 | 1.7 | Present | Fe | 87 | Al, Fe | 24 |
| Example 99 | 711 | 200 | 3.6 | 1.7 | Present | Mn | 1890 | Al, Mn | 560 |
| Example 100 | 739 | 201 | 3.7 | 2.3 | Present | Mn | 870 | Al, Mn | 370 |
| Example 101 | 786 | 201 | 3.9 | 4.1 | Present | Mn | 340 | Al, Mn | 130 |
| Example 102 | 756 | 202 | 3.7 | 1.8 | Present | Mn | 2860 | Al, Mn | 680 |
| Example 103 | 788 | 202 | 3.9 | 2.6 | Present | Mn | 1910 | Al, Mn | 380 |
| Example 104 | 806 | 202 | 4.0 | 5.3 | Present | Mn | 1180 | Al, Mn | 220 |
| Example 105 | 1120 | 173 | 6.5 | 2.8 | Present | Fe | 260 | Al, Fe | 85 |
| Example 106 | 1198 | 173 | 6.9 | 3.3 | Present | Fe | 68 | Al, Fe | 68 |
| Example 107 | 1263 | 172 | 7.3 | 4.2 | Present | Fe | 16 | Al, Fe | 49 |
| Example 108 | 1186 | 173 | 6.9 | 3.1 | Present | Fe | 24 | Fe | 16 |
| Example 109 | 1098 | 173 | 6.4 | 2.7 | Present | Fe | 56 | Al, Fe | 79 |
| Example 110 | 1146 | 173 | 6.6 | 3.3 | Present | Fe | 17 | Al, Fe | 68 |
| Example 111 | 1209 | 173 | 7.0 | 4.6 | Present | Fe | 13 | Al, Fe | 45 |
| Example 112 | 1187 | 173 | 6.8 | 5.8 | Present | Fe | 43 | Fe | 20 |
| Example 113 | 1113 | 172 | 6.5 | 3.2 | Present | Fe | 18 | Fe | 12 |
| Example 114 | 795 | 169 | 4.7 | 0.1 | Absent | Ni | 6390 | Al, Ni | 1240 |

TABLE 8-continued

| | Solid-State $^7$Li-NMR | | | XPS | | Negative electrode active material layer | | Electrolytic solution | |
| --- | --- | --- | --- | --- | --- | --- | --- | --- | --- |
| | | | | Negative electrode active material layer Element concentration of S [atomic %] | Positive electrode active material layer Presence or absence of peak from 162 eV to 166 eV | | | | |
| | Area of component A a | Area of component B b | a/b | | | Element detected | Total element concentration [ppm] | Element | Element concentration [ppm] |
| Example 115 | 790 | 170 | 4.6 | 0.4 | Absent | Ni | 5890 | Al, Ni | 1210 |
| Example 116 | 789 | 173 | 4.6 | 0.4 | Absent | Ni | 5310 | Al, Ni | 1180 |
| Example 117 | 708 | 203 | 3.5 | 0.4 | Absent | Mn | 5670 | Al, Mn | 1190 |
| Example 118 | 709 | 201 | 3.5 | 0.3 | Absent | Mn | 5320 | Al, Mn | 1030 |
| Example 119 | 1085 | 172 | 6.3 | 0.2 | Present | Fe | 5020 | Al, Fe | 1020 |
| Example 120 | 1088 | 171 | 6.4 | 0.4 | Absent | Fe | 5300 | Al, Fe | 1130 |
| Comparative example 30 | 1321 | 46 | 28.7 | 10.2 | Present | Ni | 9 | Al, Ni | 8 |
| Comparative example 31 | 1276 | 53 | 24.1 | 8.7 | Present | Ni | 7 | Al, Ni | 6 |
| Comparative example 32 | 1259 | 62 | 20.3 | 7.4 | Present | Mn | 8 | Al, Mn | 7 |
| Comparative example 33 | 1308 | 52 | 25.2 | 7.9 | Present | Mn | 5 | Al, Mn | 7 |
| Comparative example 34 | 1377 | 41 | 33.6 | 6.9 | Present | Fe | 3 | Al, Fe | 5 |
| Comparative example 35 | 1321 | 47 | 28.1 | 10.4 | Present | Fe | 4 | Al, Fe | 7 |

TABLE 9

| | Evaluation results | | | | |
| --- | --- | --- | --- | --- | --- |
| | Initial characteristics | | | 60° C. storage test | |
| | Volume E density E/V [Wh/L] | Initial time constant Ra · F [ΩF] | Lowered temperature resistance ratio Rc/Ra | Resistance increase ratio Rb/Ra | Gas volume × $10^{-3}$ [cc/F] |
| Example 84 | 37.3 | 1.29 | 9.5 | 1.25 | 23.5 |
| Example 85 | 35.6 | 1.37 | 11.4 | 1.39 | 17.8 |
| Example 86 | 31.3 | 1.59 | 14.6 | 1.56 | 14.3 |
| Example 87 | 38.8 | 1.22 | 8.8 | 1.18 | 20.2 |
| Example 88 | 37.1 | 1.34 | 10.9 | 1.29 | 14.3 |
| Example 89 | 35.6 | 1.51 | 12.7 | 1.35 | 11.9 |
| Example 90 | 39.3 | 1.31 | 12.0 | 1.15 | 18.4 |
| Example 91 | 36.3 | 1.44 | 15.6 | 1.28 | 12.2 |
| Example 92 | 32.2 | 1.68 | 18.3 | 1.39 | 9.7 |
| Example 93 | 54.2 | 1.14 | 9.8 | 1.13 | 12.8 |
| Example 94 | 54.3 | 1.20 | 10.2 | 1.15 | 10.9 |
| Example 95 | 51.1 | 1.45 | 13.6 | 1.22 | 8.5 |
| Example 96 | 56.3 | 1.13 | 9.3 | 1.10 | 10.3 |
| Example 97 | 54.1 | 1.20 | 11.4 | 1.12 | 7.9 |
| Example 98 | 52.1 | 1.28 | 11.9 | 1.17 | 5.6 |
| Example 99 | 59.8 | 1.30 | 11.8 | 1.16 | 11.4 |
| Example 100 | 57.6 | 1.32 | 12.2 | 1.22 | 10.2 |
| Example 101 | 56.1 | 1.35 | 12.7 | 1.28 | 8.1 |
| Example 102 | 55.1 | 1.42 | 14.5 | 1.21 | 12.1 |
| Example 103 | 51.9 | 1.50 | 16.9 | 1.34 | 10.4 |
| Example 104 | 48.6 | 1.72 | 19.2 | 1.51 | 8.7 |
| Example 105 | 54.6 | 1.22 | 10.4 | 1.13 | 6.9 |
| Example 106 | 53.3 | 1.27 | 10.7 | 1.15 | 5.7 |
| Example 107 | 52.4 | 1.32 | 11.8 | 1.16 | 4.3 |
| Example 108 | 53.1 | 1.38 | 12.5 | 1.14 | 5.5 |
| Example 109 | 54.3 | 1.17 | 10.2 | 1.20 | 8.5 |
| Example 110 | 54.2 | 1.25 | 11.8 | 1.21 | 6.5 |
| Example 111 | 53.5 | 1.33 | 12.4 | 1.22 | 3.0 |
| Example 112 | 52.4 | 1.25 | 10.7 | 1.21 | 9.1 |
| Example 113 | 53.6 | 1.35 | 13.1 | 1.26 | 7.9 |
| Example 114 | 37.6 | 1.27 | 9.2 | 1.25 | 45.2 |
| Example 115 | 37.1 | 1.29 | 9.5 | 1.29 | 40.1 |
| Example 116 | 39.3 | 1.20 | 8.7 | 1.16 | 35.5 |
| Example 117 | 60.1 | 1.30 | 11.5 | 1.13 | 30.8 |
| Example 118 | 56.8 | 1.32 | 12.8 | 1.17 | 33.9 |
| Example 119 | 55.9 | 1.01 | 8.4 | 1.10 | 33.5 |
| Example 120 | 56.8 | 1.09 | 8.8 | 1.10 | 32.2 |

TABLE 9-continued

|  | Evaluation results | | | | |
| --- | --- | --- | --- | --- | --- |
|  | Initial characteristics | | | 60° C. storage test | |
|  | Volume E density E/V [Wh/L] | Initial time constant Ra · F [ΩF] | Lowered temperature resistance ratio Rc/Ra | Resistance increase ratio Rb/Ra | Gas volume × $10^{-3}$ [cc/F] |
| Comparative example 30 | 30.3 | 3.04 | 35.5 | 3.40 | 11.6 |
| Comparative example 31 | 32.5 | 2.78 | 33.2 | 3.09 | 8.7 |
| Comparative example 32 | 55.1 | 1.54 | 14.7 | 3.89 | 6.0 |
| Comparative example 33 | 50.3 | 1.90 | 28.6 | 3.36 | 7.8 |
| Comparative example 34 | 48.7 | 3.23 | 35.7 | 3.55 | 2.8 |
| Comparative example 35 | 50.1 | 3.11 | 33.0 | 3.10 | 6.6 |

Example 121

[Fabrication of Flat Electrode Wound Body]
<Production of Positive Electrode Precursor D2>

43.1 parts by weight of activated carbon A, 14.4 parts by weight of $LiNi_{0.80}Co_{0.15}Al_{0.05}O_2$ having a mean particle diameter of 4.0 μm as lithium transition metal oxide, 30.0 parts by weight of lithium carbonate, 3.0 parts by weight of Ketjen black, 1.5 parts by weight of PVP (polyvinylpyrrolidone), 8.0 parts by weight of PVDF (polyvinylidene difluoride) and NMP (N-methyl-2-pyrrolidone) were mixed so that the weight ratio of the solid content was 24.5%, followed by dispersing for 3 minutes under conditions of a peripheral velocity of 20 m/s by using the FILMIX® (registered trademark) thin film rotating-type high-speed mixer manufactured by Primix Corp. to obtain a positive electrode coating solution 1.

The viscosity (ηb) and TI value of the resulting positive electrode coating solution 1 were measured by using the TVE-35H E-type viscometer manufactured by Toki Sangyo Co., Ltd. As a result, viscosity (ηb) was 2,690 mPa·s and the TI value was 6.6. Moreover, dispersity of the resulting positive electrode coating solution 1 was measured by using a particle gauge manufactured by Yoshimitsu Seiki Co., Ltd. As a result, dispersity was 23 μm.

Both sides of an aluminum foil having a thickness of 15 μm was coated with the coating solution 1 under conditions of a coating speed of 1 m/s by using a double-sided die coater manufactured by Toray Engineering Co., Ltd., and the coating film was dried sequentially at 70° C., 90° C., 110° C., and 130° C. in this order in a drying chamber set to these chamber temperatures followed by drying by an IR heater to obtain positive electrode precursor. The resulting positive electrode precursor was pressed under conditions of a pressure of 6 kN/cm and pressed surface temperature of 25° C. by using a roll press to obtain positive electrode precursor D2. The total film thickness of the positive electrode precursor D2 was measured at ten arbitrary locations of the positive electrode precursor by using the GS-551 Linear Gauge Sensor film thickness gauge manufactured by Ono Sokki Co., Ltd. The film thickness of the positive electrode active material layer obtained by subtracting the thickness of the aluminum foil was 70 μm per one side. As a result of calculating the basis weight in the manner described above, the basis weight thereof was 45 g·m$^{-2}$ per one side.

<Production of Negative Electrode G2>

80 parts by weight of the active material mixture consisting of the negative electrode active material A and the negative electrode active material C that were mixed at a ratio of 95:5, 8 parts by weight of acetylene black, 12 parts by weight of PVdF (polyvinylidene fluoride) and NMP (N-methylpyrrolidone) were mixed followed by dispersing under conditions of a peripheral velocity of 15 m/s by using the FILMIX® thin film rotating-type high-speed mixer manufactured by Primix Corp. to obtain a coating solution. The viscosity (ηb) and TI value of the resulting coating solution were measured by using the TVE-35H E-type viscometer manufactured by Toki Sangyo Co., Ltd. As a result, viscosity (0) was 2,789 mPa·s and the TI value was 4.3. Both sides of a 10 μm-thick electrolytic copper foil without through-holes were coated with the coating solution under conditions of a coating speed of 1 m/s by using a die coater manufactured by Toray Engineering Co., Ltd., and the coating film was dried at a drying temperature of 85° C. to obtain a negative electrode. The resulting negative electrode was pressed under conditions of a pressure of 4 kN/cm and pressed surface temperature of 25° C. by using a roll press to obtain negative electrode G2. The film thickness of the negative electrode active material layer of the negative electrode G2 obtained as described above was determined by subtracting the thickness of the copper foil from the average value of thickness of the negative electrode G2 measured at ten arbitrary locations using the GS-551 Linear Gauge Sensor film thickness gauge manufactured by Ono Sokki Co., Ltd. As a result, the basis weight of the negative electrode active material layer of the negative electrode G2 per one side was 28 g/m$^2$ and the film thickness was 40 μm.

<Assembly Step>

The obtained double-sided negative electrode was cut out to a size of 12.2 cm×450 cm and the obtained double-sided positive electrode precursor was cut to a size of 12.0 cm×300 cm. The negative electrode and positive electrode precursor each have an uncoated portion, the surface of which was not coated. The uncoated portion was formed so as to have a width of 2 cm from the edge side. The microporous membrane separator having a thickness of 15 μm was interposed between the negative electrode and positive electrode precursor so that the uncoated portions thereof were opposite to each other and were protruded from the separator, and they were wound into an elliptical shape to obtain a wound body, and then the wound body was pressed and formed to a flat shape.

[Terminal Welding]

Subsequently, the negative electrode and positive electrode precursor were respectively connected to a negative electrode terminal and positive electrode terminal by ultrasonic welding to obtain an electrode wound body. This electrode wound body was then housed into a casing composed of an aluminum laminated film and the casing of the electrode terminal portions and bottom portion on three sides was heat sealed at 180° C. and 1.0 MPa for 20 seconds. Then, this electrode wound body was vacuum-dried for 60 hours at 80° C. and 50 Pa.

<Solution Injection, Impregnation and Sealing Steps>

Approximately 80 g of the aforementioned non-aqueous electrolytic solution were injected under atmospheric pressure into the electrode wound body housed in an aluminum laminated film in a dry air environment at a temperature of 25° C. and dew point of –40° C. or lower. Continuing, the aforementioned non-aqueous lithium-type electricity storage element was placed in a pressure reduction chamber and the pressure was reduced from normal pressure to –87 kPa followed by returning to atmospheric pressure and allowed to stand undisturbed for 5 minutes. Subsequently, a step consisting of reducing pressure from normal pressure to –87 kPa and then returning to atmospheric pressure was repeated four times followed by allowing to stand undisturbed for 15 minutes. Moreover, pressure was again reduced from normal pressure to –91 kPa followed by returning to normal pressure. The aforementioned step of reducing pressure followed by returning to normal pressure was repeated a total of seven times (while reducing pressure to –95 kPa, –96 kPa, –97 kPa, –81 kPa, –97 kPa, –97 kPa and –97 kPa each time). The non-aqueous electrolytic solution was impregnated in the electrode wound body according to the aforementioned step.

Subsequently, the non-aqueous lithium-type electricity storage element was placed in a reduced-pressure sealing machine and sealed for 10 seconds at 180° C. and pressure of 0.1 MPa while reducing the pressure in the machine to –95 kPa to seal the aluminum laminated film.

<Lithium Doping Step>

The resulting non-aqueous lithium-type electricity storage element was charged with a constant current at a current value of 0.7 A until the voltage reached 4.7 V in an environment at 25° C. by using a charge and discharge apparatus (TOSCAT-3100U) manufactured by Toyo System Co., Ltd., initial charging was then carried out according to a procedure consisting of continuing constant voltage charging at 4.7 V for 10 hours to dope the negative electrode with lithium.

<Aging Step>

The non-aqueous lithium-type electricity storage element after the lithium doping was discharged with a constant current at 0.7 A in an environment at 25° C. until the voltage reached 3.0 V, the voltage was adjusted to 4.0 V by carrying out constant current and constant voltage charging up to 4.0 V for 1 hour. Continuing, the nonaqueous lithium-type power storage element was stored for 20 hours in a thermostatic chamber at 60° C.

<Additional Charge/Discharge Step>

The non-aqueous lithium-type electricity storage element after the aging was discharged with a constant current at 10 A in an environment at 25° C. until the voltage reached 2.5 V, the charge/discharge step of charging from 2.5 V to 3.9 V at a current of 10 A, and discharging down to 2.5 V at a current of 10 A, was repeated 5 times.

[Gas Venting Step]

A portion of the aluminum laminated film of the non-aqueous lithium-type electricity storage element after the additional charge/discharge step, was opened in a dry air environment at a temperature of 25° C. and dew point of –40° C. Continuing, after the masking attaching to the non-opposing portion of the negative electrode was removed, the aforementioned non-aqueous lithium-type electricity storage element was placed in a pressure reduction chamber, and after reducing pressure from atmospheric pressure to –80 kPa over the course of 3 minutes by using a diaphragm pump (N816.3KT.45.18) manufactured by KNF Japan Co., Ltd., pressure was returned to atmospheric pressure over the course of 3 minutes, and this step was repeated a total of three times. Subsequently, the nonaqueous lithium-type electricity storage element was placed in a pressure reduction chamber and pressure was reduced to –90 kPa followed by sealing for 10 seconds at 200° C. and pressure of 0.1 MPa to seal the aluminum laminated film.

According to the above steps, the non-aqueous lithium-type electricity storage element consisting of the flat wound-type electrode body was completed. The electricity storage element was evaluated in the same manner as Example 1.

Examples 122 and 123 and Comparative Examples 36 to 38

Non-aqueous lithium-type electricity storage elements were each fabricated in the same manner as in Example 121 and subjected to various evaluations, except that the negative electrode, active material of the positive electrode precursor, lithium compound, and lithium compound ratio in the positive electrode precursor were changed to those described in Table 10, respectively.

The evaluation results are shown in Table 11.

Example 124

Non-aqueous lithium-type electricity storage element was fabricated in the same manner as in Example 121 and subjected to various evaluations, except that the positive electrode precursor D3 described below was used as a positive electrode precursor.

The evaluation results are shown in Table 11.

<Production of Positive Electrode Precursor D3>

43.1 parts by weight of activated carbon A, 14.4 parts by weight of $LiFePO_4$ having a mean particle diameter of 3.0 μm as lithium transition metal oxide, 15.0 parts by weight of lithium carbonate, 15 parts by weight of potassium carbonate, 3.0 parts by weight of Ketjen black, 1.5 parts by weight of PVP (polyvinylpyrrolidone), 8.0 parts by weight of PVdF (polyvinylidene difluoride) and NMP (N-methyl-2-pyrrolidone) were mixed so that the weight ratio of the solid content was 24.5%, followed by dispersing for 3 minutes under conditions of a peripheral velocity of 20 m/s using the FILMIX® (registered trademark) thin film rotating-type high-speed mixer manufactured by Primix Corp. to obtain a positive electrode coating solution 1.

The viscosity (ηb) and TI value of the resulting positive electrode coating solution 1 were measured by using the TVE-35H E-type viscometer manufactured by Toki Sangyo Co., Ltd. As a result, viscosity (ηb) was 2,690 mPa·s and the TI value was 6.6. Moreover, dispersity of the resulting positive electrode coating solution 1 was measured by using a particle gauge manufactured by Yoshimitsu Seiki Co., Ltd. As a result, dispersity was 23 μm.

Both sides of an aluminum foil having a thickness of 15 μm were coated with the positive electrode coating solution 1 under conditions of a coating speed of 1 m/s by using a double-sided die coater manufactured by Toray Engineering Co., Ltd., and the coating film was dried sequentially at 70° C., 90° C., 110° C., and 130° C. in this order in a drying chamber set to these chamber temperatures followed by drying by an IR heater to obtain a positive electrode precursor. The resulting positive electrode precursor was pressed under conditions of a pressure of 6 kN/cm and pressed surface temperature of 25° C. by using a roll press to obtain positive electrode precursor D3. The total film thickness of the positive electrode precursor D3 was measured at ten arbitrary locations of the positive electrode precursor by using the GS-551 Linear Gauge Sensor film thickness gauge manufactured by Ono Sokki Co., Ltd. The film thickness of the positive electrode active material layer obtained by subtracting the thickness of the aluminum foil was 75 μm per one side. As a result of calculating the basis weight in the manner described above, the basis weight the positive electrode active material layer was 47 g·m$^{-2}$ per one side.

Example 125

Non-aqueous lithium-type electricity storage element was fabricated in the same manner as in Example 121 and subjected to various evaluations, except that the positive electrode precursor D4 described below was used as a positive electrode precursor.

The evaluation results are shown in Table 11.

<Production of Positive Electrode Precursor D4>

43.1 parts by weight of activated carbon A, 14.4 parts by weight of LiFePO$_4$ having a mean particle diameter of 3.5 μm as lithium transition metal oxide, 15.0 parts by weight of lithium carbonate, 15 parts by weight of sodium carbonate, 3.0 parts by weight of Ketjen black, 1.5 parts by weight of PVP (polyvinylpyrrolidone), 8.0 parts by weight of PVdF (polyvinylidene difluoride) and NMP (N-methyl-2-pyrrolidone) were mixed so that the weight ratio of the solid content was 24.5%, followed by dispersing for 3 minutes under conditions of a peripheral velocity of 20 m/s using the FILMIX® (registered trademark) thin film rotating-type high-speed mixer manufactured by Primix Corp. to obtain a positive electrode coating solution 1.

The viscosity (ηb) and TI value of the resulting positive electrode coating solution 1 were measured using the TVE-35H E-type viscometer manufactured by Toki Sangyo Co., Ltd. As a result, viscosity (ηb) was 2,690 mPa·s and the TI value was 6.6. Moreover, dispersity of the resulting positive electrode coating solution 1 was measured using a particle gauge manufactured by Yoshimitsu Seiki Co., Ltd. As a result, dispersity was 23 μm.

Both sides of an aluminum foil having a thickness of 15 μm was coated with the positive electrode coating solution 1 under conditions of a coating speed of 1 m/s by using a double-sided die coater manufactured by Toray Engineering Co., Ltd., and the coating film was dried sequentially at 70° C., 90° C., 110° C., and 130° C. in this order in a drying chamber set to these chamber temperatures followed by drying by an IR heater to obtain a positive electrode precursor. The resulting positive electrode precursor was pressed under conditions of a pressure of 6 kN/cm and pressed surface temperature of 25° C. by using a roll press to obtain positive electrode precursor D4. The total film thickness of the positive electrode precursor D4 was measured at ten arbitrary locations of the positive electrode precursor by using the GS-551 Linear Gauge Sensor film thickness gauge manufactured by Ono Sokki Co., Ltd. The film thickness of the positive electrode active material layer obtained by subtracting the thickness of the aluminum foil was 77 μm per one side. As a result of calculating the basis weight of the positive electrode active material layer in the manner described above, the basis weight thereof was 48 g·m$^{-2}$ per one side.

Examples 126 and 128 and Comparative Examples 39 to 41

Non-aqueous lithium-type electricity storage elements were each fabricated in the same manner as in Example 59 and subjected to various evaluations, after the flat-type electrode body obtained in Example 121 was housed in the metal can.

The evaluation results are shown in Table 11.

TABLE 10

| | Negative electrode | | | |
|---|---|---|---|---|
| | Active material species | | Active material ratio | |
| | Active material 1 | Active material 2 | Active material 1 [wt %] | Active material 2 [wt %] |
| Example 121 | Negative electrode active material A | Negative electrode active material C | 95 | 5 |
| Example 122 | Negative electrode active material A | Negative electrode active material C | 95 | 5 |
| Example 123 | Negative electrode active material A | Negative electrode active material C | 95 | 5 |
| Example 124 | Negative electrode active material A | Negative electrode active material C | 95 | 5 |
| Example 125 | Negative electrode active material A | Negative electrode active material C | 95 | 5 |
| Example 126 | Negative electrode active material A | Negative electrode active material C | 95 | 5 |
| Example 127 | Negative electrode active material A | Negative electrode active material C | 95 | 5 |
| Example 128 | Negative electrode active material A | Negative electrode active material C | 95 | 5 |
| Comparative example 36 | Negative electrode active material A | Negative electrode active material C | 50 | 50 |
| Comparative example 37 | Negative electrode active material A | Negative electrode active material C | 50 | 50 |
| Comparative example 38 | Negative electrode active material A | Negative electrode active material C | 50 | 50 |
| Comparative example 39 | Negative electrode active material A | Negative electrode active material C | 50 | 50 |

TABLE 10-continued

| | Negative electrode | | | |
|---|---|---|---|---|
| Comparative example 40 | Negative electrode active material A | Negative electrode active material C | 50 | 50 |
| Comparative example 41 | Negative electrode active material A | Negative electrode active material C | 50 | 50 |

| | Positive electrode | | | | |
|---|---|---|---|---|---|
| | Active material | | Active material 1 [wt %] | Active material 2 [wt %] | Lithium compound species | Lithium compound ratio [wt %] |
| | Active material 1 | Active material 2 | | | | |
| Example 121 | Activated carbon A | NCA | 43.1 | 14.4 | Lithium carbonate | 30.0 |
| Example 122 | Activated carbon A | LiFePO$_4$ | 43.1 | 14.4 | Lithium carbonate | 30.0 |
| Example 123 | Activated carbon A | LiMn$_2$O$_4$ | 43.1 | 14.4 | Lithium carbonate | 30.0 |
| Example 124 | Activated carbon A | LiFePO$_4$ | 43.1 | 14.4 | Lithium carbonate Potassium carbonate | 30.0 |
| Example 125 | Activated carbon A | LiFePO$_4$ | 43.1 | 14.4 | Lithium carbonate Sodium carbonate | 30.0 |
| Example 126 | Activated carbon A | NCA | 43.1 | 14.4 | Lithium carbonate | 30.0 |
| Example 127 | Activated carbon A | LiFePO$_4$ | 43.1 | 14.4 | Lithium carbonate | 30.0 |
| Example 128 | Activated carbon A | LiMn$_2$O$_4$ | 43.1 | 14.4 | Lithium carbonate | 30.0 |
| Comparative example 36 | Activated carbon A | NCA | 43.1 | 14.4 | Lithium carbonate | 30.0 |
| Comparative example 37 | Activated carbon A | LiFePO$_4$ | 43.1 | 14.4 | Lithium carbonate | 30.0 |
| Comparative example 38 | Activated carbon A | LiMn$_2$O$_4$ | 43.1 | 14.4 | Lithium carbonate | 30.0 |
| Comparative example 39 | Activated carbon A | NCA | 43.1 | 14.4 | Lithium carbonate | 30.0 |
| Comparative example 40 | Activated carbon A | LiFePO$_4$ | 43.1 | 14.4 | Lithium carbonate | 30.0 |
| Comparative example 41 | Activated carbon A | LiMn$_2$O$_4$ | 43.1 | 14.4 | Lithium carbonate | 30.0 |

TABLE 11

| | Lithium transition metal compound in positive electrode active material | | | | | Evaluation results | | |
|---|---|---|---|---|---|---|---|---|
| | Solid-state $^7$Li-NMR | | | Weight ratio of lithium transition metal compound A1 | A2/A1 [wt %] | Initial characteristics | | Lowered temperature resistance ratio Rc/Ra |
| | Area of component A a | Area of component B b | a/b | | | Volume E density E/V [Wh/L] | Initial time constant Ra · F [ΩF] | |
| Example 121 | 789 | 181 | 4.4 | 18.3 | 0.3 | 37.2 | 1.33 | 9.8 |
| Example 122 | 1092 | 177 | 6.2 | 17.6 | 0.3 | 53.1 | 1.25 | 10.3 |
| Example 123 | 707 | 205 | 3.4 | 17.7 | 0.3 | 58.2 | 1.42 | 12.4 |
| Example 124 | 892 | 118 | 7.6 | 17.7 | 0.3 | 36.2 | 1.87 | 22.8 |
| Example 125 | 798 | 75 | 10.6 | 17.7 | 0.3 | 32.9 | 2.01 | 24.6 |
| Example 126 | 771 | 178 | 4.3 | 18.3 | 0.3 | 44.6 | 1.47 | 11.8 |
| Example 127 | 1095 | 171 | 6.4 | 17.6 | 0.3 | 56.8 | 1.40 | 12.7 |
| Example 128 | 709 | 198 | 3.6 | 17.7 | 0.3 | 64.3 | 1.55 | 15.3 |
| Comparative example 36 | 1070 | 45 | 23.8 | 18.3 | 0.3 | 12.7 | 1.85 | 18.4 |
| Comparative example 37 | 1328 | 54 | 24.6 | 17.6 | 0.3 | 14.9 | 1.69 | 19.6 |
| Comparative example 38 | 1278 | 47 | 27.2 | 17.6 | 0.3 | 16.4 | 2.10 | 24.5 |
| Comparative example 39 | 1090 | 38 | 28.7 | 17.6 | 0.3 | 15.5 | 1.80 | 17.2 |

TABLE 11-continued

| | Solid-state $^7$Li-NMR | | | Lithium transition metal compound in positive electrode active material | | Evaluation results | | |
| | | | | | | Initial characteristics | | |
| | Area of component A a | Area of component B b | a/b | Weight ratio of lithium transition metal compound A1 | A2/A1 [wt %] | Volume E density E/V [Wh/L] | Initial time constant Ra · F [ΩF] | Lowered temperature resistance ratio Rc/Ra |
|---|---|---|---|---|---|---|---|---|
| Comparative example 40 | 1319 | 46 | 28.7 | 17.6 | 0.3 | 17.2 | 1.57 | 18.1 |
| Comparative example 41 | 1267 | 41 | 30.9 | 17.6 | 0.3 | 18.1 | 2.00 | 22.9 |

The invention claimed is:

1. A non-aqueous lithium-type electricity storage element comprising a positive electrode, a negative electrode, a separator and a non-aqueous electrolytic solution containing lithium ions,
  wherein the negative electrode has a negative electrode current collector, and a negative electrode active material layer containing a negative electrode active material, disposed on one or both sides of the negative electrode current collector, the negative electrode active material contains a carbon material capable of intercalating and releasing lithium ions,
  the positive electrode has a positive electrode current collector, and a positive electrode active material layer containing a positive electrode active material, disposed on one or both sides of the positive electrode current collector, the positive electrode active material contains an activated carbon, and
  the positive electrode active material layer contains a component A having a signal in a range of −2 to 2.5 ppm and a component B having a signal in a range of −6 to −2.5 ppm in a solid-state $^7$Li-NMR spectrum of the positive electrode active material layer, and has a signal area ratio a/b of 1.5 to 20.0 when a signal area of the component A is a, and a signal area of the component B is b, and the component B is derived from active sites interacting with lithium ions on a surface of the activated carbon, and
  the positive electrode active material layer contains a lithium compound other than the positive electrode active material, and a mean particle diameter of the lithium compound satisfies the expression 0.1 µm≤$X_1$≤10 µm, where $X_1$ is the mean particle diameter of the lithium compound.

2. The non-aqueous lithium-type electricity storage element according to claim 1, wherein the positive electrode active material further contains a transition metal oxide capable of intercalating and releasing lithium ions.

3. The non-aqueous lithium-type electricity storage element according to claim 2,
  wherein the transition metal oxide contains at least one lithium transition metal oxide selected from the group consisting of the following formulae:
  $Li_{x1}CoO_2$ wherein, in the formula, x1 satisfies 0≤x1≤2,
  $Li_{x1}NiO_2$ wherein, in the formula, x1 satisfies 0≤x1≤2,
  $Li_{x1}Ni_yM^1_{(1-y)}O_2$ wherein, in the formula, $M^1$ is at least one element selected from the group consisting of Co, Mn, Al, Fe, Mg and Ti, x1 satisfies 0≤x1≤2, and y satisfies 0.2<y<0.97,
  $Li_{x1}Ni_{1/3}Co_{1/3}Mn_{1/3}O_2$ wherein, in the formula, x1 satisfies 0≤x1≤2,
  $Li_{x1}MnO_2$ wherein, in the formula, x1 satisfies 0≤x1≤2,
  α-$Li_{x1}FeO_2$ wherein, in the formula, x1 satisfies 0≤x1≤2,
  $Li_{x1}VO_2$ wherein, in the formula, x1 satisfies 0≤x1≤2,
  $Li_{x1}CrO_2$ wherein, in the formula, x1 satisfies 0≤x1≤2,
  $Li_{x1}Mn_2O_4$ wherein, in the formula, x1 satisfies 0≤x1≤2,
  $Li_{x1}M^2_yMn_{(2-y)}O_4$ wherein, in the formula, $M^2$ is at least one element selected from the group consisting of Co, Ni, Al, Fe, Mg and Ti, x1 satisfies 0≤x1≤2, and y satisfies 0.2<y<0.97,
  $Li_{x1}Ni_aCo_bAl_{(1-a-b)}O_2$ wherein, in the formula, x1 satisfies 0≤x1≤2, a satisfies 0.2<a<0.97 and b satisfies 0.2<b<0.97,
  $Li_{x1}Ni_cCo_dMn_{(1-c-d)}O_2$ wherein, in the formula, x1 satisfies 0≤x1≤2, c satisfies 0.2<c<0.97, and d satisfies 0.2<d<0.97,
  $Li_{x1}M^3PO_4$ wherein, in the formula, $M^3$ is at least one element selected from the group consisting of Co, Ni, Fe, Mn and Cu, and x1 satisfies 0≤x1≤2, and
  $Li_zV_2(PO_4)_3$ wherein, in the formula, z satisfies 0≤z≤3.

4. The non-aqueous lithium-type electricity storage element according to claim 2, wherein the activated carbon has a mean particle diameter of 2 µm or greater and 20 µm or less, and the transition metal oxide has a mean particle diameter of 0.1 µm or greater and 20 µm or less.

5. The non-aqueous lithium-type electricity storage element according to claim 2, wherein the positive electrode contains a carbon material containing the activated carbon, and the lithium transition metal oxide, and when a weight proportion of the carbon material in the positive electrode active material layer is $A_1$, and a weight proportion of the lithium transition metal oxide is $A_2$, $A_2/A_1$ is 0.1 or greater and 2.5 or less.

6. The non-aqueous lithium-type electricity storage element according to claim 1, wherein the positive electrode contains one or more selected from the group consisting of lithium carbonate, sodium carbonate, potassium carbonate, rubidium carbonate, and cesium carbonate in an amount of 1% by weight or greater and 50% by weight or less relative to a total amount of the positive electrode active material.

7. The non-aqueous lithium-type electricity storage element according to claim 1, wherein the positive electrode current collector and the negative electrode current collector are nonporous metal foils.

8. The non-aqueous lithium-type electricity storage element according to claim 1, wherein the negative electrode contains at least two types of the negative electrode active materials.

9. The non-aqueous lithium-type electricity storage element according to claim 8, wherein at least one of the negative electrode active material has a mean particle diameter of 1 µm or greater and 15 µm or less.

10. The non-aqueous lithium-type electricity storage element according to claim 1, wherein when a basis weight of the positive electrode active material layer of the positive electrode is $C_1$ (g/m$^2$) and a basis weight of the negative electrode active material layer of the negative electrode is $C_2$ (g/m$^2$), $C_1/C_2$ is 0.35 or greater and 5.80 or less.

11. The non-aqueous lithium-type electricity storage element according to claim 1, wherein when a thickness of the positive electrode active material layer of the positive electrode is $D_1$ (μm) and a thickness of the negative electrode active material layer of the negative electrode is $D_2$ (μm), $D_1/D_2$ is 0.30 or greater and 5.00 or less.

12. The non-aqueous lithium-type electricity storage element according to claim 1, wherein an element concentration of sulfur (S) on the surface of the negative electrode active material layer detected by X-ray photoelectron spectroscopy (XPS), is 0.5 atomic % or greater, and a peak having 162 eV to 166 eV is present in a S2p spectrum of the surface of the positive electrode active material layer, obtained by X-ray photoelectron spectroscopy (XPS).

13. The non-aqueous lithium-type electricity storage element according to claim 1, wherein the non-aqueous electrolytic solution contains as additives:

one or more sulfur-containing compounds (X) selected from the group consisting of a thiophene compound represented by formula (1):

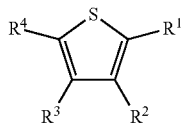

(1)

wherein, in formula (1), $R^1$, $R^2$, $R^3$, and $R^4$ each independently represent a hydrogen atom, a halogen atom, a formyl group, an acetyl group, a nitrile group, an acetyl group, an alkyl group having 1 to 6 carbon atoms, an alkoxy group having 1 to 6 carbon atoms or an alkyl ester having 1 to 6 carbon atoms, and one or more sulfur-containing compounds (Y) selected from the group consisting of a cyclic sulfate compound represented by formula (2-1):

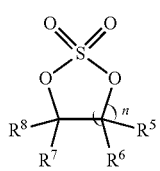

(2-1)

wherein, in formula (2-1), $R^5$, $R^6$, $R^7$, and $R^8$ each represent at least one selected from the group consisting of a hydrogen atom, a halogen atom, an alkyl group having 1 to 12 carbon atoms, and a halogenated alkyl group having 1 to 12 carbon atoms, may be the same or different from each other; and n is an integer from 0 to 3; a sultone compound represented by formula (2-2):

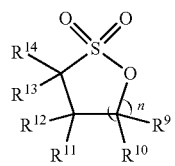

(2-2)

wherein, in formula (2-2), $R^9$, $R^{10}$, $R^{11}$, $R^{12}$, $R^{13}$, and $R^{14}$ each represent at least one selected from the group consisting of a hydrogen atom, a halogen atom, an alkyl group having 1 to 12 carbon atoms, and a halogenated alkyl group having 1 to 12 carbon atoms, may be the same or different from each other; and n is an integer from 0 to 3; a sultone compound represented by formula (2-3):

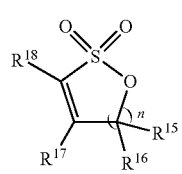

(2-3)

wherein, in formula (2-3), $R^{15}$, $R^{16}$, $R^{17}$, and $R^{18}$ each represent at least one selected from the group consisting of a hydrogen atom, a halogen atom, an alkyl group having 1 to 12 carbon atoms, and a halogenated alkyl group having 1 to 12 carbon atoms, may be the same or different from each other, and n is an integer from 0 to 3; a compound represented by formula (2-4):

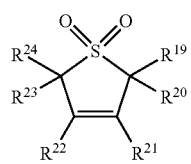

(2-4)

wherein, in formula (2-4), $R^{19}$, $R^{20}$, $R^{21}$, $R^{22}$, $R^{23}$, and $R^{24}$ each represent at least one selected from the group consisting of a hydrogen atom, a halogen atom, an alkyl group having 1 to 12 carbon atoms, and a halogenated alkyl group having 1 to 12 carbon atoms and may be the same or different from each other; and a cyclic sulfite compound represented by formula (2-5):

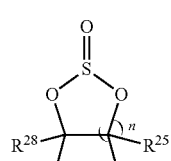

(2-5)

wherein, in formula (2-5), $R^{25}$, $R^{26}$, $R^{27}$, and $R^{28}$ each represent at least one selected from the group consisting of a hydrogen atom, a halogen atom, an alkyl group having 1 to 12 carbon atoms, and a halogenated alkyl group having 1 to 12 carbon atoms, may be the same or different from each other, and n is an integer from 0 to 3.

14. The non-aqueous lithium-type electricity storage element according to claim 2, wherein the nonaqueous electrolytic solution has an element concentration of at least one element selected from the group consisting of Ni, Mn, Fe, Co, and Al of 10 ppm or greater and 1000 ppm or less.

15. The non-aqueous lithium-type electricity storage element according to claim 1, wherein the following (a), (b), and (c) are simultaneously satisfied for the non-aqueous lithium-type electricity storage element:
   (a) a product of Ra and F, Ra·F, is 0.5 or greater and 3.5 or less,
   (b) E/V is 20 or greater and 80 or less, and
   (c) Rc/Ra is 30 or less,
where Ra (Ω) is an initial internal resistance at a cell voltage of 4.2 V, F (F) is an electrostatic capacitance, E (Wh) is an electrical energy, V (L) is a volume of a casing housing the nonaqueous electrolytic solution and an electrode stacked body in which the positive electrode and the negative electrode have been stacked via the separator or an electrode wound body in which the positive electrode and the negative electrode have been wound via the separator, and Rc is an internal resistance at an environmental temperature of −30° C.

16. The non-aqueous lithium-type electricity storage element according to claim 15, wherein the following (d) and (e) are simultaneously satisfied for the non-aqueous lithium-type electricity storage element:
   (d) Rb/Ra is 0.3 or greater and 3.0 or less, and
   (e) a gas volume generated when a cell has been stored for 2 months at a cell voltage of 4 V and an environmental temperature of 60° C., is $30 \times 10^{-3}$ cc/F or less at 25° C.,
where Ra (Ω) is an initial internal resistance at a cell voltage of 4.2 V and Rb (Ω) is an internal resistance at 25° C. after a cell has been stored for 2 months at a cell voltage of 4.2 V and an environmental temperature of 60° C.

17. An electric vehicle, a plug-in hybrid vehicle, a hybrid vehicle, or an electric motorcycle comprising the non-aqueous lithium-type electricity storage element according to claim 1.

18. A hybrid construction machine comprising the non-aqueous lithium-type electricity storage element according to claim 1.

19. A backup power supply system comprising the non-aqueous lithium-type electricity storage element according to claim 1.

20. The non-aqueous lithium-type electricity storage element according to claim 1, wherein the component B is derived from active sites interacting with lithium ions on a surface of the activated carbon, and
   the positive electrode active material further contains a transition metal oxide capable of intercalating and releasing lithium ions, and
   the transition metal oxide contains at least one lithium transition metal oxide selected from the group consisting of the following formulae:
   $Li_{x1}Ni_yM^1_{(1-y)}O_2$ wherein, in the formula, $M^1$ is at least one element selected from the group consisting of Co, Mn, Al, Fe, Mg and Ti, x1 satisfies $0 \leq x1 \leq 2$, and y satisfies $0.2<y<0.97$,
   $Li_{x1}Ni_{1/3}Co_{1/3}Mn_{1/3}O_2$ wherein, in the formula, x1 satisfies $0 \leq x1 \leq 2$,
   $Li_{x1}MnO_2$ wherein, in the formula, x1 satisfies $0 \leq x1 \leq 2$,
   $\alpha\text{-}Li_{x1}FeO_2$ wherein, in the formula, x1 satisfies $0 \leq x1 \leq 2$,
   $Li_{x1}VO_2$ wherein, in the formula, x1 satisfies $0 \leq x1 \leq 2$,
   $Li_{x1}CrO_2$ wherein, in the formula, x1 satisfies $0 \leq x1 \leq 2$,
   $Li_{x1}Mn_2O_4$ wherein, in the formula, x1 satisfies $0 \leq x1 \leq 2$,
   $Li_{x1}M^2_yMn_{(2-y)}O_4$ wherein, in the formula, $M^2$ is at least one element selected from the group consisting of Co, Ni, Al, Fe, Mg and Ti, x1 satisfies $0 \leq x1 \leq 2$, and y satisfies $0.2<y<0.97$,
   $Li_{x1}Ni_aCo_bAl_{(1-a-b)}O_2$ wherein, in the formula, x1 satisfies $0 \leq x1 \leq 2$, a satisfies $0.2<a<0.97$ and b satisfies $0.2<b<0.97$,
   $Li_{x1}Ni_cCo_dMn_{(1-c-d)}O_2$ wherein, in the formula, x1 satisfies $0 \leq x1 \leq 2$, c satisfies $0.2<c<0.97$, and d satisfies $0.2<d<0.97$,
   $Li_{x1}M^3PO_4$ wherein, in the formula, $M^3$ is at least one element selected from the group consisting of Co, Ni, Fe, Mn and Cu, and x1 satisfies $0 \leq x1 \leq 2$, and
   $Li_zV_2(PO_4)_3$ wherein, in the formula, z satisfies $0 \leq z \leq 3$.

* * * * *